(12) United States Patent
Noda et al.

(10) Patent No.: US 9,111,172 B2
(45) Date of Patent: Aug. 18, 2015

(54) INFORMATION PROCESSING DEVICE, INFORMATION PROCESSING METHOD, AND PROGRAM

(71) Applicant: Sony Corporation, Tokyo (JP)

(72) Inventors: Kuniaki Noda, Tokyo (JP); Kenta Kawamoto, Tokyo (JP); Peter Duerr, Tokyo (JP); Kohtaro Sabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 233 days.

(21) Appl. No.: 13/767,037

(22) Filed: Feb. 14, 2013

(65) Prior Publication Data

US 2013/0243331 A1 Sep. 19, 2013

(30) Foreign Application Priority Data

Mar. 15, 2012 (JP) ................................. 2012-058679

(51) Int. Cl.
  *G06K 9/46* (2006.01)
  *G06K 9/62* (2006.01)
  *G06T 7/20* (2006.01)

(52) U.S. Cl.
  CPC ............ *G06K 9/46* (2013.01); *G06K 9/6203* (2013.01); *G06T 7/208* (2013.01); *G06T 2207/10016* (2013.01); *G06T 2207/20076* (2013.01); *G06T 2207/20081* (2013.01)

(58) Field of Classification Search
  None
  See application file for complete search history.

(56) References Cited

U.S. PATENT DOCUMENTS 7,280,697 B2 * 10/2007 Perona et al. ................. 382/225
7,418,113 B2 * 8/2008 Porikli et al. ................. 382/103
8,228,383 B2 * 7/2012 Sugiura ......................... 348/169
8,639,026 B2 * 1/2014 Lin ................................ 382/155
2003/0006957 A1 * 1/2003 Colantonio et al. .......... 345/156
2003/0044045 A1 * 3/2003 Schoepflin et al. ........... 382/103
2003/0219146 A1 * 11/2003 Jepson et al. ................. 382/103
2005/0002572 A1 * 1/2005 Saptharishi et al. .......... 382/224
2006/0204036 A1 * 9/2006 Huang .......................... 382/103
2006/0291696 A1 * 12/2006 Shao et al. .................... 382/103
2007/0003141 A1 * 1/2007 Rittscher et al. ............. 382/181
2007/0122039 A1 * 5/2007 Zhang et al. .................. 382/199
2008/0101652 A1 * 5/2008 Zhao et al. .................... 382/103
2009/0034793 A1 * 2/2009 Dong et al. ................... 382/103
2009/0110236 A1 * 4/2009 Huang et al. ................. 382/103
2010/0111370 A1 * 5/2010 Black et al. ................... 382/111
2011/0032423 A1 * 2/2011 Jing et al. ..................... 348/552
2011/0170742 A1 * 7/2011 Fukuchi et al. .............. 382/103

(Continued)

FOREIGN PATENT DOCUMENTS

JP 5-282275 10/1993
JP 7-29081 1/1995

(Continued)

OTHER PUBLICATIONS

13/766,056, filed Feb. 13, 2013, Noda, et al.

*Primary Examiner* — Chan Park
*Assistant Examiner* — Iman Kholdebarin
(74) *Attorney, Agent, or Firm* — Hazuki International, LLC

(57) ABSTRACT

An information processing device includes: a foreground state estimating unit configured to estimate a foreground state of an image using an actual image which is an image to be actually observed; and a visible model updating unit configured to update a background visible model which is visibility of the background of an image and a foreground visible model which is visibility of the foreground using an estimation result of the foreground state.

20 Claims, 30 Drawing Sheets

(56) References Cited

U.S. PATENT DOCUMENTS

| | | | |
|---|---|---|---|
| 2011/0211754 A1* | 9/2011 | Litvak et al. | 382/165 |
| 2012/0250981 A1* | 10/2012 | Noda et al. | 382/155 |
| 2012/0250982 A1* | 10/2012 | Ito et al. | 382/159 |
| 2013/0051613 A1* | 2/2013 | Bobbitt et al. | 382/103 |
| 2014/0114888 A1* | 4/2014 | Noda et al. | 706/12 |

FOREIGN PATENT DOCUMENTS

| | | |
|---|---|---|
| JP | 7-88791 | 4/1995 |
| JP | 2005-128959 | 5/2005 |

\* cited by examiner

FIG. 25
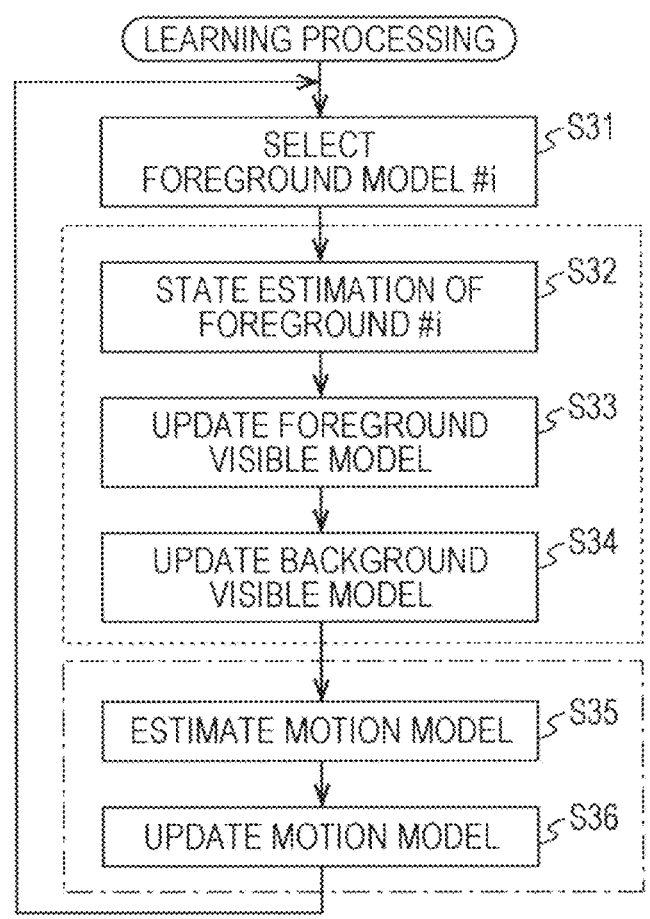
FOREGROUND/BACKGROUND
MODEL LEARNING:
MOTION MODEL LEARNING:
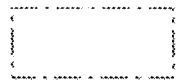

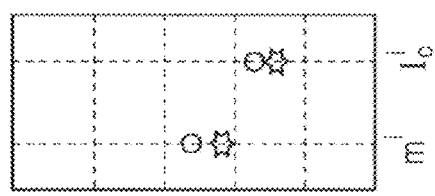
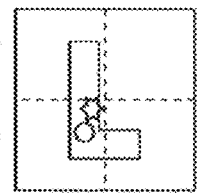
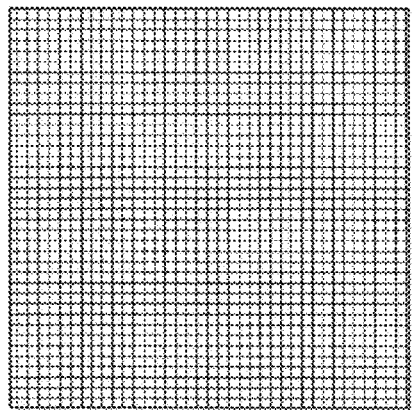
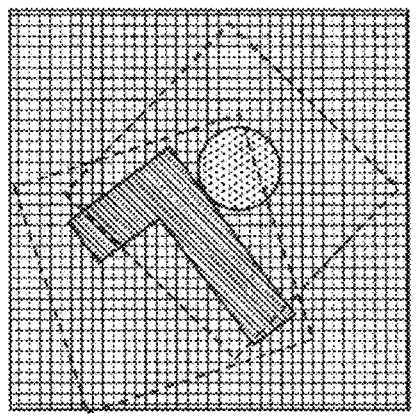
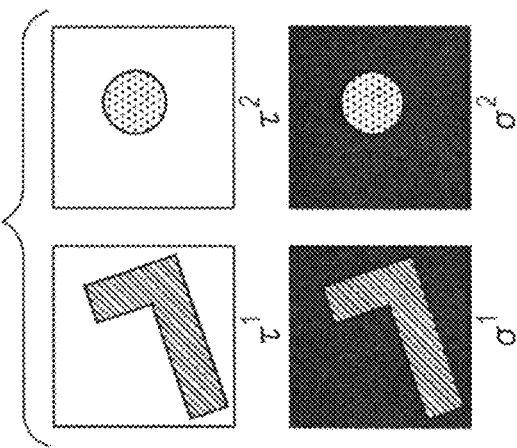
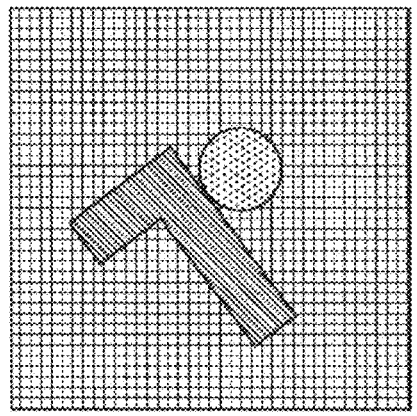
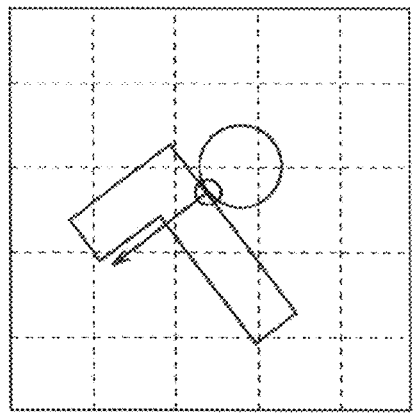

INFORMATION PROCESSING DEVICE, INFORMATION PROCESSING METHOD, AND PROGRAM

BACKGROUND

The present disclosure relates to an information processing device, an information processing method, and a program, and specifically relates to an information processing device, an information processing method, and a program, which allow an agent capable of performing action such as a robot or the like to readily perform learning of an object and so forth within an environment where the agent performs action.

Heretofore, in order to use an image obtained by shooting a certain environment with a camera to perform learning (or recognition) of an object within the environment thereof, trimming of an image area of the object to be learned (or object to be recognized) has had to be performed.

As for a method to trimming an image area to be learned, there have principally been approach employing previous knowledge regarding appearance of an object to be learned (Japanese Unexamined Patent Application Publication No. 7-88791), and approach taking advantage of motion of an object (Japanese Unexamined Patent Application Publication Nos. 5-282275, 7-29081, and 2005-128959).

With the approach employing previous knowledge regarding appearance, creation of a recognition model is performed by performing marking to identify an object, or learning regarding an object to be learned (object to be processed) beforehand.

With the approach taking advantage of motion of an object to be processed, an image area alone where the object is moving using image difference or optical flow or the like is extracted.

Incidentally, for example, with an object operating task wherein a robot operates an object, there has to be distinguished between an object to be operated, and the hand (of the robot itself) which the robot uses to operate the object.

Therefore, with the approach employing previous knowledge regarding appearance, the robot has to identify the label thereof after marking is made on the object and hand with a label to distinguish each thereof. Also, with the approach taking advantage of motion of an object to be processed, there has to be recognized whether or not an image area trimmed from an image shot with a camera is an image area of the object.

Further, at the time of recognizing whether or not an image area trimmed from an image shot with a camera is an image area of the object, a recognizer which performs recognition thereof has to be specified with the hand (has to be given with the knowledge of the hand) so as to distinguish the hand and object.

Also, with technology disclosed in Japanese Unexamined Patent Application Publication No. 2005-128959, there is created beforehand a geometry model such as how a robot arm including a hand is reflected within an image shot with a camera, where the hand position of the robot arm moves when outputting what kind of command to the robot arm, and so forth, and object operations are performed in accordance with the geometry model thereof.

With the technology disclosed in Japanese Unexamined Patent Application Publication No. 2005-128959, object operations are performed in accordance with the geometry model as described above, and accordingly, when changing a relative position between the camera and robot arm, when exchanging the lens of the camera, when changing the size of the robot arm, or the like, the geometry model has to be corrected by hand each time thereof.

SUMMARY

In the event of performing learning of an object within an environment where an agent who enables to perform action such as a robot or the like performs action, there have had to be performed making to identify the object, and extraction of an image area where the object is being moved, which has been troublesome.

It has been found to be desirable to facilitate learning of an object or the like within an environment where an agent who is allowed to perform action such as a robot or the like performs action.

An information processing device or program according to an embodiment of the present technology is an information processing device or program causing a computer serving as an information processing device including: a foreground state estimating unit configured to estimate a foreground state of an image using an actual image which is an image to be actually observed; and a visible model updating unit configured to update a background visible model which is visibility of the background of an image and a foreground visible model which is visibility of the foreground using an estimation result of the foreground state.

An information processing method according to an embodiment of the present technology is an information processing method including: estimating a foreground state of an image using an actual image which is an image to be actually observed; and updating a background visible model which is visibility of the background of an image and a foreground visible model which is visibility of the foreground using an estimation result of the foreground state.

With an embodiment of the present technology, a foreground state of an image is estimated using an actual image which is an image to be actually observed, and a background visible model which is visibility of the background of an image and a foreground visible model which is visibility of the foreground is updated using an estimation result of the foreground state.

Note that the information processing device may be a standalone device, or may be an internal block which makes up one device.

Also, the program may be provided by being transmitted via a transmission medium or by being recorded in a recording medium.

According to an embodiment of the present technology, learning of an object or the like within an environment may be facilitated.

BRIEF DESCRIPTION OF THE DRAWINGS

FIG. 25 is a flowchart for describing overview of learning processing for a foreground model, a background model, and a motion model that an agent performs;

FIGS. 29A to 29G are diagrams schematically illustrating simulation results.

DETAILED DESCRIPTION OF EMBODIMENTS

Chapter 0. Overview of Present Technology

Figure 1:
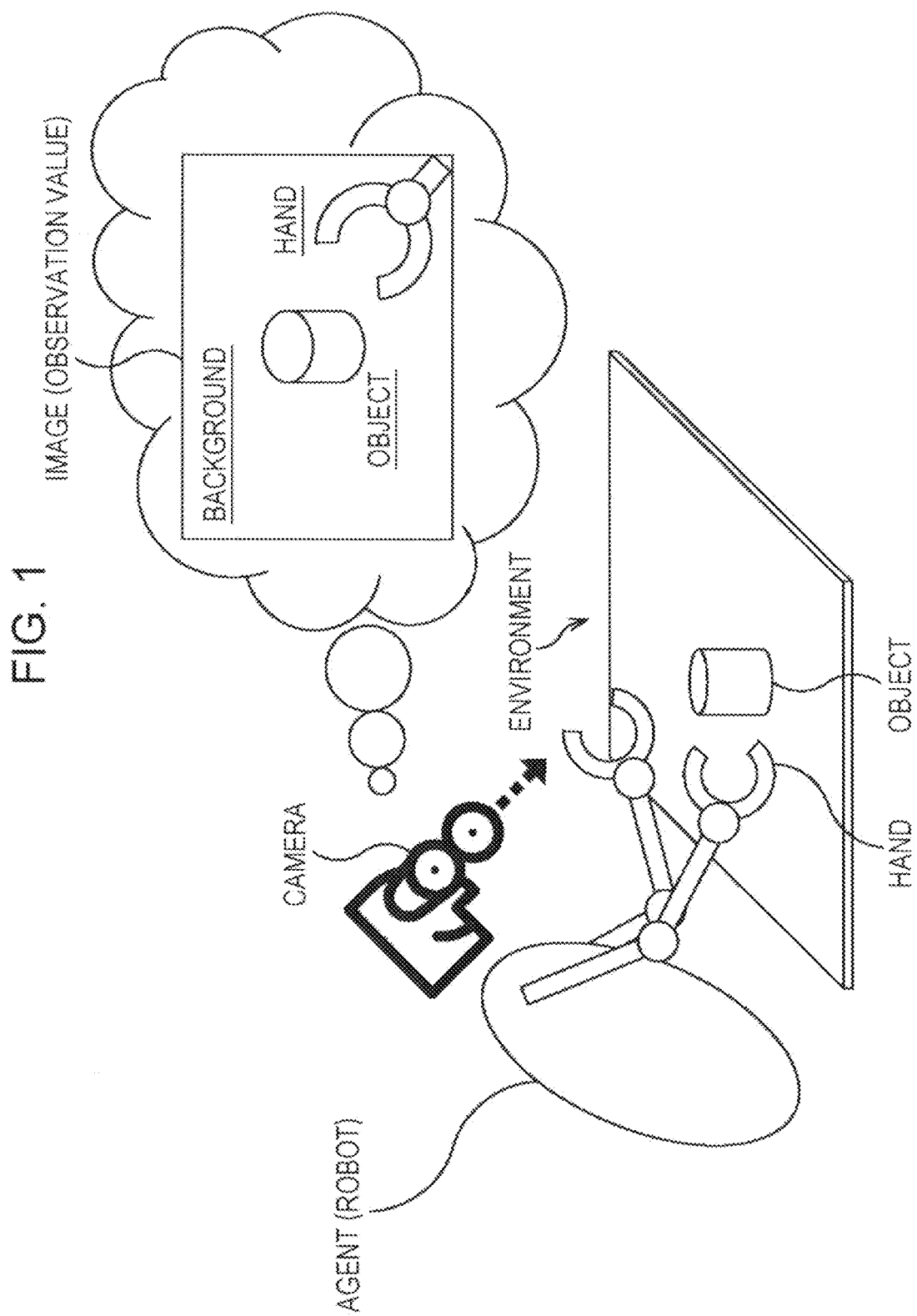
FIG. 1 is a diagram for describing overview of the present technology.

FIG. 1 is a diagram for describing an overview of the present technology.

The present technology is technology relating to an algorithm by an agent capable of performing action, such as a robot or the like which includes a hand or the like serving as a manipulator which enables to operate an object within an environment, and a camera or the like which enables to observe (shoot) an environment, learning a model of an environment, object, and a body (a movable portion of the agent) such as the hand or the like, to realize operating an object under an environment, from an image observed at the camera, and performing state recognition using the model thereof.

With the present technology, particularly, a designer obtains a model relating to an object within an environment (according to appearance of an object to be operated, and applied acceleration, kinetics parameters for deciding how the object thereof moves under an environment, etc.) by learning in an self-organizing manner from experience that an agent obtained through interaction with an environment without creating the model beforehand.

Further, with the present technology, for example, in the event that an image observed by the camera has become an image with high resolution, or in the event that the particle size of a state variable to be expressed becomes fine due to the attitude of an object within an environment changing or the like, and even in the event that the number of dimensions increases, learning is performed with high speed.

With the present technology, experience of object operations obtained through interaction between an agent and an environment is input to a learning device through a camera mounted on the agent as image time series.

Here, it is commonly difficult to start learning in a state in which no explicit marker has been appended to the hand and object, and no preliminary knowledge regarding the hand and the appearance of the object has been given, and to learn a model regarding the hand and the appearance of the object from an image on which a scene where the hand and object are excising in a mixed manner is reflected. Also, in the event that the particle size of a state variable to be expressed becomes fine, or in the event that the number of dimensions increases, when calculation amount for learning exponentially increases, this causes a problem on practicality under a condition for expecting real-time requirement such as control of an agent under the actual environment.

With the present technology, there are prepared frameworks for describing image observation series (image observation value series) by expressing an image observed with the camera by separating the image into the hand of an agent, a model regarding appearance and motion of an object to be operated (foreground), and a model of an environment where object operations are performed (background).

Further, with the present technology, parameters of a model are successively estimated using the probability model most-likely estimation method (EM (Expectation Maximization) algorithm) based on image observation series on which experience of object operations and so forth are reflected, thereby learning the model from experience in a self-organizing manner.

Note that, as for image observation series, a moving image taken with a video camera, a moving image captured from screens of a computer game, or the like may be employed, for example.

Also, with the present technology, though learning of a model may be performed using image observation series observed from a three-dimensional environment by extending frameworks of observation models (later-described foreground visible model and background visible model), hereinafter, for simplification of description, description will be made assuming that image observation series observed from a two-dimensional environment are employed for learning of a model.

Further, with the following description, though an image template is employed as implementation of an observation model, local feature amount and so forth of an image may additionally be employed as an observation model, for example.

Chapter 1. Environmental Setting

Figure 2:
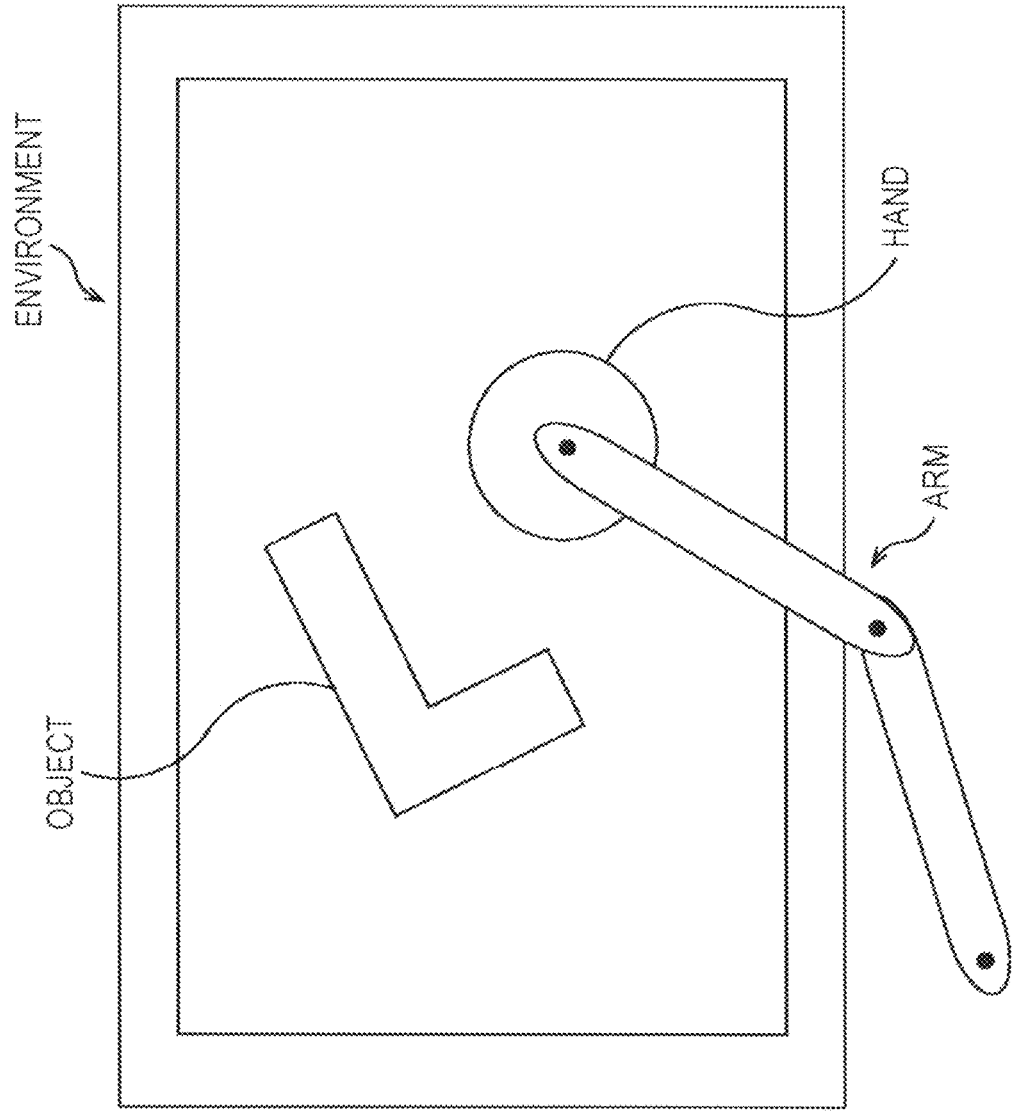
FIG. 2 is a diagram for describing an example of an environment to which the present technology is applied.

FIG. 2 is a diagram for describing an example of an environment to which the present technology is applied.

In FIG. 2, with an environment serving as a two-dimensional plane, a L-shaped object and an hand of an agent are allocated.

The hand of the agent is attached to the tip of an arm equivalent to the arm, and the hand attached to the tip of the arm thereof is also moved by the agent moving the arm. Accordingly, the agent may autonomously move the hand.

On the other hand, the L-shaped object does not autonomously move, and when force is externally applied such as the hand or the like, moves in accordance with the applied force thereof.

With the agent, an image is observed wherein an environment is shot by a camera, the environment is reflected as the background, and the L-shaped object which moves while changing the position and attitude and the hand are reflected as the foreground overlapped with the background thereof.

Note that, though FIG. 2 illustrates a two-dimensional environment, the present technology may be applied to a three-dimensional environment as described above.

Also, in FIG. 2, though the image observed at the agent includes two foregrounds of a foreground corresponding to the L-shaped object and a foreground corresponding to the hand, the number of foregrounds existing in the image may be one or may be three or more.

With the present technology, regarding the i-th foreground #i of the foregrounds included in an image, a state such as the position or attitude or the like of center-of-gravity at point-in-time t (center-of-gravity of inertial mass) is represented as $z^i_t$, a motion model is represented as $a^i$, and action performed by the foreground at the point-in-time t for movement or the like, or action applied to the foreground is represented as $u^i_t$, respectively.

Also, a model representing the background of an image will also be referred to as a background model, and also, a model representing the foreground #i of the image will also be referred to as a foreground model #i.

The foreground model #i includes a foreground visible model $\mu^i$ which is a visible model of the foreground #i.

The foreground visible model $\mu^i$ includes a foreground texture model $\tau^i$ representing the texture of the foreground #i, and a foreground shape model $\sigma^i$ representing the shape of the foreground #i, and is expressed with Expression (1).

$$\mu^i = \begin{bmatrix} \tau^i \\ \sigma^i \end{bmatrix} \quad (1)$$

The background model includes a background visible model $\mu^w$ which is a visible model of the background.

The background visible model $\mu^w$ includes a background texture model $\tau^w$ representing the texture of the entire background.

$$\mu^w = \tau^w \quad (2)$$

With the present technology, a generating model which generates an image observation value includes the foreground model #i and the background model as described above, and generates an image observation value (hereinafter, also referred to as observation image) $x_t$ at each point-in-time t.

Figure 3:
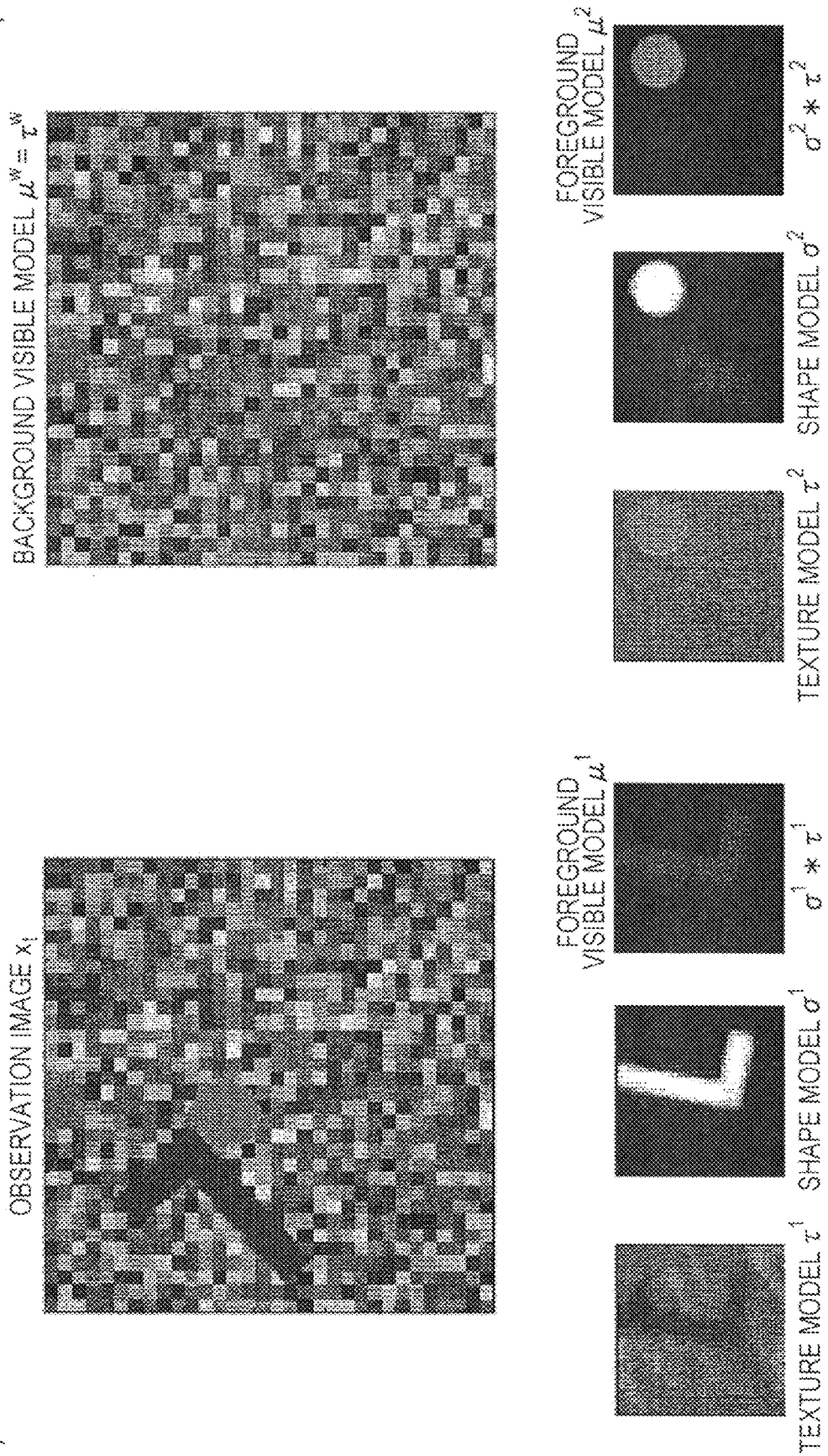
FIG. 3 is a diagram illustrating an example of a foreground model and a background model, and an observation image to be generated using the foreground model and background model.

FIG. 3 is a diagram illustrating an example of the foreground model #i, and background model, and the observation image $x_t$ generated at the generating model including the foreground model #i and background model.

With the foreground model #i, the foreground texture model $\tau^i$ and foreground shape model $\sigma^i$ of the foreground visible model $\mu^i$ are, for example, images with the same size, and the maximum size assumed as the size of the foreground may be employed as the size thereof.

The image serving as the foreground texture model $\tau^i$ includes values serving as the texture of the foreground #i (e.g., RGB or the like) as the pixel values of the pixels (pixels, voxels).

The image serving as the foreground shape model $\sigma^i$ includes consecutive values in a range of 0 through 1 as the pixel values of the pixels. The pixel value of each pixel of the foreground shape model $\sigma^i$ represents probability that the pixel thereof will be the foreground (a pixel on which the foreground is reflected).

Now, if we say that product of the pixel values of pixels in the same position is represented as *, visibility of the foreground #i is expressed with the product of the pixel values of pixels in the same position as with the foreground texture model $\tau^i$ included in the foreground visible model $\mu^i$, and the foreground shape model $\sigma^i$ (i.e., $\tau^i * \sigma^i$).

In FIG. 3, two foreground visible models $\mu^1$ and $\mu^2$ are superimposed on the background visible model ($\mu^w = \tau^w$, and the observation image $x^t$ is generated.

Figure 4:
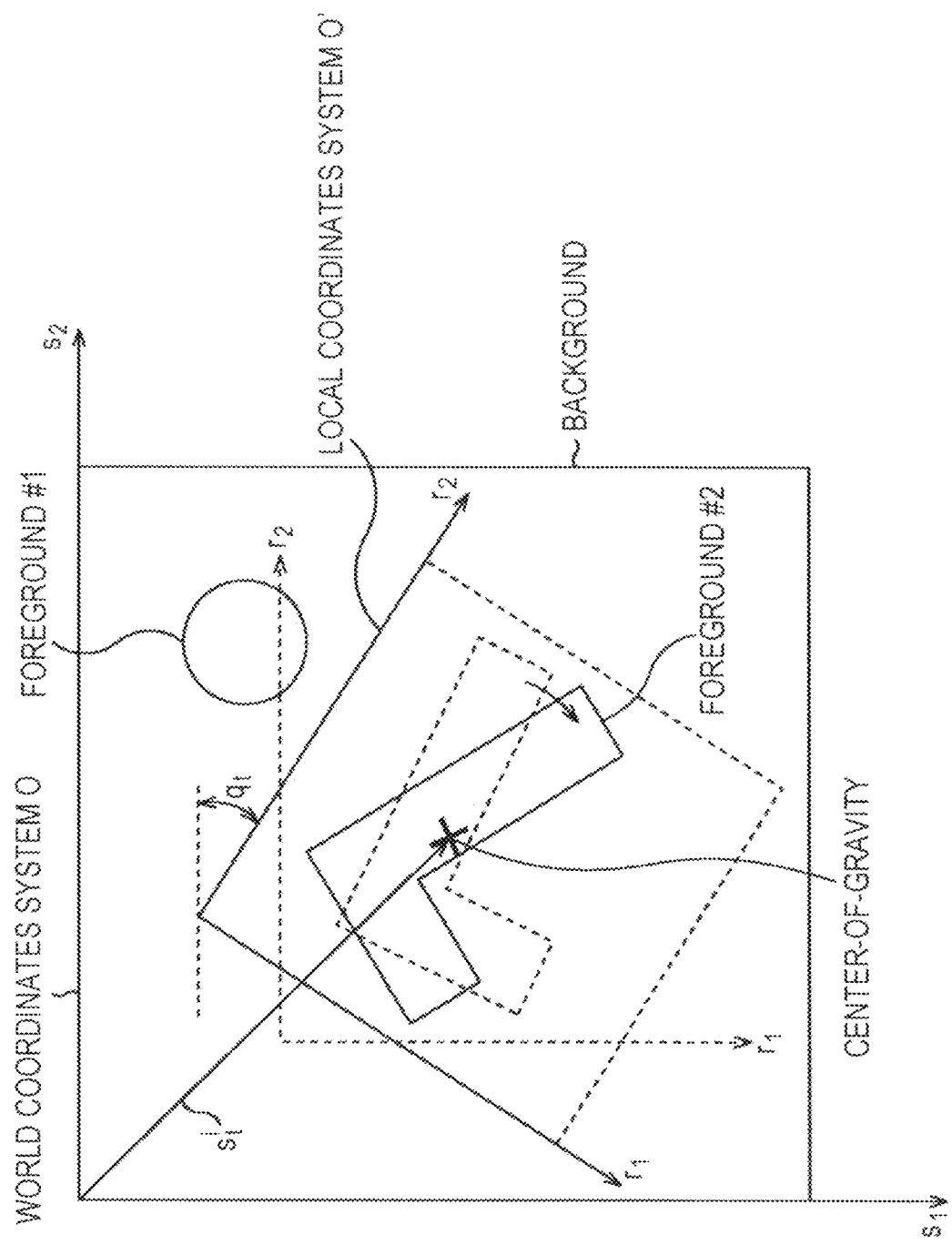
FIG. 4 is a diagram for describing a state of a foreground.

FIG. 4 is a diagram for describing a state $z^i_t$ of the foreground #i.

With regard to the state $z^i_t$ of the foreground #i, there are defined a world coordinates system O serving as a coordinates system for expressing, so to speak, an absolute state of the foreground #i in the environment (background), and a local coordinates system O' serving as a coordinates system for expressing the state of the foreground in the foreground model (foreground visible model) regardless of the state of the foreground #i on the world coordinates system O. The local coordinates system O' is defined for each foreground model.

As for the world coordinates system O, for example, there may be employed a two-dimensional coordinates system wherein from the upward to downward direction of the background visible model $\mu^w = \tau^w$ is taken as an $s_1$ axis, and from the left to right direction is taken as an $s_2$ axis, and also, a point on the upper left of the background visible model $\mu^w = \tau^w$ is taken as the origin.

As for the local coordinates system O', for example, there may be employed a two-dimensional coordinates system wherein from the upward to downward direction of the foreground visible model $\mu$(foreground texture model $\tau^i$, foreground shape model $\tau^i$) is taken as an $r_1$ axis, and from the left to right direction is taken as an $r_2$ axis, and also, a point on the upper left of the foreground visible model $\mu$ is taken as the origin.

Note that, with the local coordinates system O', let us say that the rx axis is parallel to the $s_1$ axis, and the $r_2$ axis is parallel to the $s_2$ axis as default (e.g., t=0), for example. In FIG. 4, a two-dimensional coordinates system with a dotted line represents the default local coordinates system O'.

The state $z^i_t$ of the foreground #i includes, for example, a position $s^i_t$ on the world coordinates system O of the mass center of gravity of the foreground #i (foreground visible model $\mu^i$) at the point-in-time t, speed $s^{-i}_t$ of change in the position $s^i_t$, attitude of the foreground #i, and speed $q^{-i}_t$ of change in attitude $q^i_t$, and is expressed with Expression (3).

$$z_t^i = \begin{bmatrix} s_t^i \\ s_t'^i \\ q_t^i \\ q_t'^i \end{bmatrix} \quad (3)$$

Here, as for the attitude $q_t^i$ of the foreground #i, for example, there may be employed an angle (rotation angle) that the axis $r_1$ ($r_2$) of the local coordinates system O' makes up against the axis $s_1$ ($s_2$) of the world coordinates system O.

Figure 5:
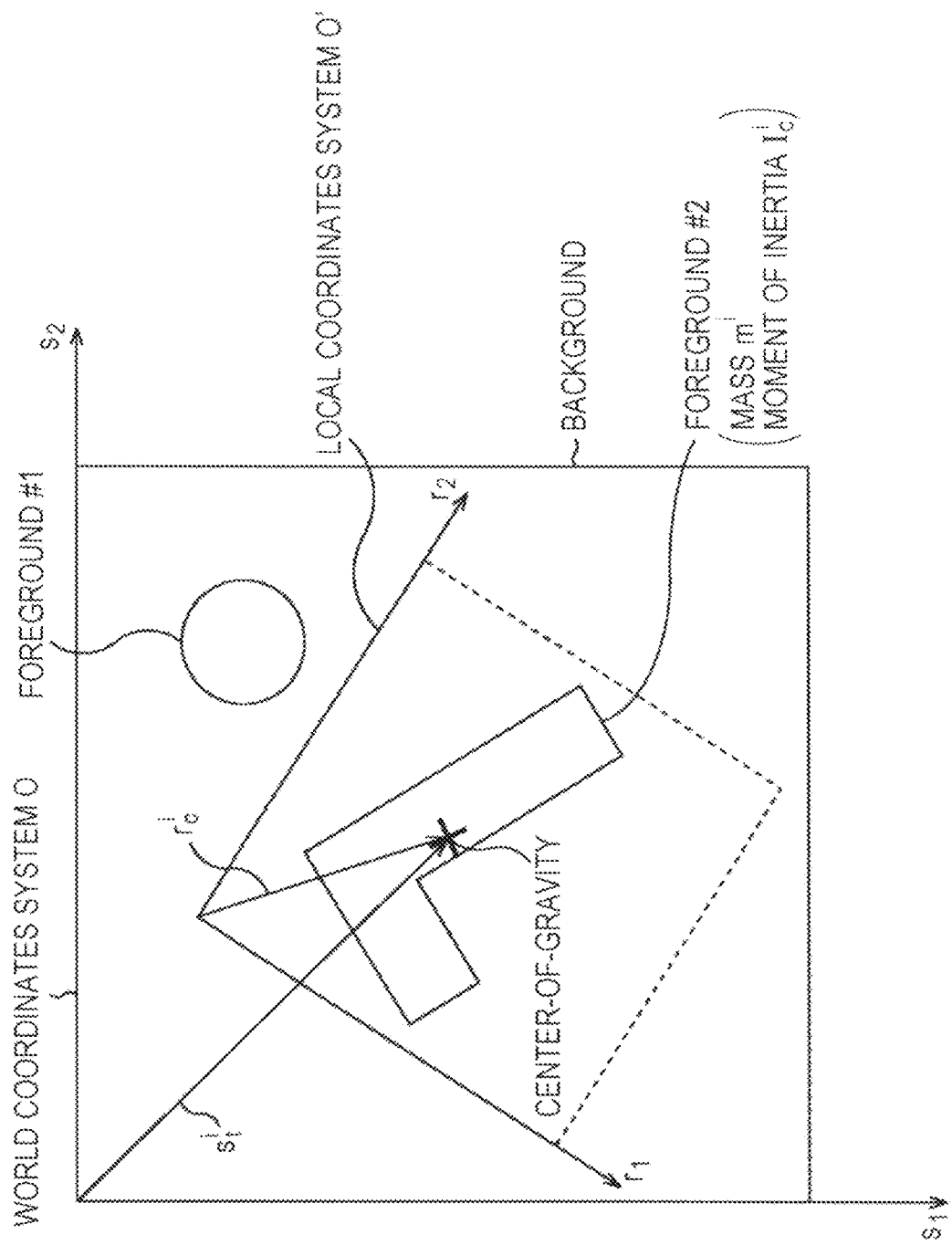
FIG. 5 is a diagram for describing a motion model of the foreground.

FIG. 5 is a diagram for describing a motion model $a^i$ of the foreground #i.

The motion model $a^i$ includes a position $r_c^i$ on the local coordinates system O' of the mass center of gravity (inertial mass) mi that decides the characteristic of motion (translation motion) of the translational component of the foreground #i, and inertial moment $I_c^i$ around center of gravity that decides the characteristic of motion (rotation motion) of the rotation component of the foreground, and is represented with Expression (4).

$$a^i = \begin{bmatrix} r_c^i \\ m^i \\ I_c^i \end{bmatrix} \quad (4)$$

Figure 6:
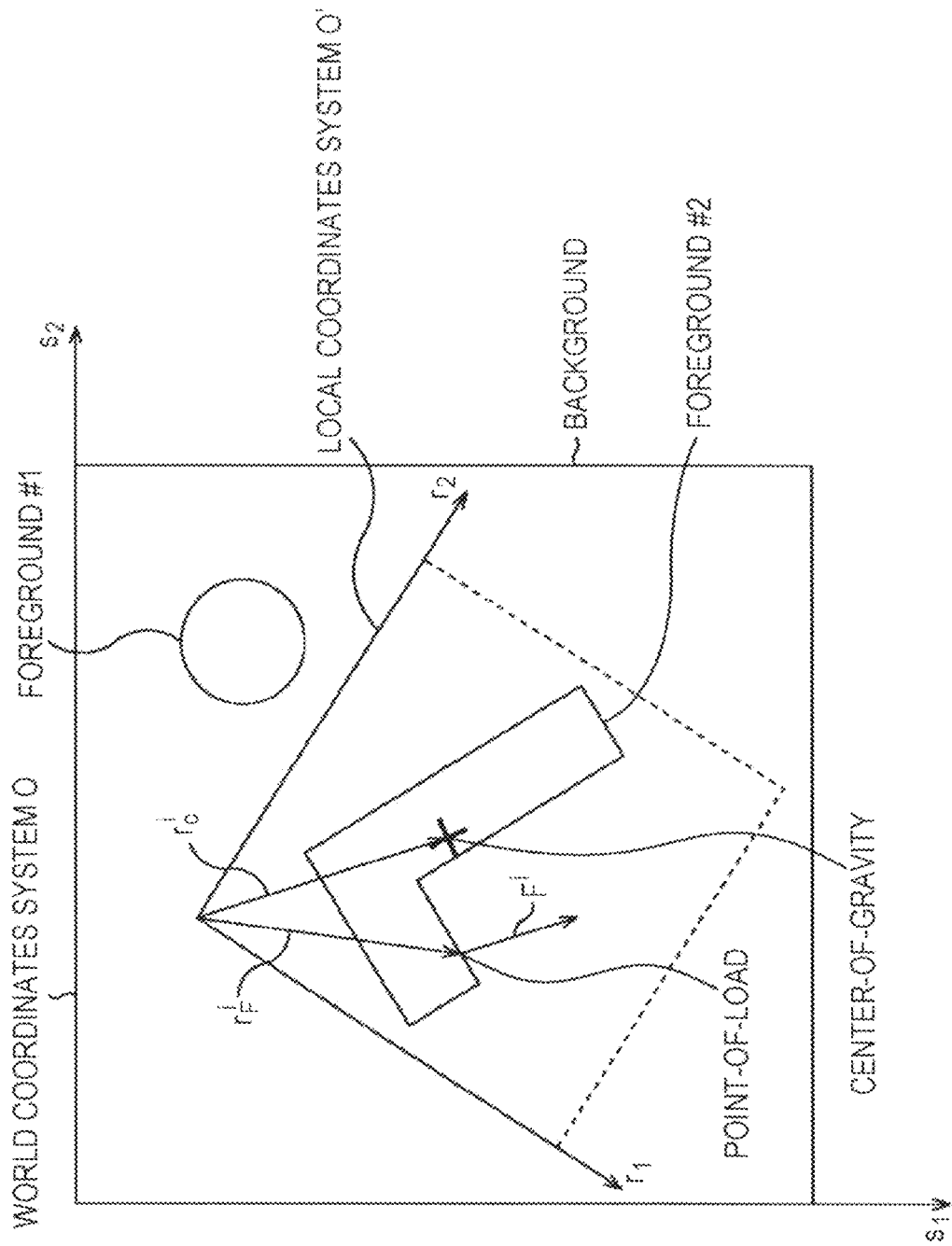
FIG. 6 is a diagram for describing action of the foreground.

FIG. 6 is a diagram for describing action $u_t^i$ of the foreground #i.

The action $u_t^i$ of the foreground #i includes, at the point-in-time t, a position (point of load) $r_F^i$ on the local coordinates system O' where force is applied to the foreground #i, and force $F^i$ applied to the position $r_F^i$ thereof, and is represented with Expression (5).

$$u_t^i = \begin{bmatrix} r_F^i \\ F^i \end{bmatrix} \quad (5)$$

Note that the image observation value $x_t^i$ observed as the foreground #i at the point-in-time t is expressed with Expression (6) using an image expected value $\lambda_t$ to be observed at the generating model at the point-in-time t.

$$x_t^i = \lambda_t \quad (6)$$

Chapter 2. Learning of Foreground Model and Background Model

Section 2-1. Frameworks of Generation Model

Figure 7:
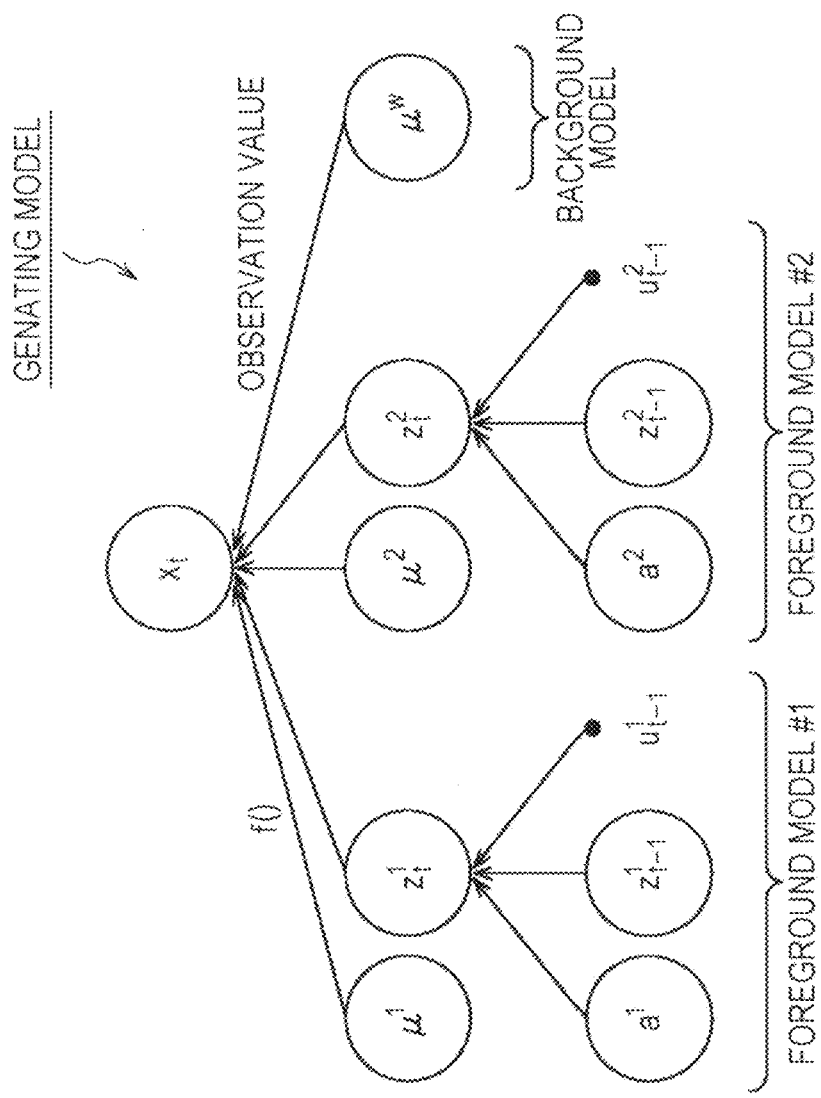
FIG. 7 is a diagram illustrating an example of a graphical model of a generating model which generates an observation image using the foreground model and background model.

FIG. 7 is a diagram illustrating an example of a graphical model of a generating model which generates an observation image.

FIG. 7 is a diagram illustrating an example of a graphical model of a generating model of an image including two foregrounds #1 and #2.

According to the generating model in FIG. 7, a state $z_t^1$ at the point-in-time t of the foreground #1 is decided with a motion model $a^2$ of the foreground #1, a state $z_{t-1}^1$ at the last point-in-time t−1, and action $u_{t-1}^1$ of the foreground #1 at the last point-in-time t#1.

Similarly, a state $z_t^2$ at the point-in-time t of the foreground #2 is decided with a motion model $a^2$ of the foreground #2, a state $z_{t-1}^2$ at the last point-in-time t−1, and action $u_{t-1}^2$ of the foreground #2 at the last point-in-time t−1.

With the generating model, (an image serving as) the foreground visible model $\mu^i$ is superimposed on (an image serving as) the background visible model $\mu^w$ in accordance with the state $z_t^1$ at the point-in-time t of the foreground #1, and also, (an image serving as) the foreground visible model $\mu^2$ is superimposed on (an image serving as) the background visible model $\mu^w$ in accordance with the state $z_t^2$ at the point-in-time t of the foreground #2, thereby generating an observation image $x_t$ to be observed at the point-in-time t.

In FIG. 7, a function f( ) is a function to generate an observation image $x_t$ using the foreground visible model ($\mu^i$, state $z_t^1$ at the point-in-time t of the foreground #1, foreground visible model $\mu^2$, state $z_t^2$ at the point-in-time t of the foreground #2, and background visible model $\mu^w$, and represents the generating model.

Here, the observation image $x_t$ at the point-in-time t generated at the generating model is a random variable (an expected value for an observation value), and the likelihood of the observation image $x_t$ may be obtained by comparison with the observed value $x_t^\sim$ of an actually observed image.

Also, let us say that action $u_t^1$ of the foreground #i is a decisive parameter that may be observed at the agent. This is because, in the event that the foreground #i is the hand of the agent, the agent has to sense action of the hand which is a portion of the own body, and in the event that the foreground #i is an object to be operated, the agent has to be able to sense action of the object to be operated which is in contact with the hand as reaction.

The foreground visible model $\mu^i$, background visible model $\mu^w$, and the state $z^i$ of the foreground #i, and further as appropriate the motion model $a^i$ are, with the present technology, parameters of the generating model which generates an image observation value, and are obtained by learning.

Also, the state $z^i$ of the foreground #i is a latent variable that changes from time to time, the motion model $a^i$, foreground visible model $\mu^i$, and background visible model $\mu^w$ are permanent parameters (model parameters) that do not depend on time.

Now, let us say that the total number of foregrounds is represented with N. In FIG. 7, though two is set as the total number of foregrounds N, a value of one or three or more may be employed as the total number of foregrounds N.

The observation image $x_t$ to be generated at the generating model is decided with the state $z_t^i$ of the foreground #i serving as a latent variable, the foreground visible model $\mu_t^i$ and background visible model $\mu^w$ serving as model parameters, and accordingly, the observation image $x_t$ may be represented with Expression (7) using the function f( ) serving as the generating model.

$$x_t = f(z_t^1, \ldots, z_t^N, \ldots, \mu^N, \mu^w) \quad (7)$$

Section 2-2. EM Algorithm

Figure 8:
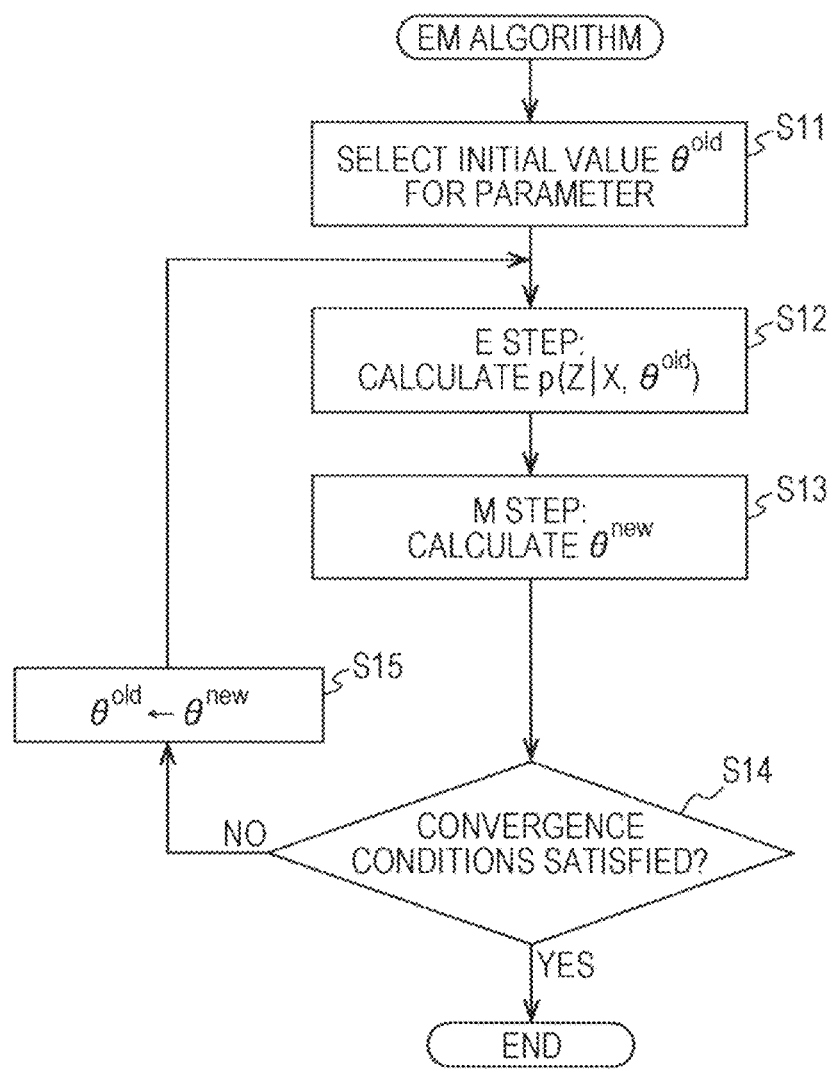
FIG. 8 is a flowchart for describing the EM algorithm.

FIG. 8 is a flowchart for describing the EM algorithm.

As with the generating model illustrated in FIG. 7, examples of a method for obtaining the most-likely solution for the model parameters using an observation value to be actually observed regarding a model including the latent variable ($z_t^i$) include the Expectation-Maximization (EM) algorithm.

Now, let us say that a group of all of the observation values is represented as X, and a group of latent (hidden) variables is represented as Z, respectively.

With observation of the observation value X, the latent variable Z fails to be observed, but the group {X, Z} of the observation value X and latent variable Z is referred to as complete data, and the observation value X is referred to as incomplete data.

Let us say that the complete data {X, Z} is able to be modeled with a model that is a probability distribution, and (a model parameter of) the model thereof is represented with θ.

With the model θ, logarithmic likelihood ln(p(X|θ)) where the observation value X is observed may be obtained by marginalizing likelihood p(X, Z|θ) where the complete data {X, Z} is observed with the latent variable Z, and taking logarithm therefrom, and is represented with Expression (8).

$$\ln p(X|\theta) = \ln\left\{\sum_Z p(X, Z|\theta)\right\} \quad (8)$$

Here, ln represents a natural logarithm.

Also, hereinafter, the same discussion holds regarding a case where the latent variable Z is a consecutive value, by replacing summation (Σ) regarding the latent variable Z with a product.

The incomplete data X alone may be observed, and all of the complete data {X, Z} fail to be observed. Accordingly, the likelihood (function) p(X, Z|θ) of the complete data {X, Z} fails to be used, and accordingly, with the EM algorithm, an expected value for posterior probability regarding the latent variable Z is alternatively considered.

A process to consider an expected value for posterior probability regarding the latent variable Z is the E step of the EM algorithm.

With the EM algorithm, with the model θ, the current model parameter $\theta^{old}$ is employed for calculation of the posterior distribution p(Z|X, θ) of the latent variable Z in the event that the observation value X has been observed, and this posterior distribution p(Z|X, $\theta^{old}$) is employed for calculation of an expected value Q(θ, $\theta^{old}$) of the logarithmic likelihood (hereinafter, also referred to as complete data logarithmic likelihood) ln(p(X, Z|θ)) where the complete data {X, Z} is observed with an optional model parameter θ.

Accordingly, the expected value Q(θ, $\theta^{old}$) is represented with Expression (9).

$$Q(\theta, \theta^{old}) = \sum_Z p(Z|X, \theta^{old}) \ln p(X, Z|\theta) \quad (9)$$

With Expression (9), the expected value Q(θ, $\theta^{old}$) of the complete data logarithmic likelihood ln(p(X, Z|θ)) is calculated using the posterior distribution p(Z|X, $\theta^{old}$) as a probability distribution of the complete data logarithmic likelihood ln(p(X, Z|θ)).

With the EM algorithm, in the E step, as described above, after the expected value Q(θ, $\theta^{old}$) is obtained, in the M step, the model parameter θ is updated from the current model parameter $\theta^{old}$ to a new model parameter $\theta^{new}$ so as to maximize the expected value Q(θ, $\theta^{old}$) in accordance with Expression (10).

$$\theta^{new} = \arg\max_\theta Q(\theta, \theta^{old}) \quad (10)$$

Here, argmax in Expression (10) represents the model parameter θ that maximizes Q(θ, $\theta^{old}$).

Note that, before the first E step is performed, the model parameter θ=$\theta^{old}$ is initialized to a suitable value, for example, using a random number or the like.

The EM algorithm will further be described with reference to FIG. 8.

With the EM algorithm, in step S11, the model parameter θ is initialized to a suitable initial value $\theta^{old}$, and the processing proceeds to step S12.

In step S12, the processing in the E step is performed, and the processing proceeds to step S13. Specifically, in step S12, the posterior distribution p(Z|X, $\theta^{old}$) is obtained using the incomplete data X.

In step S13, processing in the M step is performed, and the processing proceeds to step S14. Specifically, in step S13, a new model parameter $\theta^{new}$ is obtained so as to maximize the expected value Q(θ, $\theta^{old}$) of the complete data logarithmic likelihood ln(p(X, Z|θ)) to be obtained with the posterior distribution p(Z|X, $\theta^{old}$).

In step S14, determination is made whether or not predetermined convergence conditions for ending the EM algorithm are satisfied.

Here, examples of the convergence conditions for ending the EM algorithm may include that the E step and M step have been repeated a predetermined number of times, that the new model parameter $\theta^{new}$ has not scarcely changed from the last model parameter $\theta^{old}$, and that the likelihood of the observation value X observed with the new model parameter $\theta^{new}$ has not scarcely changed from the likelihood of the observation value X observed with the last model parameter $\theta^{old}$.

In the event that determination is made in step S14 that the convergence conditions are not satisfied, the processing proceeds to step S15, where the model parameter θ is updated from the current model parameter $\theta^{old}$ to the new model parameter $\theta^{new}$.

The processing then returns from step S15 to step S12, and the same processing will hereinafter be repeated.

Also, in the event that determination is made in step S14 that the convergence conditions are satisfied, the processing ends.

Section 2-3. Approximation with Particle Filter

Figure 9:
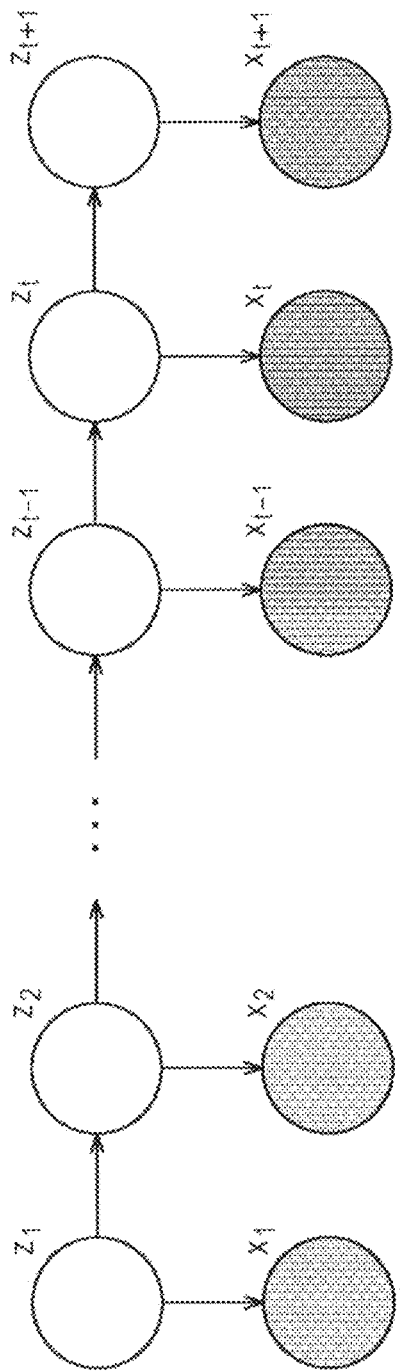
FIG. 9 is a diagram illustrating an example of a graphical model of a model.

FIG. 9 is a diagram illustrating an example of a graphical model of the model 9 which expresses the complete data {X, Z}.

In FIG. 9, series $x_1, x_2, \ldots, x_{t+1}$ of the observation value X are represented with linkages $z_1, z_2, \ldots, z_{t+1}$ of the latent variable Z. The observation values $x_t$ are conditioned with the value (state) of the corresponding latent variable $z_t$.

In the event that the model θ is a model which makes it difficult to analytically calculate the E step of the EM algorithm, the E step may be calculated with the approximation reasoning method based on numerical sampling (Monte Carlo sampling).

The Monte Carlo sampling has been described in CM. Bishop, "Pattern Recognition and Machine Learning" Second volume Statistical Prediction by Bayers' Theorem, Springer Japan, 2008, pp. 364-365, Michael Isard and Andrew Blake, CONDENSATION-conditional density propagation for visual tracking, Int. J. Computer Vision, 29, 1, 5-28, 1988, and so forth.

In the event that the latent variable Z is a consecutive value, the expected value Q(θ, $\theta^{old}$) of the complete data logarithmic likelihood ln(p(X, Z|θ)) is represented with Expression (11) where the summation (S) in Expression (9) has been repressed with a product.

$$Q(\theta, \theta^{old}) = \int p(Z|X, \theta^{old}) \ln p(Z, X|\theta) dZ \quad (11)$$

The expected value Q(θ, $\theta^{old}$) in Expression (11) may be approximated as indicted in Expression (12) with the finite sum of L samples $Z^{(l)}$ (l=1, 2, ... L) of the latent variable Z sampled from the current posterior distribution $p(Z|X, \theta^{old})$ using a sampling method.

$$Q(\theta, \theta^{old}) \cong \sum_{l=1}^{L} \ln p(Z^{(l)}, X | \theta) \quad (12)$$

The expected value $Q(\theta, \theta^{old})$ obtained in accordance with Expression (12) may be optimized by the normal M step (the model parameter $\theta = \theta^{new}$ to maximize the expected value $Q(\theta, \theta^{old})$ may be obtained).

As described above, the EM algorithm to obtain the model parameter $\theta = \theta^{new}$ that maximizes the expected value $Q(\theta, \theta^{old})$ obtained in accordance with Expression (12) is called the Monte Carlo EM algorithm.

On the other hand, as a technique for successively performing sampling for the series $x_1, x_2, \ldots, x_t$ of the observation value X, there is the sequential Monte Carlo algorithm called a particle filter.

Figure 10:
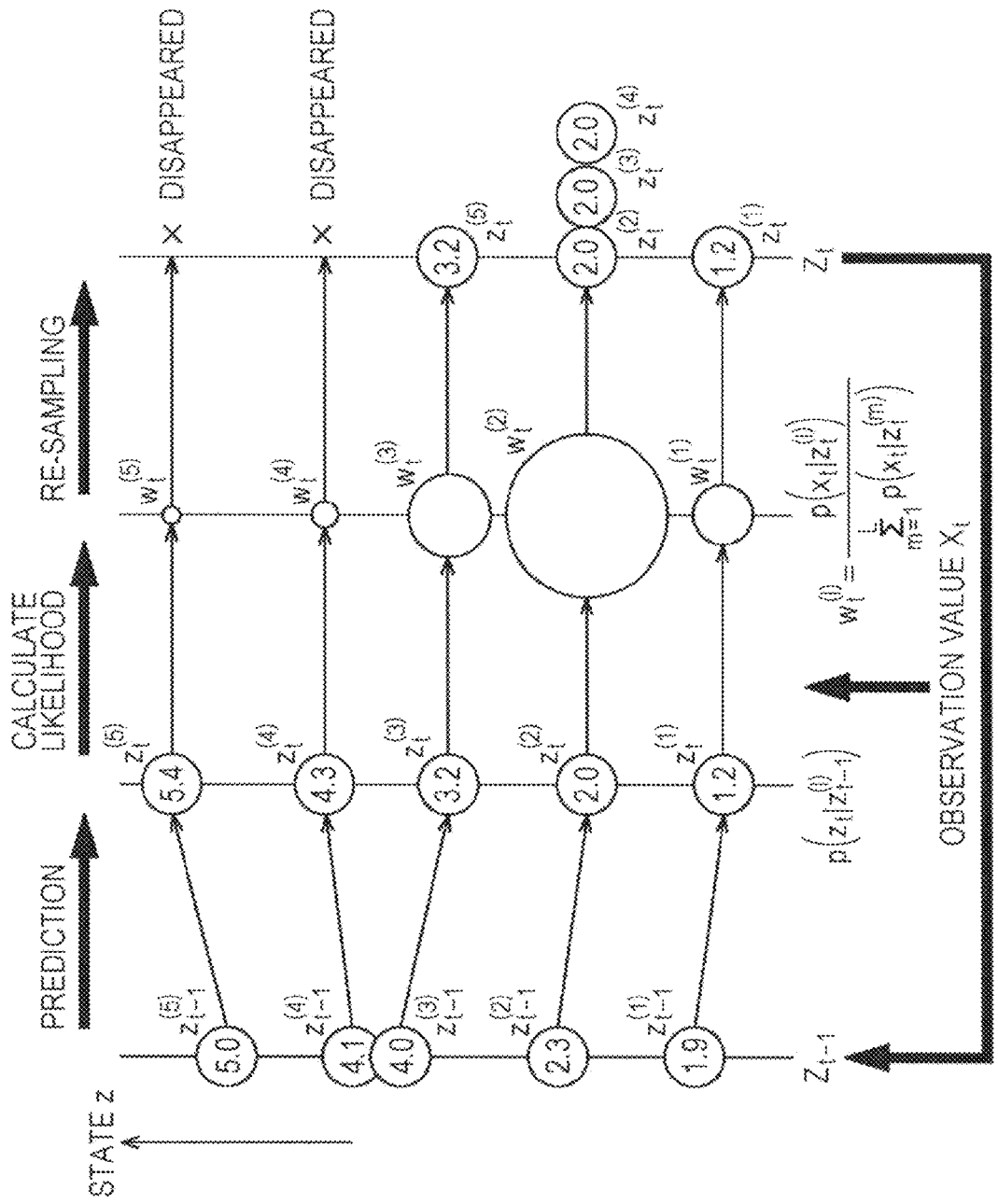
FIG. 10 is a diagram for describing a particle filter.

FIG. 10 is a diagram for describing a particle filter.

With a particle filter, for example, with the model $\theta$ expressed with the graphical model illustrated in FIG. 9, series $X_t = \{x_1, x_2, \ldots, x_{t-1}\}$ of the observation value X are observed until point-in-time t−1, and L states $z^{(1)}_t$, ($z^{(1)}_t$, $z^{(2)}_t$, ... $z^{(L)}_t$) are sampled from the posterior distribution $p(z_t|X_{t-1})$ in the state $z_t$ (becoming the state $z_t$) at the point-in-time t. This sampled sample (here, the state $z^{(1)}_t$) is called a particle.

With the state $z_t$ at the point-in-time t, the expected value $E[f(z_t)]$ of the observation value $x_t = f(z_t)$ observed in accordance with FIG. 7 and the function f( ) serving as the generating model in Expression (7) may be approximated with Expression (13) using the particle in the state $z_t$ (state particle) $z^{(1)}_t$.

$$E[f(z_t)] \cong \sum_{l=1}^{L} w_t^{(l)} f(z_t^{(l)}) \quad (13)$$

Here, $w^{(1)}_t$ represents weighting of the particle $z^{(1)}_t$. The weighting $w^{(1)}_t$ is a value corresponding to the (observation) likelihood $p(x_t|z^{(1)}_t)$ where the observation value $x_t$ is observed in the state $z^{(1)}_t$ (serving as a particle), and is defined with Expression (14).

$$w_t^{(l)} = \frac{p(x_t | z_t^{(l)})}{\sum_{m=1}^{L} p(x_t | z_t^{(m)})} \quad (14)$$

Note that the weighting $w^{(1)}_t$ is a value within a range represented with Expression $0 \leq w^{(1)}_t \leq 1$, and satisfies Expression $w^{(1)}_t + w^{(2)}_t + \ldots + w^{(L)}_t = 1$.

Now, in the event that L particles $z^{(1)}_t$ to $z^{(L)}_t$ and the weighting $w^{(1)}_t$ to $w^{(L)}_t$ were obtained at the point-in-time t, when the observation value $x_{t+1}$ was observed at the point-in-time t+1, the series $X_t = \{x_1, x_2, \ldots x_t\}$ of the observation value X are observed until the point-in-time t, and the posterior distribution $p(z_{t+1}|X_t)$ that is in the state $z_{t+1}$ at the point-in-time t+1 may be obtained with Expression (15) using transition probability $p(z_{t+1}|z^{(1)}_t)$ that the state $z^{(1)}_t$ at the point-in-time t will change to the state $z_{t+1}$ at the point-in-time t+1, and the weighting $w^{(1)}_t$ of the particle $z^{(1)}_t$.

$$p(z_{t+1} | X_t) \cong \sum_{l=1}^{L} w_t^{(l)} p(z_{t+1} | z_t^{(l)}) \quad (15)$$

The posterior distribution $p(z_{t+1}|X_t)$ in Expression (15) is a mixed distribution with the weighting $w^{(1)}_t$ as a mixed coefficient, and with the particle filter, re-sampling to select the particle $z^{(1)}_t$ is performed with probability corresponding to the weighting $w^{(1)}_t$ serving as a mixed coefficient.

The particle filter will further be described with reference to FIG. 10.

With the particle filter, the series $X_{t-1} = \{x_1, x_2, \ldots, X_{t-1}\}$ of the observation value X are observed until the point-in-time t−1, the posterior distribution $p(z_t|X_{t-1})$ that is in the state $z_t$ at the point-in-time t is represented with samples by the L particles $z^{(1)}_{t-1}$ to $z^{(L)}_{t-1}$ and weighting $w^{(1)}_{t-1}$ to $w^{(L)}_{t-1}$.

Here, in FIG. 10, the number L of the particles $z^{(1)}_t$ is 5.

With the particle filter, in order to obtain sample expression at the next point-in-time t, based on the transition probability $(z_t|z^{(1)}_{t-1})$ of the mixed distribution (posterior distribution) $p(z_t|X_{t-1})$ in Expression (15), a transition destination at the next point-in-time t of the L particles $z^{(1)}_{t-1}$ to $z^{(L)}_{t-1}$ at the point-in-time t−1 is calculated, i.e., the L particles $z^{(1)}_t$ to $z^{(L)}_t$ at the next point-in-time t are predicted (generated).

Here, in FIG. 10, round marks represent particles. Also, a number within a round mark representing a particle indicates an example of the value of the state $z^{(1)}_t$ serving as the particle thereof.

In FIG. 10, for example, though the number of a round mark representing the state $z^{(5)}_{t-1}$ serving as a particle at the point-in-time t−1 is 5.0, the number of a round mark representing the state $z^{(5)}_{t-1}$ serving as a particle at the point-in-time t predicted based on the transition probability $p(z_t|z^{(5)}_{t-1})$ is 5.4.

After the L particles $z^{(1)}_t$ to $z^{(L)}_t$ at the next point-in-time t are predicted, at the particle filter, the observation likelihood $p(x_t|z^{(1)}_t)$ where the observation value $x_t$ is observed at the particle $z^{(1)}_t$, is calculated with the observation value $x_t$ at the point-in-time t.

Further, with the particle filter, the weighting $w^{(1)}_t$ of the particle $z^{(1)}_t$ is obtained in accordance with Expression (14) using the observation likelihood $p(x_t|z^{(1)}_t)$. In FIG. 10, a round mark representing the weighting $w^{(1)}_t$ is illustrated with a size equivalent to the value of the weighting $w^{(1)}_t$ thereof.

Thereafter, with the particle filter, the particle $z^{(1)}_t$ is sampled with probability corresponding to the weighting $w^{(1)}_t$.

With the particle filter, similar processing is repeated using the re-sampled particle $z^{(1)}_t$ thereof along with the weighting $w^{(1)}_t$ as sample expression of the posterior distribution $p(z_{t+1}|X_t)$ existing in the state $z_{t+1}$ at the point-in-time t+1 after the series $X_t = \{x_1, x_2, \ldots, x_t\}$ of the observation value X are observed until the point-in-time t.

Note that, with re-sampling, the weighting $w^{(1)}_t$ is small since the particle $z^{(1)}_t$ is sampled with probability corresponding to the weighting $w^{(1)}_t$, and accordingly, the particle $z^{(1)}_t$ which has not sampled at all disappears.

Also, with re-sampling, the particle $z^{(1)}_t$ of which the weighting $w^{(1)}_t$ is great may be sampled more than once, and in this case, the particle having the same value (state) as with the particle $z^{(1)}_t$ is copied by the same number as with the number of times of sampling.

As described above, with re-sampling, though there may be generated multiple particles having the same value V as with the particle $z^{(1)}_t$, the value of each of the multiple particles is scattered around the same value V when prediction (calculation of a transition destination) of the particles at the next point-in-time t is performed, based on the transition probability $p(z_{t+1}|z^{(1)}_t)$ in Expression (15), and becomes a different value.

Here, examples of a re-sampling method for sampling the particle $z^{(1)}_t$ with probability corresponding to the weighting $w^{(1)}_t$ include the roulette method, and a method called equidistant sampling.

Figure 11:
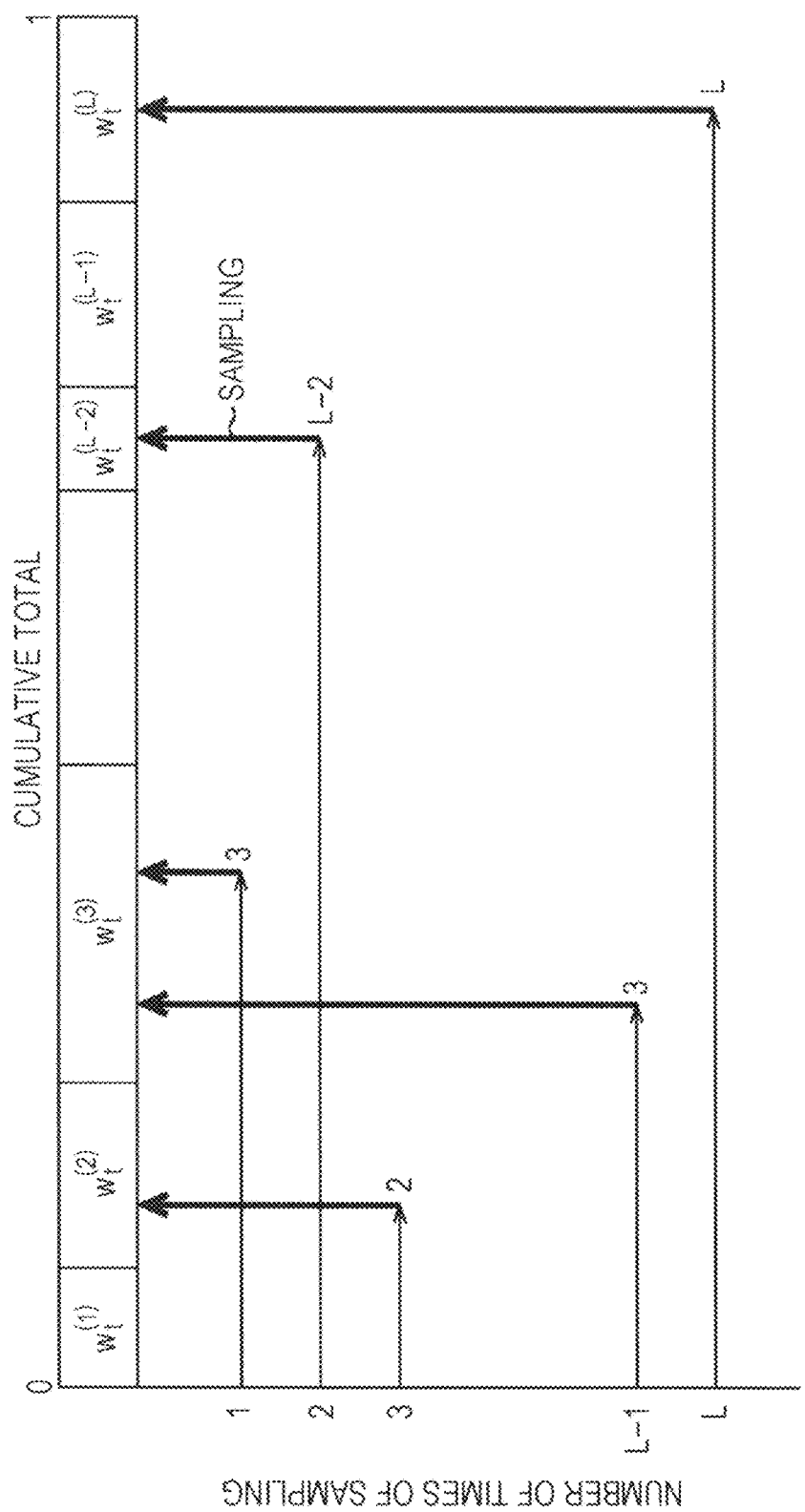
FIG. 11 is a diagram for describing the roulette method.

FIG. 11 is a diagram for describing the roulette method.

With the roulette method, a range of 0 to 1 is sequentially assigned to the L weighting $w^{(1)}_t, w^{(2)}_t, \ldots, w^{(L)}_t$. Width proportional to the size of the weighting $w^{(1)}_t$ of a range of 0 to 1 is assigned to the weighting $w^{(1)}_t$.

With the roulette method, it is repeated until the number of times of sampling becomes the same as the total number L of particles that a value within a range of 0 to 1 is sampled with a random number, and a particle corresponding to the weighting $w^{(1)}_t$ to which the sampled value thereof has been assigned is copied.

Figure 12:
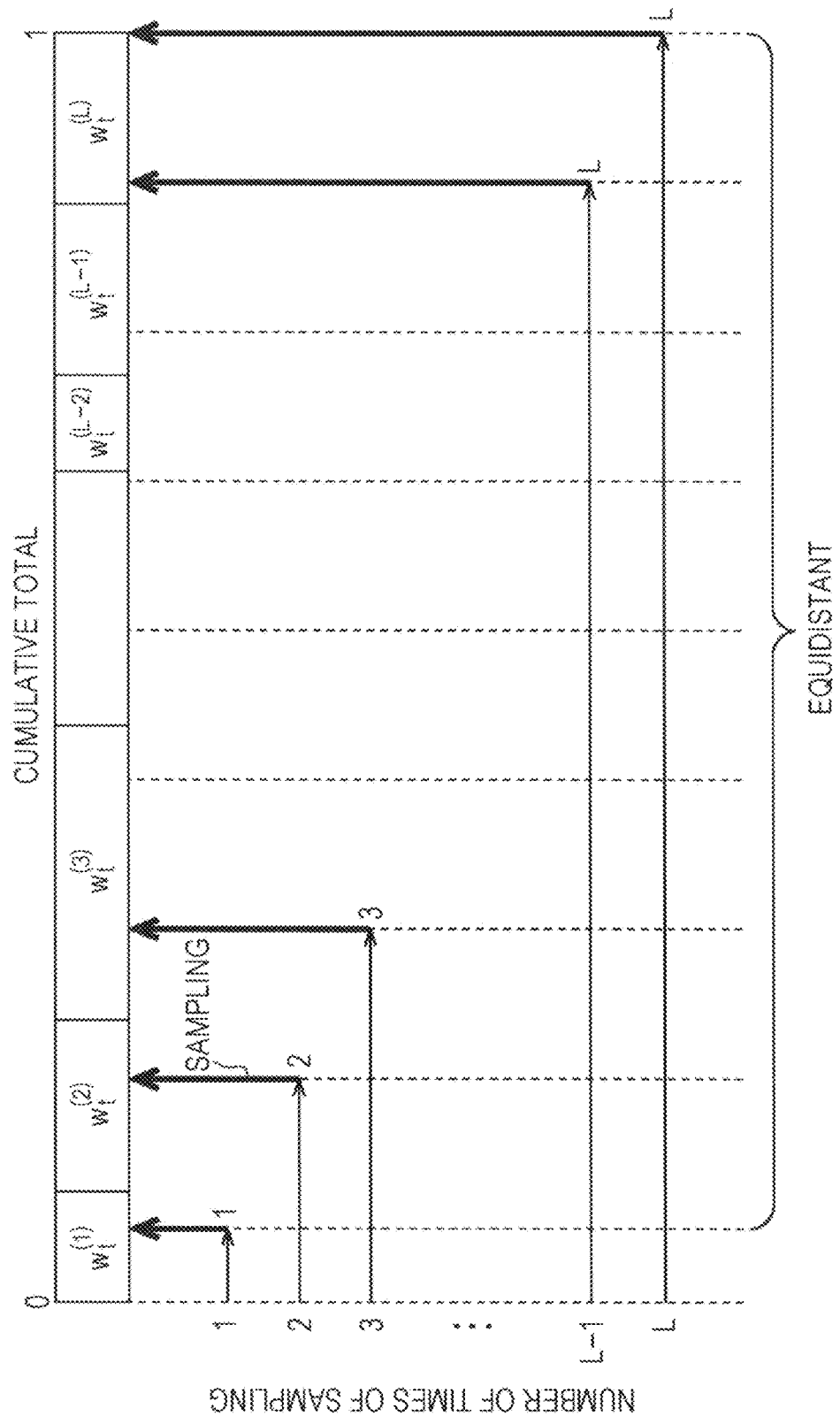
FIG. 12 is a diagram for describing equidistant sampling.

FIG. 12 is a diagram for describing equidistant sampling.

With equidistant sampling, as with the roulette method, a range of 0 to 1 is assigned to the L weighting $w^{(1)}_t, w^{(2)}_t, \ldots, w^{(L)}_t$.

With equidistant sampling, a value within a range of 0 to 1 is sampled with a random number, and a particle corresponding to the weighting $w^{(1)}_t$ to which the sampled value thereof has been assigned is copied.

Thereafter, with equidistant sampling, it is repeated until the number of times of sampling becomes the same as the total number L of particles that of a value within a range of 0 to 1, a value obtained by adding a predetermined value to the last sampled value is sampled, and a particle corresponding to the weighting $w^{(1)}_t$ to which the sampled value thereof has been assigned is copied.

Note that, in the event that the value obtained by adding a predetermined value to the last sampled value exceeds 1, a value below a decimal point of the value thereof is sampled.

With the roulette method, L random numbers have to be calculated, and on the other hand, with equidistant sampling, only one random number has to be calculated, and accordingly, equidistant sampling is small in random number calculation cost as compared to the roulette method.

Chapter 3. Specific Implementation

Section 3-1. Implementation of Generation Model

Figure 13:
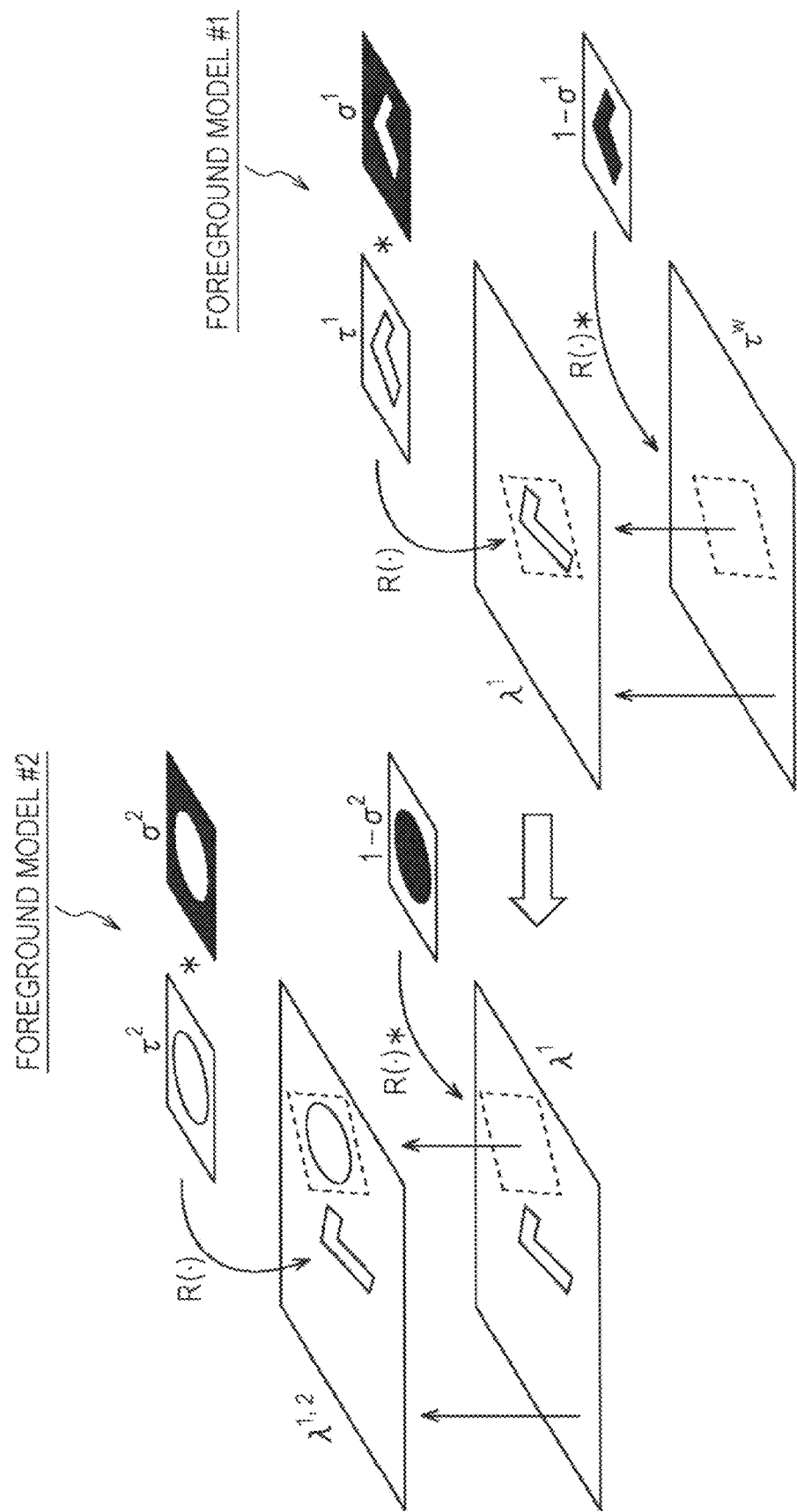
FIG. 13 is a diagram illustrating an example of implementation of a generating model which generates an observation image using the foreground model and background model.

FIG. 13 is a diagram illustrating an example of implementation of the generating model θ which generates an observation image, i.e., the function f( ) in Expression (7) using the foreground model #i and background model.

With the generating model, the foreground model $\mu^i$ is superimposed on the background visible model $\mu^w$ with a position $s^i_t$ and attitude $q^i_t$ that the state $z^1_t$ represents.

With superimposition of the foreground visible model $\mu^i$ on the background visible model $\mu^w$, α blending is performed between (texture represented with) a background texture model $\tau^w$ serving as the background visible model $\mu^w$, and a foreground texture model $\tau^i$ of the foreground visible model $\mu^i$ using a foreground shape model $\sigma^i$ of the foreground visible model $\mu^i$ as an α value.

For example, now, if we say that the first foreground #1 alone exists in the observation image $x_t$, there is represented with Expression (16) an expected value $\lambda^1(z^1_t, \mu^1, \mu^w)$ of the observation image $X_t$ where the single foreground #1 alone exists, to be observed at the generating model where model parameters (foreground visible model $\mu^i$, background visible model $\mu^w$, the state $z^i$ of the foreground #i, and if necessary motion model $a^i$) have been obtained.

$$\lambda^1(z^1_t, \mu^1, \mu^w) = \qquad(16)$$

$$\lambda^1_t(r'^1_t) = \begin{cases} (1-\sigma^1(r^1))\tau^w(r'^1_t) + \sigma^1(r^1)\tau^1(r^1) & \text{if } r^1 \in \mu^1 \\ \tau^w(r'^1_t) & \text{else} \end{cases}$$

Here, $\sigma^1(r^1)$ represents a pixel value of a point $r^1$ on the local coordinates system O' of the foreground shape model $\sigma^1$, $\tau^1(r^1)$ represents a pixel value of a point $r^1$ on the local coordinates system O' of the foreground texture model $\tau^1$. Further, $\tau^w(r'^1_t)$ represents a pixel value of a point $r'^1_t$ on the world coordinates system O of the background texture model $\tau^w$.

Also, a point $r'^i_t$ obtained by adding a dash (') and an index t of point-in-time to a point $r^i$ on the local coordinates system O' represents a point (corresponding point) on the world coordinates system O corresponding to the point $r^i$ on the local coordinates system O' at the point-in-time t.

For example, if we say that a mapping function for mapping a point A on the local coordinates system O' in the event that the local coordinates system O' is rotated around the origin of the world coordinates system O by an angle B in the corresponding point on the world coordinates system O is represented with R(A, B), the point $r'^i_t$ on the world coordinates system O corresponding to the point $r^i$ on the local coordinates system O' is represented with Expression (17) using the mapping function R( ).

$$r'^i_t = s^i_t + R(r^i - r^u_c, q^i_t) \qquad(17)$$

According to Expression (16), in the event that the point $r^1$ on the local coordinates system O' is a point on the foreground visible model $\mu^1$ (the image serving as the foreground texture model $\tau^i$ or foreground shape model $\sigma^1$) ($r^1 \in \mu^1$), as for the pixel value $\lambda^1_t(r^1)$ of the corresponding point $r'^1_t$ of the point $r^1$ thereof, there is employed a value $(1-\sigma^1(r^1))\tau^w(r'^1_t)+\sigma^1(r^1)\tau^1(r^1)$ obtained by performing α blending between the pixel value $\tau^w(r'^1_t)$ of the corresponding point $r'^1_t$ of the background texture model $\tau^w$ and the pixel value $\tau^1(r^1)$ of the point $r^1$ of the foreground texture model $\tau^1$ using the pixel value $\sigma^1(r^1)$ of the point $r^1$ of the foreground shape model $\sigma^1$ as an α value.

Further, according to Expression (16), in the event that the point $r^1$ on the local coordinates system O' is not a point on the foreground visible model $\mu^1$, as for the pixel value $\lambda^1_t(r'^1_t)$ of the corresponding point $r'^1_t$ of the point $r^1$, the pixel value $\tau^w(r'^1_t)$ of the corresponding point $r'^1_t$ of the background texture model $\tau^w$ is employed.

In the event that there are multiple foregrounds (in the event that there are multiple foreground models) in the observation image $x_t$, the same processing as with a case where the first foreground #1 alone exists in the observation image $x_t$ is repeatedly performed on each of the multiple foregrounds, an expected value of the observation image $x_t$ where the multiple foregrounds exist to be observed at the generating model may be obtained.

However, in the event that there are multiple foregrounds in the observation image $x_t$, the expected value of the observation image $x_t$ obtained regarding the last foreground is employed instead of the background texture model $x_w$ (background visible model $\mu^w$) regarding the second foreground and thereafter.

Accordingly, for example, now, if we say that two foregrounds #1 and #2 exist in the observation image $x_t$, as illustrated in FIG. 13, first, the expected value $\lambda^1(z^1_t, \mu^1, \mu^w)$ of the observation image $x_t$ where the first foreground #1 alone exists to be observed at the generating model is obtained in accordance with Expression (16).

An expected value $\lambda^{1,2}(z^1_t, z^2_t, \mu^1, \mu^2, \mu^w)$ of the observation image $x_t$ where the first foreground #1 and second foreground #2 exist is obtained, as illustrated in FIG. 13, using the expected value $\lambda^1(z^1_t, \mu^1, \mu^w)$ of the observation image $x_t$ obtained regarding the foreground #1 in Expression (16) instead of the background texture model $\tau^w$ in the same way as with the expected value $\lambda^1(z^1_t, \mu^1, \mu^w)$ of the observation image $x_t$.

Specifically, the expected value $\lambda^{1,2}(z^1_t, z^2_t, \mu^1, p^2, p^w)$ of the observation image $x_t$ where the first foreground #1 and second foreground #2 exist is obtained in accordance with Expression (18).

$$\lambda^{1,2}(z^1_t, z^2_t, \mu^1, \mu^2, \mu^w) = \qquad (18)$$

$$\lambda^{1,2}_t(r'^2_t) = \begin{cases} (1-\sigma^2(r^2))\lambda^1_t(r'^2_t) + \sigma^2(r^2)\tau^2(r^2) & \text{if } r^2 \in \mu^2 \\ \lambda^1_t(r'^2_t) & \text{else} \end{cases}$$

Here, of the pixel values of images serving as the expected value $\lambda^{1,2}(z^1_t, z^2_t, \mu^1, p^2, p^w)$ of the observation image $x_t$ where the first foreground #1 and second foreground #2 exist, $\lambda^{1,2}_t(r'^2_t)$ represents the pixel value of the corresponding point $r'^2_t$ on the world coordinates system O of the point $r^2$ on the local coordinates system O' (of the foreground #2).

Even when there are N foregrounds equal to or greater than three foregrounds, an expected value $\lambda^{1,2,\ldots,N}(z^1_t, z^2_t, \ldots, z^N_t, \mu^1, \mu^2, \ldots, \mu^N, \mu^w)$ of the observation image $x_t$ where the N foregrounds exist may be obtained in the same way.

Section 3-2. Estimation of State of Foreground When One Foreground Exists (E step)

Description will be made regarding specific implementation of the E step using the particle filter described in Section 2-3 in the event that there is one foreground.

Note that the number of foregrounds is here one, and accordingly, description of the index i representing the i-th foreground will be omitted.

With the E step in the EM algorithm, the posterior distribution $p(Z|X, \theta^{old})$ of the latent variable Z is obtained using the model parameter $\theta=\theta^{old}$ updated in the last M step, and the expected value $Q(\theta, \theta^{old})$ of the complete data logarithmic likelihood $\ln(p(X, Z|\theta))$ is calculated in accordance with Expression (9) using this posterior distribution $p(Z|X, \theta^{old})$.

In the event that the particle filter has been applied to this E step, the posterior distribution $p(z_{t+1}|X_t)$ of the latent variable $z_{t+1}$ at the point-in-time t+1 when the series $X_t=\{x_1, x_2, \ldots, x_t\}$ of the observation value X are observed by the point-in-time t may be calculated in accordance with Expression (15).

Here, according to Expression (14), the weighting $w^{(1)}_t$ in Expression (15) is proportional to the observation likelihood $p(x_t|z^{(1)}_t)$ where the observation value $x_t$ is observed in the sate $z^{(1)}_t$ serving as a particle.

Accordingly, in order to obtain the weighting $w^{(1)}_t$, the observation likelihood $p(x_t|z^{(1)}_t)$ has to be obtained.

With the present technology, assuming that the state of the foreground is in the state $z^{(1)}_t$ serving as a particle, the expected value $\lambda_t$ of the observation image $x_t$ to be observed at the generating model is generated in accordance with the state $z^{(1)}_t$ serving as the particle thereof.

With the present technology, error for an image $\tilde{\lambda}_t$ actually observed of the expected value $\lambda_t$ of the observation image $x_t$ to be observed at the generating model (distance between the expected value $\lambda_t$ and the image $\tilde{\lambda}_t$) is obtained as the observation likelihood $p(x_t|z^{(1)}_t)$.

Specifically, with the present technology, the observation likelihood $p(x_t|z^{(1)}_t)$ is obtained, for example, in accordance with Expression (19).

$$p(x_t | z^{(l)}_t) = K\exp\left(-\frac{\sum_s \|\lambda_t(s) - \tilde{\lambda}_t(s)\|^2}{\sigma^2}\right) \qquad (19)$$

Note that $\lambda_t(s)$ represents the pixel value of a point s on the world coordinates system O of an image with the expected value $\lambda_t$ of the observation image $x_t$ to be observed at the generating model $\theta$, and $\tilde{\lambda}_t(s)$ represents the pixel value of a point s on the world coordinates system O of the image $\tilde{\lambda}_t$ actually observed at the point-in-time t.

Also, with Expression (19), K and $\sigma^2$ are predetermined constants, and are determined beforehand.

On the other hand, probability that the state $z^{(1)}_t$ serving as a particle at the point-in-time t will become the state $z_{t+1}$ at the next point-in-time t+1, i.e., if we say that the transition probability $p(z_{t+1}|z^{(1)}_t)$ serving as a particle follows a Gauss distribution (normal distribution), the transition model of the state $z^{(1)}_t$ serving as a particle may be represented with Expression (20), for example.

$$z_{t+1} = \begin{bmatrix} s_{t+1} \\ \dot{s}_{t+1} \\ q_{t+1} \\ \dot{q}_{t+1} \end{bmatrix} = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix} \begin{bmatrix} s_t \\ \dot{s}_t \\ q_t \\ \dot{q}_t \end{bmatrix} + \begin{bmatrix} N(0, \Sigma_s) \\ N(0, \Sigma_{\dot{s}}) \\ N(0, \Sigma_q) \\ N(0, \Sigma_{\dot{q}}) \end{bmatrix} \qquad (20)$$

Here, $\Delta t$ represents interval (time) between the point-in-time t and the next point-in-time t+1, and N(A, B) represents a Gauss distribution where the average vector (average value) is A, and a variance covariance matrix (variance) is B.

In Expression (20), any of Gauss distributions N $(0, \Sigma_s)$, N $(0, \Sigma_s\bullet)$, N $(0, \Sigma_q)$, and N $(0, \Sigma q\bullet)$ is a Gauss distribution where the average vector is 0. Also, the variance covariance matrices $\Sigma_s$, $\Sigma_s\bullet$, $\Sigma_q$, and $\Sigma_q\bullet$ are determined beforehand.

According to the transition model in Expression (20), the state $z_{t+1}$ at the point-in-time t+1 is obtained (predicted) (a transition destination is calculated) assuming that the state serving as a particle has a component that makes the transition in accordance with the position $s_t$ and attitude $q_t$ serving as the state at the pervious point-in-time t, and the one-time derivative value (speed) $\dot{s}_t$ and $\dot{q}_t$ thereof, and also makes the transition with stochastic fluctuation in accordance with the Gauss distribution of a predetermined variance covariance matrix where the average vector is 0.

Here, with the transition model in Expression (20), it is not taken into consideration that foreground motion follows a kinetics model for rigid motion.

In the event of considering that foreground motion follows a kinetics model for rigid motion, the transition model of the state $z^{(1)}_t$ serving as a particle may be represented with Expression (21) using a foreground motion model a and foreground action $u_t$, for example.

$$z_{t+1} = \begin{bmatrix} s_{t+1} \\ s'_{t+1} \\ q_{t+1} \\ q'_{t+1} \end{bmatrix} = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix} \begin{bmatrix} s_t \\ s'_t \\ q_t \\ q'_t \end{bmatrix} + \Delta t \begin{bmatrix} 0 \\ \gamma/m \\ 1 \\ \phi/I_c \end{bmatrix} + \begin{bmatrix} N(0, \Sigma_s) \\ N(0, \Sigma_{s'}) \\ N(0, \Sigma_q) \\ N(0, \Sigma_{q'}) \end{bmatrix} \quad (21)$$

Here, $\gamma$ and $\Phi$ represent, in the event that force F serving as a component of the foreground action $u_t$ (Expression (5)) has been applied to a position $r_F$ of a foreground similarly serving as a component of the foreground action $u_t$, translation force at the position of the center of gravity $r_c$ of the foreground and torque of the circumference of the center of gravity $r_c$.

The translation force $\gamma$ is equal to the force F serving as a component of the foreground action $u_t$. The torque $\Phi$ is may be obtained in accordance with Expression $\Phi=(r_F-r_c)\times F$ using the force F serving as a component of the foreground action $u_t$, the foreground position $r_F$ serving as a component of the foreground action $u_t$, and (the position of) the foreground center of gravity $r_c$ serving as a component of the foreground motion model a.

Also, in Expression (21), m and $I_c$ represent foreground mass m (of the corresponding object) serving as a component of the foreground motion model a (Expression (4)), and moment of inertia $I_c$ around the center of gravity.

The transition model in Expression (21) may strictly express the transition (change) of the foreground state since it is considered that the foreground action follows a kinetics model for rigid motion.

In the event that it may be assumed as premise knowledge that the foreground consecutively moves on the background, i.e., in the event that it may be assumed that the foreground state consecutively changes within an environment, preliminary knowledge that the transition models in Expressions (20) and (21) takes as a premise effectively functions such that based on information of the previous point-in-time, neighborhood is randomly searched with noise of a Gauss distribution while conclusively predicting the state of the next point-in-time using the motion model.

As a result thereof, with a process of re-sampling of a particle, calculation of state estimation for a state that a foreground becomes with low possibility may be omitted, e.g., as compared to a method for sectioning a background serving as an environment in a grid shape, and estimating, regarding all of the grid points, whether or not there is a foreground in the positions of the gird points thereof, scalability may be increased.

Section 3-3. Estimation of Foreground State When Multiple Foregrounds Exist (E step)

Description will be made regarding specific implementation of the E step using the particle filter described in Section 2-3 in the event that multiple foregrounds exist.

In the event that multiple foregrounds exist, for each foreground #i there is the state $z^i_t$ of that foreground #i. The l-th particle of the state $z^i_t$ of the foreground #i is represented as $z^{i(1)}_t$. Also, the weighting of the particle $z^{i(1)}_t$ is represented as $w^{i(1)}_t$.

With the present technology, (the expected value $\lambda_t$ of) the observation image $x_t$ observed at the generating model is generated as described in Expression (16) to Expression (18).

In order to calculate the observation likelihood $p(x_t|z^{i(1)}_t)$ used for calculation of Expression (14) to obtain the weighting $w^{i(1)}_t$ of a particle at the particle filter, the expected value $\lambda_t$ of the observation image $x_t$ to be observed at the generating model has to be calculated using, with regard to the foreground #i of interest, the state $z^{i(1)}_t$ serving as a particle to obtain the weighting $w^{i(1)}_t$, and also, with regard to a foreground other than the foreground #i of interest, using a distribution of the particle of the state of the foreground thereof, and the weighting of each particle.

However, in addition to the particle $z^{i(1)}_t$ of the state $z^i_t$ of the foreground #i of interest, in the event of calculating the expected value $\lambda_t$ of the observation image $x_t$ to be observed at the generating model using a distribution of the particle of the state of a foreground other than the foreground #i of interest and the weighting of each particle, this increases calculation cost.

Therefore, with the present embodiment, with regard to multiple foregrounds, independently, i.e., without considering a foreground other than the foreground #i of interest, assuming that the foreground #i of interest alone exists on the background, thereby realizing speed-up of calculation while sacrificing stringency with a range having no practical problem.

In the event of assuming that the foreground #i of interest alone exists on the background, the observation likelihood $p(x^i_t|z^{i(1)}_t)$ when the foreground #i of interest is in the state $z^{i(1)}_t$ serving as a particle may be calculated in accordance with Expression (22).

$$p(x^i_t | z^{i(l)}_t) = K\exp\left(-\frac{\sum_s \|\lambda^i_t(s) - \lambda^{\sim}_t(s)\|^2}{\sigma^2}\right) \quad (22)$$

Note that $\lambda^i_t(s)$ represents the pixel value of a point s on the world coordinates system O of an image where the expected value $\lambda_t$ of the observation image $x_t$ to be observed at point-in-time t at the generating model $\theta$ in the event of assuming that the foreground #i of interest alone exists on the background.

Also, in Expression (22), $\lambda^{\sim}_t(s)$ represents, in the same way as with the case of Expression (19), the pixel value of a point s on the world coordinates system O of the image $\lambda^{\sim}_t$ actually observed at the point-in-time t.

Further, in Expression (22), K and $\sigma^2$ are, in the same way as with the case of Expression (19), predetermined constants, and are determined beforehand.

The expected value $\lambda^i_t = \lambda^i(z^i_t, \mu^i, \mu^w)$ of the observation image $x_t$ at the point-in-time t to be observed at the generating model $\theta$ in the event of assuming that the foreground #i of interest alone exists on the background may be obtained in accordance with Expression (23).

$$\lambda^i(z^i_t, \mu^i, \mu^w) = \lambda^i_t(r'^i_t) = \begin{cases} (1-\sigma^i(r^i))\tau^w(r'^i_t) + \sigma^i(r^i)\tau^i(r^i) & \text{if } r^i \in \mu^i \\ \tau^w(r'^i_t) & \text{else} \end{cases} \quad (23)$$

Here, $\sigma^i(r^i)$ represents the pixel value of a point $r^i$ on the local coordinates system O' of the foreground shape model $\sigma^i$, and $\tau^i(r^i)$ represents the pixel value of a point $r^i$ on the local coordinates system O' of the foreground texture model $\tau^i$. Further, $\tau^w(r'^i_t)$ represents the pixel value of a point $r'^i_t$ on the world coordinates system O of the foreground texture model $\tau^w$.

Also, a point $r'^i_t$ obtained by adding a dash (') and an index t of point-in-time to a point $r^i$ on the local coordinates system O' represents a point (corresponding point) on the world coordinates system O corresponding to the point $r^i$ on the local coordinates system O' at the point-in-time t, as described with Expression (16), and is obtained in accordance with Expression (17).

Section 3-4. Updating of Foreground Texture Model (M Step)

Description will be made regarding specific implementation of updating of the foreground texture model $\tau^i$ to be performed in the E step using the particle filter described in Section 2-3.

With the M step in the EM algorithm, the model parameter $\theta$ is updated to a new model parameter $\theta^{new}$ from the current model parameter $\theta^{old}$ so as to maximize the expected value $Q(\theta, \theta^{old})$ of the complete data logarithmic likelihood $\ln(p(X, Z|\theta))$ to be calculated with the posterior distribution $p(Z|X, \theta^{old})$ of the latent variable Z in the E step.

In the event of having applied the particle filter to this M step, the model parameter $\theta$ is updated with the particle weighting $w^{i(1)}_t$ obtained in the E step.

Figure 14:
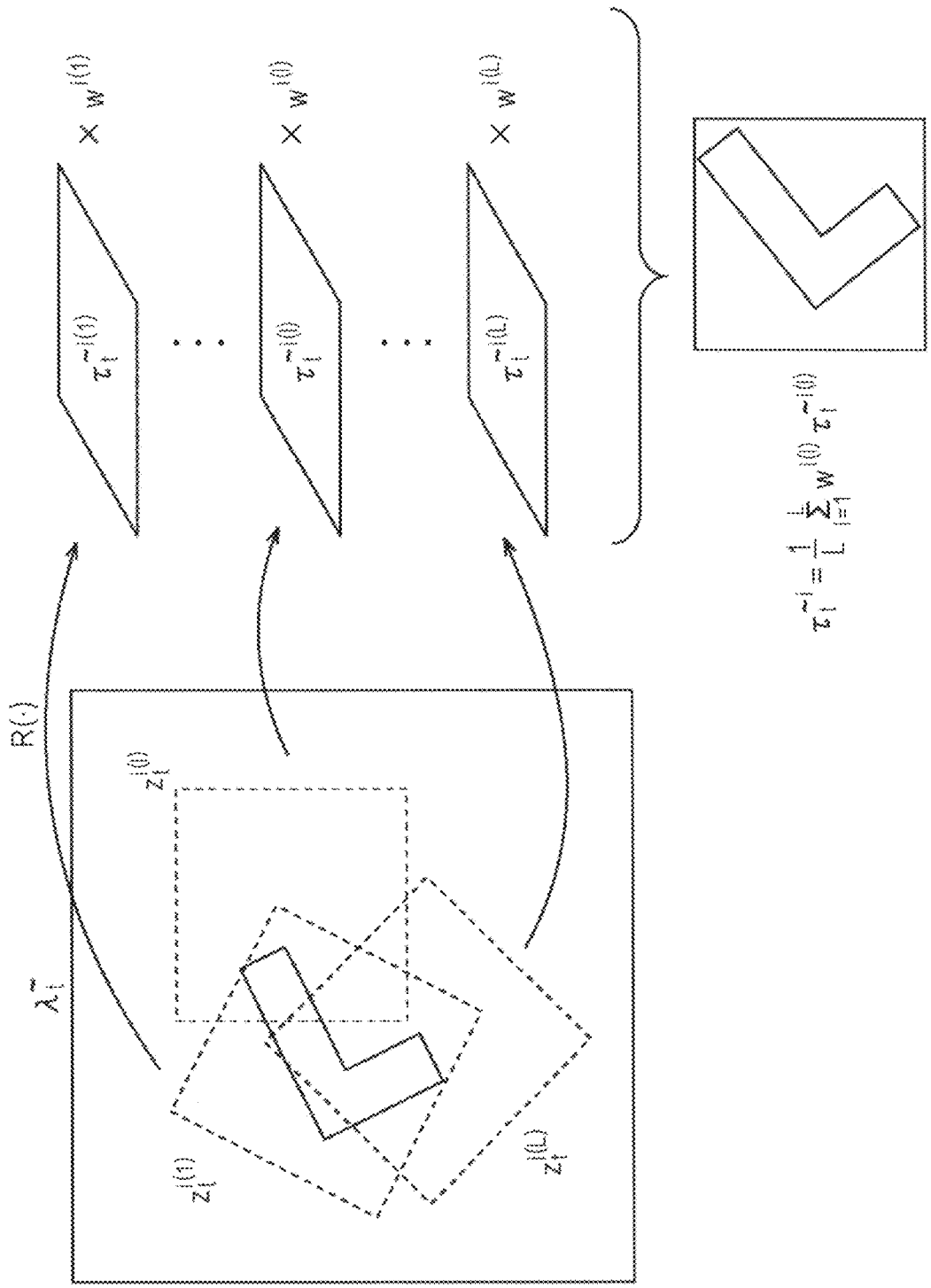
FIG. 14 is a diagram for describing updating of a foreground texture model using weighting of a particle.

FIG. 14 is a diagram for describing updating of the foreground texture model $\tau^i$ using the particle weighting $w^{i(1)}_t$.

With updating of the foreground texture model $\tau^i$, at the point-in-time t, in order to obtain the updated data $\tau^{\sim i}_t$ for one point-in-time worth of the point-in-time t thereof, as illustrated in FIG. 14, assuming that the state of the foreground #i is in the state $z^{i(1)}_t$ serving as a particle, an image of an area estimated as the foreground #i which is in the state $z^{i(1)}_t$ thereof is trimmed from (the observation value of) the image $\lambda^{\sim}_t$ actually observed at the point-in-time t, and projected on the local coordinates system O' of the foreground #i.

Here, the image trimmed from the image (hereinafter, also referred to as actual image) $\lambda^{\sim}_t$ actually observed at the point-in-time t and projected on the local coordinates system O' of the foreground #i will also referred to as trimmed image $\tau^{\sim i(1)}_t$.

The trimmed image $\tau^{\sim i(1)}_t$ is an image having the same size as with the foreground texture model $\tau^i$ (and foreground shape model $\sigma^i$), and is represented with Expression (24).

$$\tau_t^{\sim i(1)}(s_t^{\prime i(1)}) = \lambda_t^{\sim(s)}{}_{,s_t^{\prime i(1)} \in \mu^i} \quad (24)$$

Here, $\tau_t^{\sim i(1)}(s_t^{\prime i(1)})$ represents the pixel value of a point $s_t^{\prime i(1)}$ on the local coordinates system O' of the trimmed image $\tau^{\sim i(1)}_t$, and $\lambda^{\sim}_t(s)$ represents the pixel value of a point s on the world coordinates system O of the actual image $\lambda^{\sim}_t$.

Also, a point $s_t^{\prime i(1)}$ obtained by adding a dash ('), an index i of the foreground, and an index (1) of a particle, and an index t of point-in-time to the point s on the world coordinates system O represents a point (corresponding point) on the local coordinates system O' of the foreground #i corresponding to the point s on the world coordinates system O.

The point $s_t^{\prime i(1)}$ on the world coordinates system O corresponding to the point s on the local coordinates system O' of the foreground #i is represented with Expression (25) by employing the mapping function R(A, B) described in Expression (17).

$$s_t^{\prime i} = R(s - s_t^i, -\alpha_t^i) + r_c^i \quad (25)$$

Note that, in Expression (25), the index (1) of a particle is omitted.

According to Expression (25), in the event that the corresponding point $s_t^{\prime i(1)}$ on the local coordinates system O' of the point s on the world coordinates system O is a point on the foreground visible model $\mu^i$ (an image serving as the foreground texture model $\tau^i$ or the foreground shape model $\sigma^i$) at the point-in-time t ($s_t^{\prime i(1)} \in \mu^i$), the pixel value $\lambda^{\sim}_t(s)$ of the point s of the actual image $\lambda^{\sim}_t$ is employed as the pixel value $\tau^{\sim i(1)}_t(s_t^{\prime i(1)})$ of the corresponding point $s_t^{\prime i(1)}$ of the trimmed image $\tau^{\sim i(1)}_t$.

With updating of the foreground texture model $\tau^i$, trimmed images $\tau^{\sim i(1)}_t, \tau^{\sim i(2)}_t, \ldots, \tau^{\sim i(L)}_t$ are obtained regarding the L particles $z^{i(1)}_t, z^{i(2)}_t, \ldots z^{i(L)}_t$ of the foreground #i. A weighted mean value of the L trimmed images $\tau^{\sim i(1)}_t$ to $\tau^{\sim i(L)}_t$ is obtained using the weighting $w^{i(1)}_t$ to $w^{i(L)}_t$ of the particles $z^{i(1)}_t$ to $z^{i(L)}_t$ as the updated data $\tau^{\sim i}_t$ for one point-in-time worth of the point-in-time t regarding the foreground texture model $\tau^i$ in accordance with Expression (26).

$$\tau_t^{\sim i} = \sum_{l=1}^{L} w_t^{i(l)} \tau_t^{\sim i(l)} \quad (26)$$

Further, with updating of the foreground texture model $\tau^i$, an average value (averaging for predetermined time worth) of the updated data $\tau^{\sim i}_t, \tau^{\sim i}_{t-1}, \ldots, \tau^{\sim i}_{t-T_{FG}+1}$, for the past $T_{FG}-1$ point-in-time worth from the current point-in-time t is obtained as a new foreground texture model $\tau^{i,new}$ serving as a new model parameter $\theta^{new}$ in accordance with Expression (27).

$$\tau^{i,new} = \frac{1}{T_{FG}} \sum_{t'=t-T_{FG}+1}^{t} \tau_{t'}^{\sim i} \quad (27)$$

Note that, though a weighed mean value of the trimmed images $\tau^{\sim i(1)}_t$ to $\tau^{\sim i(L)}_t$ each obtained regarding the L particles $z^{i(1)}_t$ to $z^{i(L)}_t$ has been obtained here as the updated data $\tau^{\sim i}_t$ for one point-in-time worth of the point-in-time t, additionally, for example, the most-likely state $z^i_t$ is obtained from the L particles $z^{i(1)}_t$ to $z^{i(L)}_t$ as will be described later, and the trimmed image $\tau^{\sim i}_t$ obtained regarding the most-likely state $z^i_t$ may be employed as the updated data $\tau^{\sim i}_t$ for one point-in-time worth of the point-in-time t.

Section 3-5. Updating of Background Texture Model (M Step)

Description will be made regarding specific implementation of updating of the background texture model $\tau^w$ to be performed in the E step using the particle filter described in Section 2-3.

Figure 15:
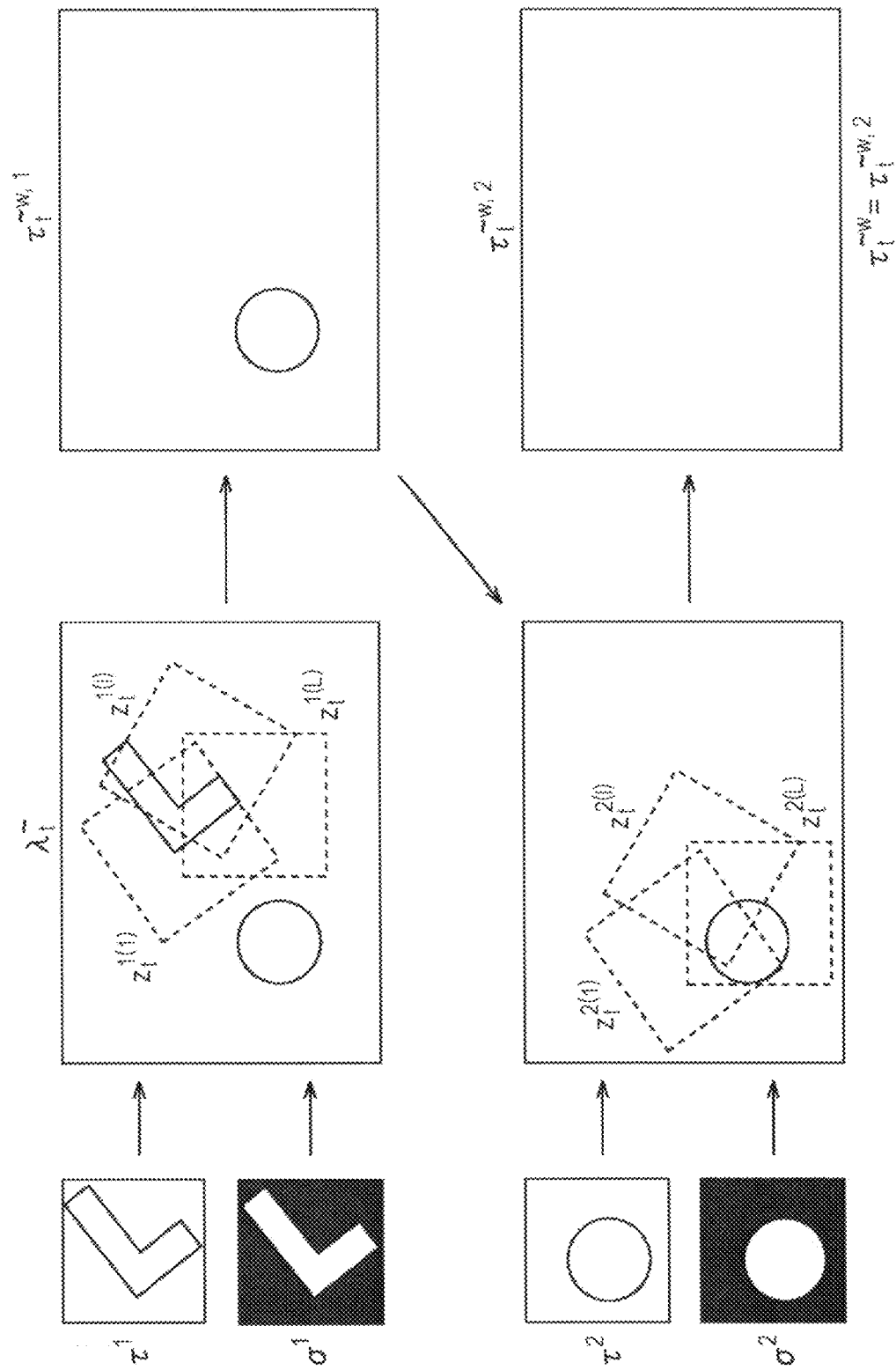
FIG. 15 is a diagram for describing updating of a background texture model.

FIG. 15 is a diagram for describing updating of the background texture model $\tau^w$.

With the updating processing of the background texture model $\tau^w$, the updated data $\tau^{\sim w}_t$ for one point-in-time worth of the point-in-time t is obtained using the states $z^{i(1)}_t$ to $z^{1(L)}_t$, $z^{2(L)}_t$ to $z^{2(L)}_t, \ldots, z^{N(L)}_t$ to $z^{N(L)}_t$ serving as all of the particles of all of the foreground models #1 to #N.

Specifically, with the updating processing of the background texture model $\tau^w$, as illustrated in FIG. 15, of the actual image $\lambda^{\sim}_t$ at the point-in-time t, it is performed on the state $z^{i(1)}_t$ serving as each particle of the foreground model #i to replace the pixel value of an area estimated as a foreground with the current background texture model $\tau^{w,old}$, and an image obtained as a result thereof is taken as the updated data $\tau^{\sim w}_t$ for one point-in-time worth of the point-in-time t.

Specifically, first, the foreground #1 is taken as the foreground of interest. Next, assuming that the state of the foreground #1 which is the foreground of interest is the state $z^{1(1)}_t$ serving as a particle, there is obtained an image (hereinafter, also referred to as foreground removed image) $\tau^{\sim w,1(1)}_t$ wherein image components of the foreground model #i (the foreground visible model $\mu^i$) have been removed from an area estimated as the foreground #i which is in the state of $z^{i(1)}_t$, and also, the image components of the current foreground model (the current background texture model $\tau^{w,old}$) have been added.

Of the foreground #1, the foreground removed image obtained regarding the state $z^{1(l)}_t$ serving as a particle is represented with Expression (28).

$$\tau_t^{-w,1(l)}(s) = \begin{cases} \lambda_t^-(s) - \sigma^1(s'^{1(l)}_t)\tau^1(s'^{1(l)}_t) + (1 - \sigma^1(s'^{1(l)}_t))\tau^{w,old}(s) & \text{if } s'^{1(l)}_t \in \mu^1 \\ \lambda_t^-(s) & \text{else} \end{cases} \quad (28)$$

According to Expression (28), in the event that, of the point s on the world coordinates system O, the corresponding point $s'^{1(1)}_t$ on the local coordinates system O' of the foreground #1 is a point on the foreground visible model $\mu^1$ (an image serving as the foreground texture model $\tau^1$ or the foreground shape model $\sigma^1$) ($s'^{1(1)}_t \in \mu^1$), as the pixel value $\tau_t^{-w,1(1)}(s)$ the point s on the foreground removed image $\tau_t^{-w,1(1)}$, there is employed a value $\lambda_t^-(s) - \sigma^1(s'^{1(1)}_t) \tau^1(s'^{1(1)}_t) + (1-\sigma^1(s'^{1(1)}_t))\tau^{w,old}(s)$ obtained by multiplying the pixel value $\tau^1(s'^{1(1)}_t)$ of the corresponding point $s'^{1(1)}_t$ on the foreground texture model $\tau^1$ by $\sigma^1(s'^{1(1)}_t)$ and subtracting this from the pixel value $\lambda_t^-(s)$ of the point s on the actual image $\lambda_t^-$, and also multiplying the pixel value $\tau^{w,old}(s)$ of the point s on the current background texture model $\tau^{w,old}$ by $(1-\sigma^1(s'^{1(1)}_t))$ and adding this to the subtraction result thereof.

Further, according to Expression (28), in the event that of the point s on the world coordinates system O, the corresponding point $s'^{1(1)}_t$ on the local coordinates system O' of the foreground #1 is not a point on the foreground visible model $v^1$, the pixel value $\lambda_t^-(s)$ of the point s on the actual image $\lambda_t^-$ is employed.

As a result thereof, as the foreground removed image $\tau^{-w,1(1)}$ there is obtained an image such that the foreground #1 which is in the state $z^{1(1)}_t$ serving as a particle is removed from the actual image $\lambda_t^-$, and background hidden in the removed foreground #1 thereof becomes visible.

With the updating processing of the background texture model $\tau^w$, the foreground removed images $\tau_t^{-w,1(1)}$ to $\tau_t^{-w,1(L)}$ are obtained regarding the L particles $z^{1(1)}_t$ to $z^{1(L)}_t$ of the foreground #1, respectively.

Next, a weighed mean value $\pi^{-w,1}$ of the foreground removed images $\tau_t^{-w,1(1)}$ to $\tau_t^{-w,1(L)}$ is obtained as a final image where the foreground #1 is removed from the actual image $\lambda_t^-$ (hereinafter, also referred to as the final removed image regarding the foreground #1) using the weighting $w^{1(1)}_t$ to $w^{1(L)}_t$ of the L particles $z^{1(1)}_t$ to $z^{1(L)}_t$ of the foreground #1.

The final removed image $\tau^{-w,1}$ regarding the foreground #1 is represented with Expression (29).

$$\tau_t^{-w,1} = \sum_{l=1}^{L} w^{1(l)}_t \tau_t^{-w,1(l)} \quad (29)$$

With the updating processing of the background texture model $\tau^w$, other foregrounds #2 to #N are sequentially taken as the foreground of interest to perform the same processing.

However, with regard to the foreground #i of the foreground #2 and thereafter, the final removed image $\tau^{-w,1-1}$ regarding the foreground #(i−1) which is the last foreground of interest is employed instead of the actual image $\lambda_t^-$.

Accordingly, of the foreground #i, the foreground removed image $\tau^{-w,i(1)}$ obtained regarding the state $z^{i(1)}_t$ serving as a particle is obtained in accordance with Expression (30) which is Expression (28) of which the actual image $\lambda_t^-$ in Expression 28 has been replaced with the final removed image $\tau^{-w,i-1}$ regarding the foreground #(i−1).

$$\tau_t^{-w,i(l)}(s) = \begin{cases} \tau_t^{-w,i-1(l)}(s) - \sigma^i(s'^{i(l)}_t)\tau^i(s'^{i(l)}_t) + (1 - \sigma^i(s'^{i(l)}_t))\tau^{w,old}(s) & \text{if } s'^{i(l)}_t \in \mu^i \\ \tau_t^{-w,i-1(l)}(s) & \text{else} \end{cases} \quad (30)$$

Next, the final removed image $\tau^{-w,i}$ regarding the foreground #i is obtained in accordance with Expression (31) in same way as with Expression (29) using the foreground removed image $\tau^{-w,i(1)}$.

$$\tau_t^{-w,i} = \sum_{l=1}^{L} w^{i(l)}_t \tau_t^{-w,i(l)} \quad (31)$$

The final removed image $\tau^{-w,N}$ regarding the foreground #N is an image where all of N foregrounds #1 to #N are removed from the actual image $\lambda_t^-$, and also an area corresponding to the current background texture model $\tau^{w,old}$ is added to areas where the foregrounds #1 to #N have been included respectively. As indicated in Expression (32), this image $\tau^{-w,N}$ is taken as updated data $\tau_t^{-w}$ for one point-in-time worth of the point-in-time t regarding the background texture model $\tau^w$.

$$\tau_t^{-w} = \tau_t^{-w,N} \quad (32)$$

FIG. 15 illustrates a scene of calculation of the updated data $\tau^{-wt}$ for one point-in-time worth of the point-in-time t regarding the background texture mode $\tau^w$ in the event that the number of foregrounds N is two.

Thereafter, with updating of the background texture model $\tau^w$, an average value (averaging for predetermined time worth) of the updated data $\tau^{-w}_t, \tau^{-w}_{t-1}, \ldots, \tau^{-w}_{t-TBG+1}$, for the past $T_{BG}-1$ point-in-time worth from the current point-in-time t is obtained as a new background texture model $\tau^{w,new}$ serving as a new model parameter $\theta^{new}$ in accordance with Expression (33).

$$\tau^{i,new} = \frac{1}{T_{FG}} \sum_{t=t-T_{FG}+1}^{t} \tau_t^{-i} \quad (33)$$

With updating of the background texture model $\tau^w$, with regard to the foreground #i of the foreground #2 and thereafter, the foreground removed image $\tau^{-w,i(1)}$ is obtained using the final removed image $\tau^{-w,i-1}$ instead of the actual image $\lambda_t^-$ regarding the foreground #(i−1) which had been the foreground of interest immediately before, and accordingly, exclusive control is performed on multiple foreground models so as to suppress simultaneous modeling (capturing) of the same foreground.

Section 3-6. Updating of Foreground Shape Model (M Step)

With updating of the foreground shape model $\sigma^i$, evaluation regarding which area belongs to the foreground #i, and which area does not belong to the foreground #i is performed, for example, in increments of pixels regarding an image serving as the foreground texture model $\tau^i$ (new foreground texture model $\tau^{i,new}$) after updating.

Specifically, with updating of the foreground shape model $\sigma^i$, regarding each of the pixels of an image serving as the foreground texture model $\tau^i$ after updating, evaluation regarding whether or not the pixel thereof is a pixel of the foreground #i is performed.

With evaluation regarding whether or not a pixel of the image serving as the foreground texture model $\tau^i$ is a pixel of the foreground #i, regarding each pixel of the image serving as the foreground texture model $\tau^i$, likelihood that the pixel thereof is a pixel of the foreground #i (hereinafter, also referred to as foreground likelihood) is expected.

As for foreground likelihood, for example, observation likelihood may be employed wherein the image serving as the foreground texture model $\tau^i$ is observed as the updated data $\tau^{-i}_t$ for one point-in-time worth of the point-in-time t regarding the foreground texture model $\tau^i$ in Expression (26) serving as an expected value of the foreground #i.

In this case, the observation likelihood serving as the foreground likelihood may be obtained in accordance with Expression (34), for example.

$$L(FG \mid \tau^i(r^i)) = K \exp\left(-\frac{\|\tau^i(r^i) - \tau^{-i}_t(r^i)\|^2}{\sigma^2}\right), r^i \in \mu^i \quad (34)$$

Here, $\tau^i(r^i)$ represents the pixel value of a point $r^i$ on the local coordinates system O' of the foreground texture model $\tau^i$, and $\tau^{-i}_t(r^i)$ represents the pixel value of the point $r^i$ on the local coordinates system O' serving as the updated data $\tau^{-i}_t$ for one point-in-time worth of the point-in-time t regarding the foreground texture model $\tau^i$.

Further, $L(FG \mid \tau^i(r^i))$ represents likelihood (foreground likelihood) that the pixel value $\tau^i(r^i)$ of the point $r^i$ of the foreground texture model $\tau^1$ will be a pixel of the foreground #i.

Also, in Expression (34), K and $\sigma^2$ are predetermined constants, and are determined beforehand.

With evaluation regarding whether or not a pixel of the image serving as the foreground texture model $\tau^i$ is a pixel of the foreground #i, in addition to the foreground likelihood $L(FG \mid \tau^i(r^i))$ as described above, regarding each pixel of the image serving as foreground texture model $\tau^i$, there is expected likelihood that the pixel thereof will be a pixel of the foreground (hereinafter, also referred to as background likelihood).

As for the background likelihood, for example, observation likelihood may be employed wherein the image serving as the foreground texture model $\tau^i$ will be observed as the final removed image $\tau^{-w,i}_t$ regarding the foreground #i in Expression (31) serving as an expected value of the background.

In this case, the observation likelihood serving as the background likelihood may be obtained in accordance with Expression (35), for example.

$$L(BG \mid \tau^i(r^i)) = K \exp\left(-\frac{\|\tau^i(r^i) - \tau^{-w,i}_t(r^i)\|^2}{\sigma^2}\right), r^i \in \mu^i \quad (35)$$

Here, $\tau^{-w,i}_t$ obtained by adding a dash (') to $\tau^{-w,i}_t$ representing the final removed image regarding the foreground #i represents (an expected value of) a projection image where the area of the foreground visible model $\mu^i$ is trimmed from the final removed image $\tau^{-w,i}_t$ regarding the foreground #i, and is projected on the local coordinates system O' of the foreground #i.

In Expression (35), $\tau^{-w,i}_t(r^i)$ represents the pixel value of the point $r^i$ on the local coordinates system O' of the projection image $\tau^{-w,i}_t$.

Further, $L(BG \mid \tau^i(r^i))$ represents likelihood (background likelihood) that the pixel value $\tau^i(r^i)$ of the point $r^i$ of the foreground texture model $\tau^i$ will be a pixel of the background.

Also, in Expression (35), K and $\sigma^2$ are predetermined constants, and are determined beforehand.

The projection image $\tau^{-w,i}$ may be obtained in accordance with Expressions (36) and (37) using the foreground removed image $\tau^{-w,i(1)}_t$ in Expression (30) (Expression (28)) to be used for obtaining the final removed image $\tau^{-w,i}_t$ regarding the foreground #i in Expression (31).

$$\tau^{-w,i(l)}_t(s^{i(l)}_t) = \tau^{-w,i(l)}_t(s), s^{i(l)}_t \in \mu^i \quad (36)$$

$$\tau^{-w,i}_t = \sum_{l=1}^{L} w^{i(l)}_t \tau^{-w,i(l)}_t \quad (37)$$

Here, $\tau^{-w,i(1)}_t$ represents a projection image in the event of assuming that the foreground #i is in the state $z^{i(1)}_t$, serving as a particle, and $\tau^{-w,i(1)}_t(s^{i(1)}_t)$ represents the pixel value of the corresponding point $s^{i(1)}_t$ of the projection image $\tau^{-w,i(1)}_t$ corresponding to the particle $z^{i(1)}_t$.

According to Expression (36), in the event that of the point s on the world coordinates system O, the corresponding point $s^{i(1)}_t$ on the local coordinates system O' of the foreground #i is a point on the foreground visible model $\mu^i$, the pixel value $\tau^{-w,i(1)}_t(s)$ of the point s of the foreground removed image $\tau^{-w,i(1)}_t(s)$ is employed as the pixel value $\tau^{-w,i(1)}_t(s^{i(1)}_t)$ of the corresponding point $s^{i(1)}_t$ of the projection image $\tau^{-w,i(1)}_t$ corresponding to the particle $z^{i(1)}_t$.

According to Expression (37), a weighed mean value of the projection image $\tau^{-w,i(1)}_t$ corresponding to each particle $z^{i(1)}_t$ using the weighting $w^{i(1)}_t$ of a particle is obtained as a projection image $\tau^{-w,i}_t$.

With updating of the foreground shape model $\sigma^i$, each of the pixels of the image serving as the foreground texture model $\tau^i$, probability that the pixel thereof will be a pixel of the foreground #i is obtained in accordance with Expression (38) using the foreground likelihood $L(FG \mid \tau^i(r^i))$ in Expression (34), and the background likelihood $L(BG \mid \tau^i(r^i))$ in Expression (35).

$$p(FG \mid \tau^i(r^i)) = \frac{L(FG \mid \tau^i(r^i))}{L(FG \mid \tau^i(r^i)) + L(BG \mid \tau^i(r^i))}, r^i \in \mu^i \quad (38)$$

Here, $p(FG \mid \tau^i(r^i))$ represents probability that of the foreground shape model $\sigma^i$, the point (pixel) $r^i$ on the local coordinates system O' of the foreground #i will be a pixel of the foreground #i. With updating of the foreground shape model $\sigma^i$, the pixel value $\sigma^i(r^i)$ of the point $r^i$ is updated to probability $p(FG \mid \tau^i(r^i))$.

Chapter 4. Updating of Motion Model

Kinetics Parameter

When observing the observation value $x_{t+1}$ at the point-in-time t+1, series $X_t = \{x_1, x_2, \ldots, x_t\}$ of the observation value are observed until the point-in-time t, and the posterior distribution $p(z_{t+1} \mid X_t)$ which is in the state $Z_{t+1}$ may be obtained in accordance with Expression (15) at the point-in-time t+1.

A most-likely state $Z^i_{t+1}$ having the highest possibility that the foreground #i has been at the point-in-time t+1 may be obtained in accordance with Expression (39) since the posterior distribution $p(z^i_{t+1}|X_t)$ at the point-in-time t+1 is in the maximum state.

$$z^i_{t+1} = \max_z p(z^i_{t+1} | X_t) \cong \max_z \sum_{l=1}^{L} w_t^{i(l)} p(z^i_{t+1} | z_t^{i(l)}) \quad (39)$$

With updating of the motion model, the most-likely state $Z^i_t$ of the foreground #i of each point-in-time t is successively obtained, and most-likely estimation is performed using series (most-likely series) $Z^i_t = \{z^i_1, z^i_2, \ldots, z^i_t\}$ of the most-likely state $Z^i_t$ thereof as an observation value that the agent is allowed to observe, and accordingly, kinetics parameters $r^i_c$, $m^i$, and $I^i_c$ of rigid motion in Expression (4) serving as the motion model $a^i$ of the foreground #i are updated.

With most-likely estimation, from a point-in-time going back in the past from the current point-in-time t by a certain time to a state until the current point-in-time are estimated, and error for the most-likely series $Z^i_t$ of the state series obtained as a result thereof is employed as observation likelihood that the state $z^i_t$ will be observed at the point-in-time t in the motion model $a^i$.

Specifically, with the present technology, the most-likely state $z^i_{t-T_{DYN}}$ at point-in-time $t-T_{DYN}$ going back a certain time $T_{DYN}$ from the current point-in-time t is taken as an initial value, and state series $Z^{\wedge i}_{t-T_{DYN}+1,t} = \{z^{\wedge i}_{t-T_{DYN}+1}, z^{\wedge i}_{t-T_{DYN}+2}, \ldots, z^{\wedge i}_t\}$ from the point-in-time t–TDYN+1 to the current point-in-time t of the foreground #i are estimated in accordance with a time development equation in Expression (40), using the motion model $a^i$, and an action series $U^i_{t-1} = \{u^i_{t-T_{DYN}}, u^i_{t-T_{DYN}+1}, \ldots, u^i_{t-1}\}$ of the foreground #i from point-in-time $t-T_{DYN}$ to point-in-time t–1.

$$z_{t+1}^i = d(z^i_t, a^i) \quad (40)$$

As for the time development equation in Expression (40), the rigid motion equations in Expressions (41) and (42) may be employed, for example.

$$m^i \frac{d}{dt} s^i_t = F^i \quad (41)$$

$$I^i_c \frac{d}{dt} q^i_t = (r^i_F - r^i_c) \times F^i \quad (42)$$

As for the motion equations in Expressions (41) and (42), numerical computation is performed, for example, using the Euler's method or Runge Kutta methods, and accordingly, there may be obtained the state series $Z^{\wedge i}_{t-T_{DYN}+1,t} = \{z^{\wedge i}_{t-T_{DYN}+1}, z^{\wedge i}_{t-T_{DYN}+2}, \ldots, z^{\wedge i}_t\}$ of the foreground #i to be moved in accordance with the motion equations in Expressions (41) and (42).

With the present technology, a value corresponding to error between the most-likely series $Z^i_t = \{z^i_{t-T_{DYN}+1}, z^i_{t-T_{DYN}+2}, \ldots, z^i_t\}$ from the point-in-time $t-T_{DYN}+1$ in time from the current point-in-time t by time $T_{DYN}-1$, to the current point-in-time t, and the state series $Z^{\wedge i}_{t-T_{DYN}+1,t} = \{z^{\wedge i}_{d-T_{DYN}+1}, z^{\wedge i}_{t-T_{DYN}+2}, \ldots, z^{\wedge i}_t\}$ of the foreground #i obtained in accordance with the motion equations in Expressions (41) and (42) is obtained as observation likelihood (observation likelihood that the state $z^i_t$ will be observed at the point-in-time t as the state of the foreground #i of the motion model $a^i$) $p(z^i_t|a^i)$ that the state $z^i_t$ will be observed at the point-in-time t at the motion model $a^i$.

Specifically, the observation likelihood $p(z^i_t|a^i)$ is obtained in accordance with Expression (43).

$$p(z^i_t | a^i) = K \exp\left(-\frac{\frac{1}{T_{DYN}} \sum_{t=t-T_{DYN}+1}^{t=t} \|z^-_t - z^i_t\|^2}{\sigma^2}\right) \quad (43)$$

Note that, in Expression (43), K and $\sigma^2$ are predetermined constants and are determined d beforehand.

With the present technology, the motion model $a^i$ is employed as a particle, and updating of the motion model $a^i$ is successively performed using the particle filter in parallel with updating of the model parameters of the foreground model and background model.

A basic calculation method for the particle filter in the event of employing the motion model $a^i$ as a particle is as described in Chapter 2.

However, the weighting $w^{i(1)}_t$ of the particle of the motion model $a^i$ is obtained in the same way as with Expression (14) using the observation likelihood $p(z^i_t|a^i)$ to be obtained in accordance with Expression (43).

Also, with the present technology, assuming that probability that the motion model $a^{i(1)}_t$ serving as a particle at the point-in-time t will change to the motion model $a^i_{t+1}$ at the next point-in-time t+1, i.e., the transition probability $p(a^i_{t+1}|a^{i(1)}_t)$ of the motion model $a^{i(1)}_t$ serving as a particle follows a Gauss distribution (normal distribution), the transition model of the motion model $a^{i(1)}_t$ serving as a particle is represented with Expression (44), for example.

$$a^i_{t+1} = \begin{bmatrix} r^i_{c,t+1} \\ m^i_{t+1} \\ I^i_{c,t+1} \end{bmatrix} = \begin{bmatrix} r^i_{c,t} \\ m^i_t \\ I^i_{c,t} \end{bmatrix} + \begin{bmatrix} N(0, \Sigma_{rc}) \\ N(0, \sigma^2_m) \\ N(0, \Sigma_{Ic}) \end{bmatrix} \quad (44)$$

Here, as described with Expression (20), N (A, B) represents a Gauss distribution wherein the average vector (average value) is A, and the variance covariance matrix (covariance) is B.

In Expression (44), any of Gauss distributions N $(0, \Sigma_{rc})$, N $(0, \sigma^2_m)$, and N $(0, \Sigma_{Ic})$ is a Gauss distribution where the average vector is 0. Also, the variance covariance matrices (covariance) $\Sigma_{rc}$, $\sigma^2_m$, and $\Sigma_{Ic}$ are determined beforehand.

According to the transition model in Expression (44), assuming that the motion model serving as a particle makes the transition with stochastic fluctuation in accordance with the Gauss distribution of a predetermined variance covariance matrix where the average vector is 0, the motion model $a^i_{t+1}$ at the point-in-time t+1 which is a transition destination is obtained (predicted).

Also, with the present technology, with regard to the motion model $a^i$, a weighed mean value between the motion model $a^{i(1)}_t$ serving as a particle at the point-in-time t and the weighting $w^{i(1)}_t$ thereof is obtained in accordance with Expression (45), and the motion model $a^i_{t+1}$ at the point-in-time t+1 is updated to the weighed mean value.

$$a^i_{t+1} = \sum_{l=1}^{L} w_t^{i(l)} a^{i(l)} \quad (45)$$

Chapter 5. Object Operations Using Estimated Model

Figure 16:
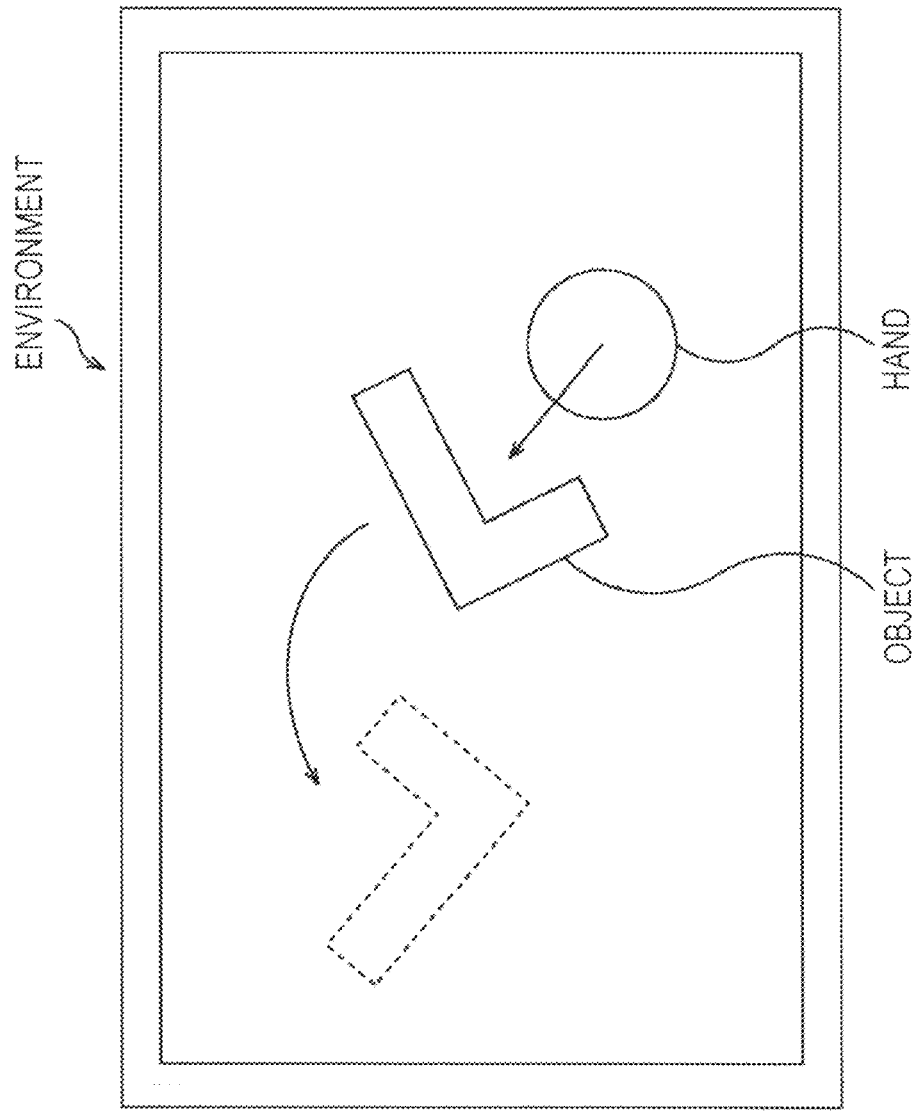
FIG. 16 is a diagram for describing object operations by an agent.

FIG. 16 is a diagram for describing object operations by the agent.

In the event of having obtained the foreground model (foreground visible model $\mu^i$), background model (background visible model $\mu^w$), and the motion model $a^i$ of the foreground #i, the agent may serve as a manipulator which operates an object within an environment using these foreground model, background model, and motion model $a^i$.

In FIG. 16, a L-shaped object is allocated as an object to be operated within an environment serving as a two-dimensional plane, and the object to be operated moves by the hand of the agent illustrated with a circle being in contact therewith.

Here, in FIG. 16, a L-shape illustrated with a solid line represents the current state of the object to be operated, and a L-shape illustrated with a dotted line represents the target state of the object to be operated.

Now, let us say that the object to be operated moves in accordance with a rigid motion equation within an environment, but unless external force is applied thereto, motion energy is lost over time due to friction with the environment, and speed decreases. That is to say, let us say that the object to be operated immediately stops if application of external force is stopped without applying force to stop.

Also, the object to be operated itself does not autonomously move, and moves only by the circular hand being in contact therewith in the same way as with a case where a human being transports an object by hand.

Further, let us say that the agent may optionally specify a position and speed regarding the hand.

Figure 17:
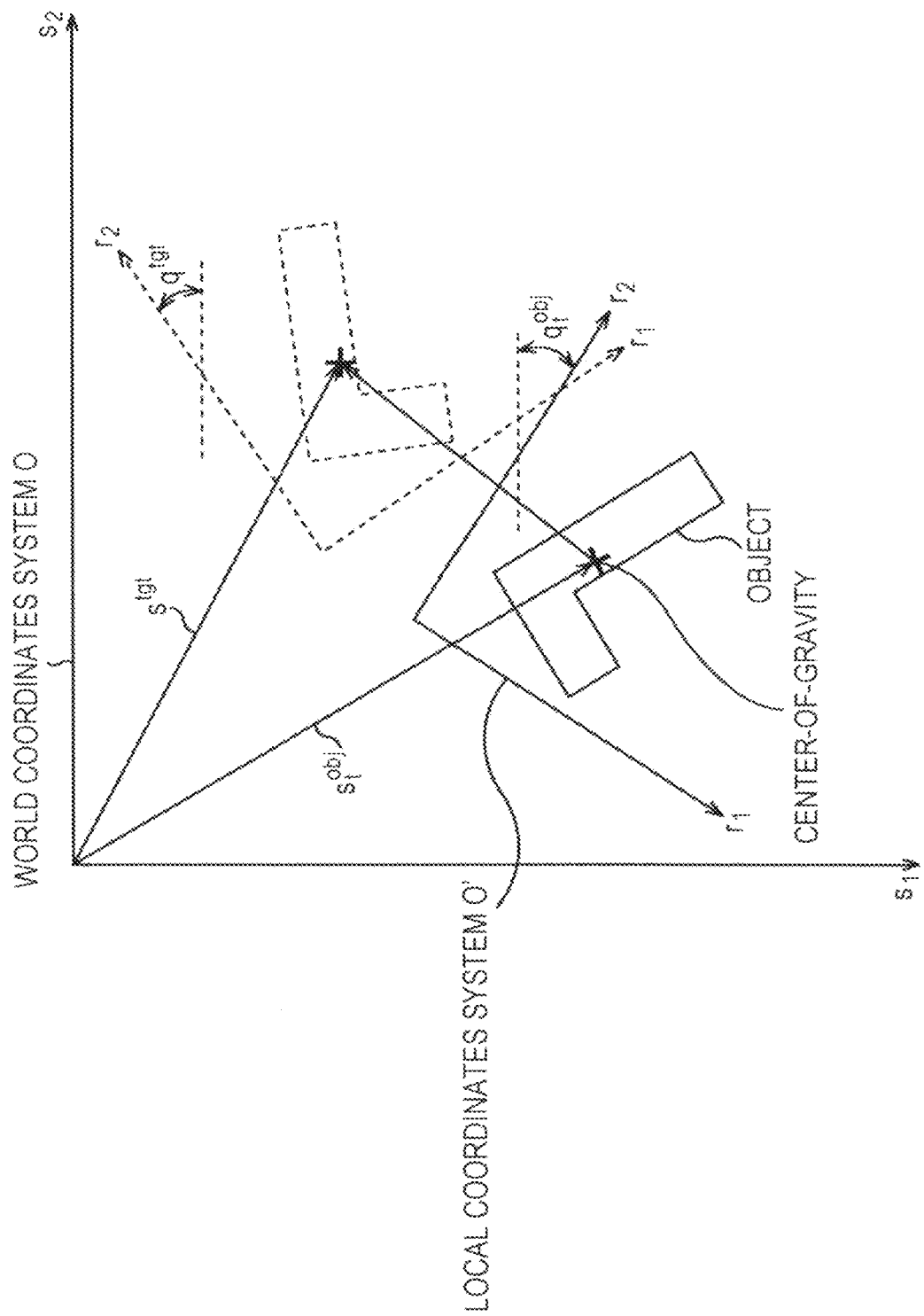
FIG. 17 is a diagram illustrating the current state and a target state of an object to be operated.

FIG. 17 is a diagram illustrating the current state and target state of the object to be operated.

In FIG. 17, $s^{obj}_t$ represents the position (current position) of center-of-gravity of the object at the current point-in-time t on the world coordinates system O, and $q^{obj}_t$ represents the attitude (current attitude) of target of the object on the world coordinates system.

Also, in FIG. 17, $s^{tgt}$ represents the position (target position) of center-of-gravity of target of the object on the world coordinates system O, and $q^{tgt}$ represents the attitude (target attitude) of target of the object on the world coordinates system O.

Rigid motion may be divide into translation motion and rotation motion. The present technology makes the object to be operated perform translation motion and also perform rotation motion as appropriate, thereby changing the object to the target state.

Specifically, with the present technology, the agent first makes the object to be operated perform translation motion, and makes the object perform rotation motion after error of the position of the object for the target state becomes sufficiently small. In the event that error of the position of the object for the target state becomes great during rotation motion, the agent makes the object perform translation motion again, and hereinafter, the same processing is performed.

On the other hand, in the event that error of the position and attitude of the object for the target state becomes sufficiently small during rotation motion, the agent ends object operations assuming that the object has changed to the target state.

Note that, with the above-mentioned object operations, though description has been made wherein translation motion is preferentially performed, and then rotation motion is performed, and additionally, for example, an arrangement may be made wherein rotation motion is preferentially performed, and then translation motion is performed.

Figure 18:
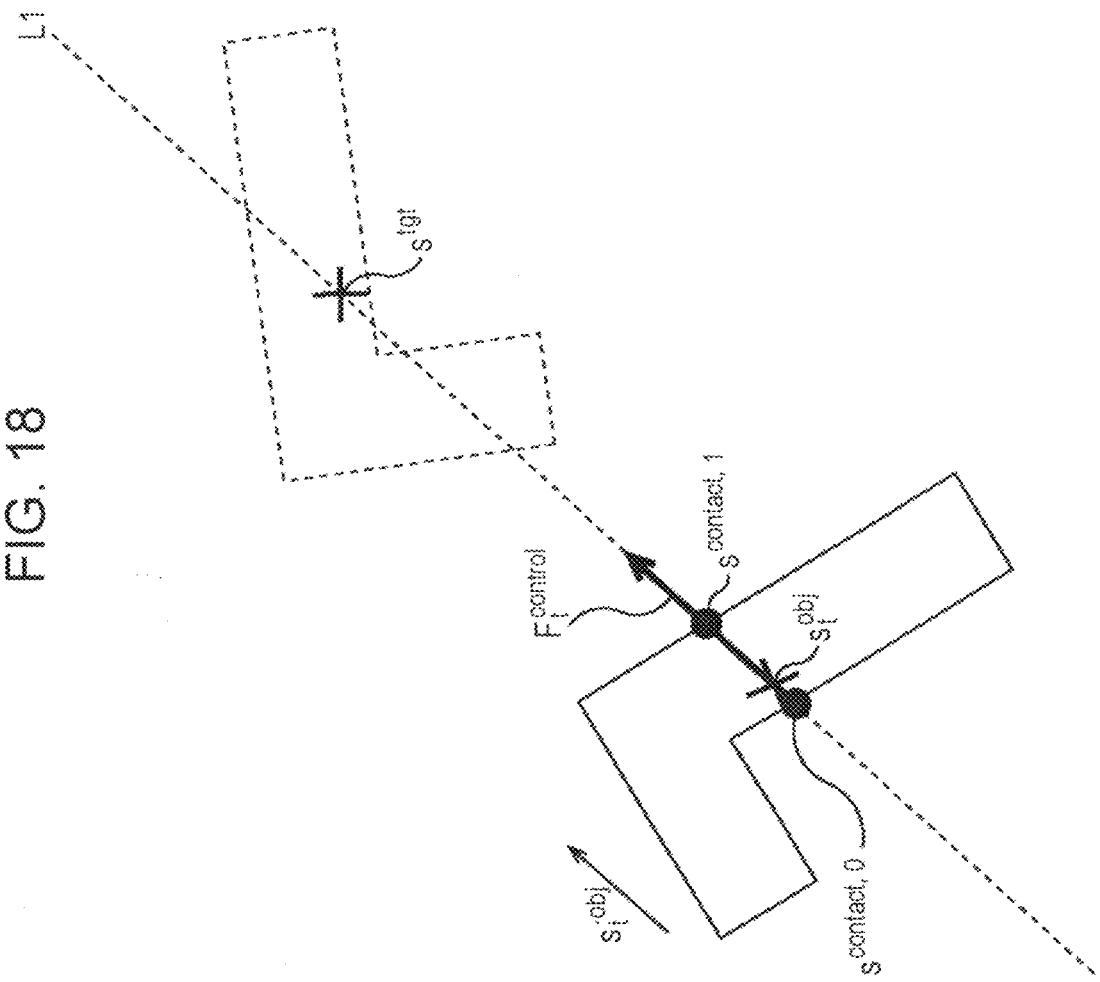
FIG. 18 is a diagram for describing translation motion of an object.

FIG. 18 is a diagram for describing translation motion of the object.

At the time of making the object perform translation motion, in order to translate the object without rotating the object as much as possible, the agent applies force to the object which is a rigid body so as to suppress occurrence of torque.

FIG. 18 illustrates, as described above, in the event of applying force so as to suppress the object from occurrence of torque, a method for deciding a point of load of the force thereof, and a method for deciding a vector of the force thereof (force vector).

First, the point of load of the force is determined to be an intersection between a straight line L1 which connects a position $s^{tgt}$ of a target state of the object and the current position (center-of-gravity) $s^{obj}_t$, and edges of the current object.

Here, the edges of the object may be obtained, for example, by performing image processing to detect edges on a foreground shape model of the foreground corresponding to the object thereof.

Also, in FIG. 18, there are two points $s^{contact,0}$ and $s^{contact,1}$ as intersections between the straight line L1 and the edges of the current object.

In this manner, in the event that there are multiple points as intersections between the straight line L1 and the edges of the current object, for example, when operating the object by pressing the object by hand, of multiple points serving as intersections between the straight line L1 and the edges of the current object, a point farthest from the position $s^{tgt}$ of the target state of the object is determined to be a point of load of the force.

With regard to the two points $s^{contact,0}$ and $s^{contact,1}$ in FIG. 18, the point $s^{contact,0}$ is a point farthest from the position $s^{tgt}$ of the target state of the object, and accordingly determined to be a point of load of the force.

Note that, when operating the object by dragging the object by hand, of the multiple points serving as intersections between the straight line L1 and the edges of the current object, a point closest from the position $s^{tgt}$ of the target state of the object is determined to be a point of load of the force.

The direction of a force vector $F^{control}_t$ to be applied to the object at the point-in-time t is determined to be a direction advancing from the point of load $s^{contact,0}$ to the position $s^{tgt}$ in the target state.

Further, the force vector $F^{control}_t$ is determined, for example, in accordance with Expression (46) so that the greater distance $|s^{tgt} - s^{obj}_t|$ from the current position $s^{obj}_t$ of the object to the position $s^{tgt}$ in the target state is, the greater the force vector $F^{control}_t$ becomes, and also, the greater the current speed $\dot{s}^{obj}_t$ of the object is, the smaller the force vector $F^{control}_t$ becomes.

$$F^{control}_t = K_0(s^{tgt} - s^{obj}_t) - k_1 \dot{s}^{obj}_t \qquad (46)$$

Here, in Expression (46), $K_0$ and $K_1$ are predetermined constants, and are determined beforehand.

Figure 19:
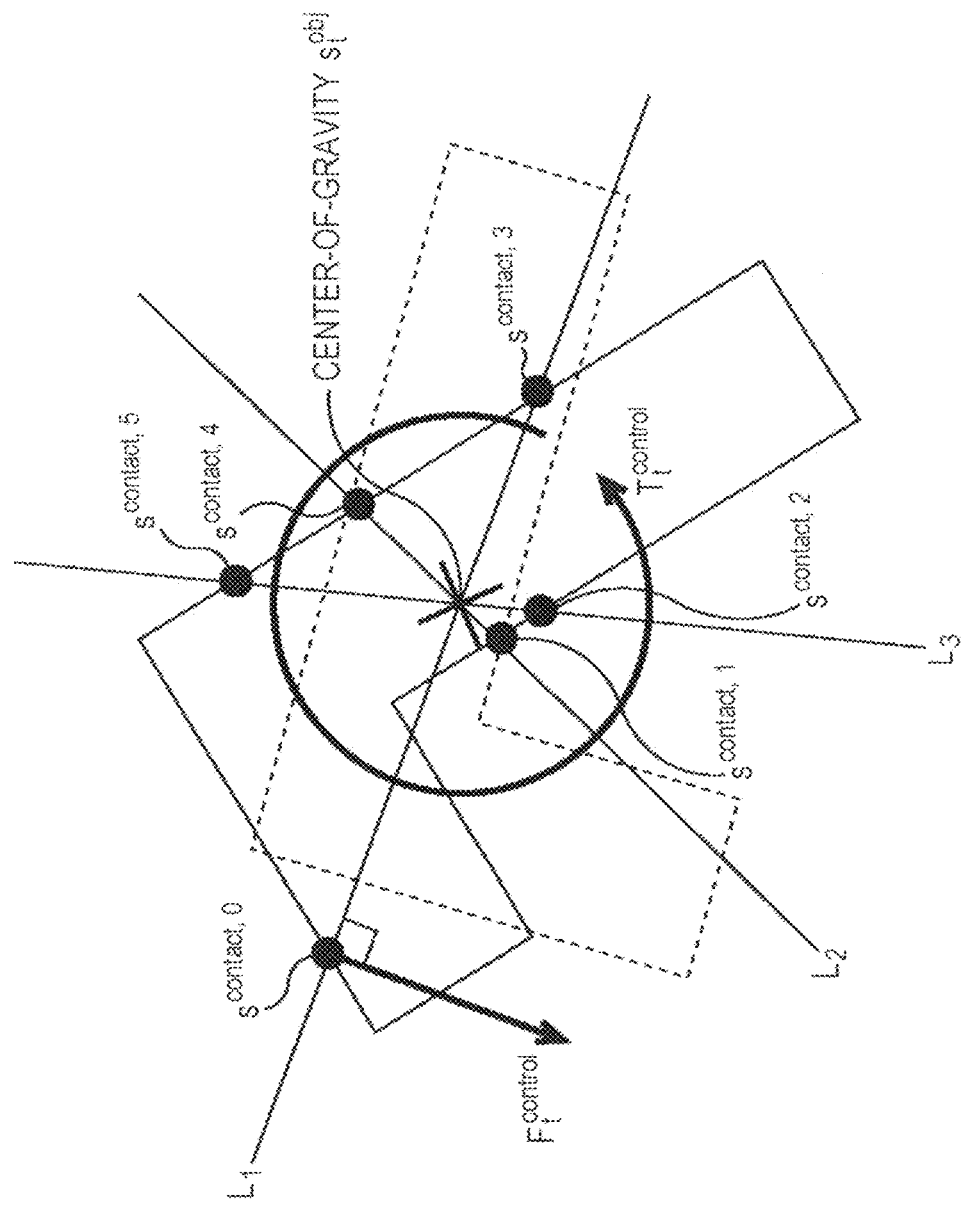
FIG. 19 is a diagram for describing rotation motion of an object.

FIG. 19 is a diagram for describing rotation motion of the object.

At the time of making the object perform rotation motion, in order to rotate the object without translating the object as much as possible, the agent applies force to the object which is a rigid body so as to generate torque around center-of-gravity.

FIG. 19 illustrates, as described above, in the event of applying force so as to generate torque around center-ofgravity, a method for deciding a point of load of the force thereof, and a method for deciding a vector of the force thereof (force vector).

First, the point of load of the force is determined to be an intersection between one or more straight lines which pass through the position (center-of-gravity) $s^{obj}_t$ of the current state of the object and the edges of the current object.

Here, in FIG. 19, three straight lines $L_1$, $L_2$, and $L_3$ exist as one or more straight lines which pass through the position $s^{obj}_t$ of the current state of the object.

Also, there are two points $s^{contact,0}$ and $s^{contact,3}$ as intersections between the straight line $L_1$ and the edges of the current object, two points $s^{contact,2}$ and $s^{contact,4}$ as intersections between the straight line $L_2$ and the edges of the current object, and two points $s^{contact,2}$ and $s^{contact,5}$ as intersections between the straight line $L_3$ and the edges of the current object.

Now, for example, as with the case of translation motion described with FIG. 18, if we say that the object is made to perform rotation motion by pressing the object by hand, in the event that there are multiple points as intersections between a straight line passing through the current position $s^{obj}_t$ of the object and the edges of the current object, a point where a direction of torque that occurs when applying force so as to press the edges of the object agrees with a direction intended to rotate the object is selected from the multiple points as a point-of-load candidate.

Here, as for the direction intended to rotate the object, for example, a direction having a small rotational angle when rotating the object to attitude agreeing with the target state may be employed of rotational directions around the center-of-gravity of the object. In FIG. 19, the counterclockwise direction is the direction intended to rotate the object.

After a point-of-load candidate is selected, of point-of-load candidates thereof, a candidate farthest from the current position $s^{obj}_t$ of the object is determined to be a point of load.

In FIG. 19, the point $s^{contact,0}$ is determined to be the point of load of the force.

The direction of the force vector $F^{control}_t$ to be applied to the object at the point-in-time t is determined to be a direction to rotate the object in a direction intended to rotate the object, orthogonal to a straight line passing through the current position $s^{obj}_t$ of the object and the point of load.

In FIG. 19, a direction to rotate the object in the counterclockwise direction, orthogonal to the straight line $L_1$ passing through the current position sobjt of the object and the point of load $s^{contact,0}$ is determined to be the direction of the force vector $F^{control}_t$.

The rotation motion is determined, for example, in accordance with Expression (47) so that according to the force vector $F^{control}_t$, the greater a rotational angle $|q^{tgt}-q^{obj}_t|$ from the current attitude $q^{obj}_t$ of the object to the attitude $q^{tgt}$ of the target state, the greater torque $T^{control}_t$ to rotate the object around the center-of-gravity $s^{obj}_t$ becomes, and also, the greater the current angular velocity $\dot{q}^{obj}_t$ of the object is, the smaller the torque $T^{control}_t$ becomes.

$$t^{control}_t = K_2(q^{tgt}-q^{obj}_t) - K_3 \dot{q}^{obj}_t \tag{47}$$

Here, in Expression (47), $K_2$ and $K_3$ are predetermined constants, and are determined beforehand.

The torque $T^{control}_t$ is an exterior product r between a distance vector r representing distance from the center-of-gravity $s^{obj}_t$ of the object to the point of load and the force vector $F^{control}_t \times F^{control}_t$, and accordingly, the torque $T^{control}_t$ is determined, whereby the force vector $F^{control}_t$ to generate the torque $T^{control}_t$ thereof may also be determined.

After determining the point of load of the force, and the force vector of the force thereof, the agent moves the hand to a predetermined initial position, and moves the hand to the point of load of the force of the object to be operated so as to apply the force vector.

Figure 20:
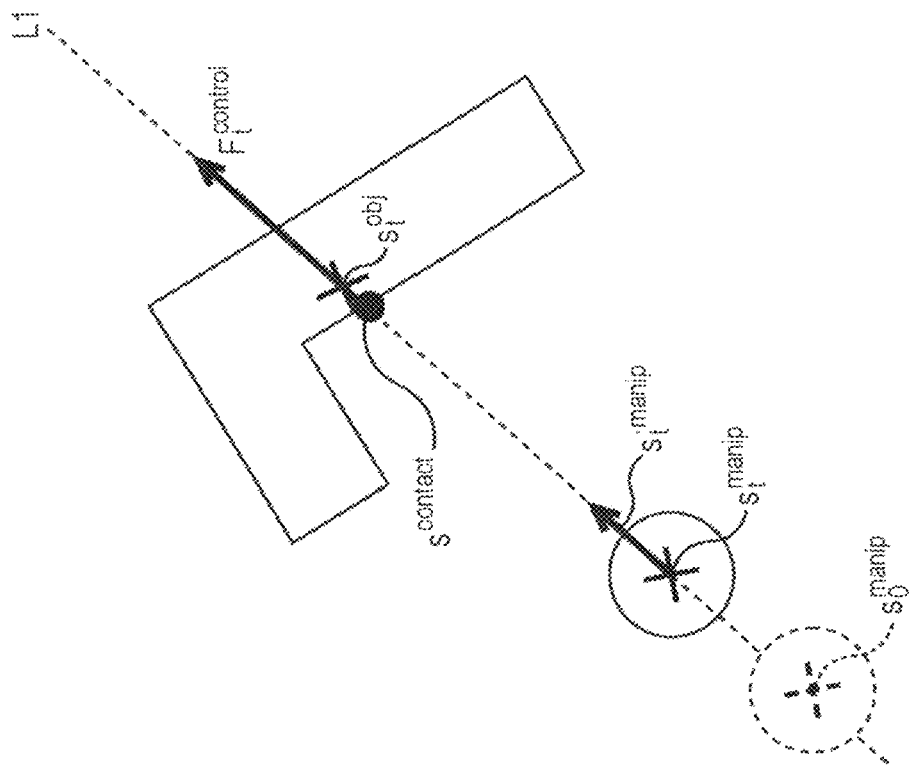
FIG. 20 is a diagram for describing the initial position of a hand.

FIG. 20 is a diagram for describing the initial position of the hand.

The agent determines a point $s^{manip}_0$ sufficiently far from the point of load $s^{contact}$ to be the initial position of the hand (the position of the hand with the point-in-time t=0), which passes through the force point-of-load $s^{contact}$, on the straight line L1 parallel to the force vector $F^{control}_t$, in the opposite direction of the direction of the force vector $F^{control}_t$ with the force point-of-load $s^{contact}$ as a base point, and also not interfering with the object to be operated.

The agent then moves the hand to the initial position $s^{manip}_0$, following which moves the hand at velocity $\dot{s}^{manip}_t$ corresponding to the force vector $F^{control}_t$.

The velocity (velocity vector) $\dot{s}^{manip}_t$ corresponding to the force vector $F^{control}_t$ is obtained, for example, in accordance with Expression (48).

$$\dot{s}^{manip}_t = K_4 F^{control}_t \tag{48}$$

Here, in Expression (48), $K_4$ is a predetermined constant, and is determined beforehand.

Note that the agent moves the hand to the initial position $s^{manip}_0$ when starting translation motion and when starting rotation motion.

Also, the agent consecutively moves the hand at velocity $\dot{s}^{manip}_t$ in Expression (48) obtained using the force vector $F^{control}_t$ between up to starting rotation motion after starting translation motion, and between up to starting translation motion after starting rotation motion.

Embodiment of Agent to Which Present Technology Has Been Applied

Figure 21:
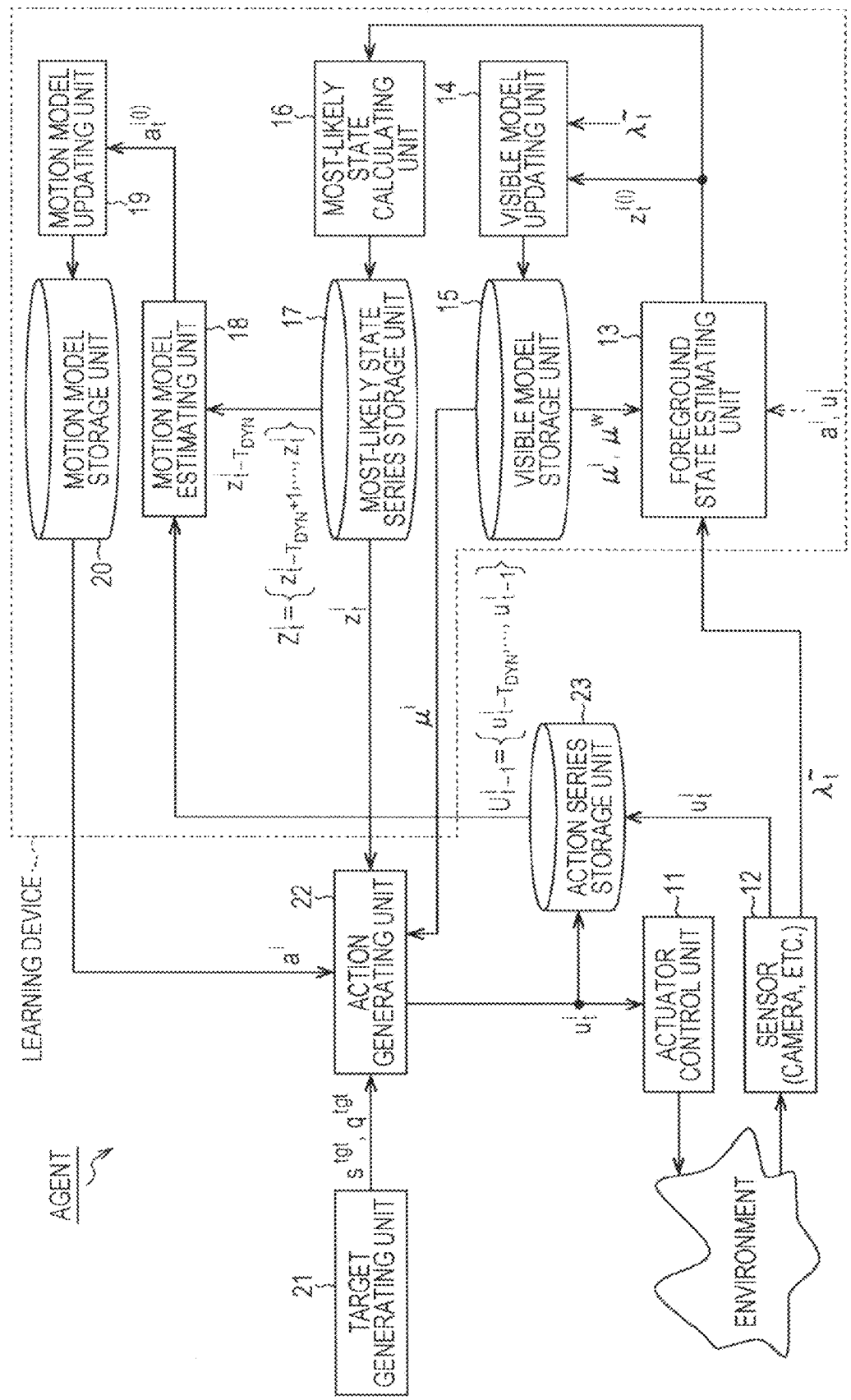
FIG. 21 is a block diagram illustrating a configuration example of an embodiment of an agent to which the present technology has been applied.

FIG. 21 is a block diagram illustrating a configuration example of an embodiment of the agent to which the present technology has been applied.

In FIG. 21, the agent includes an actuator control unit 11, a sensor 12, a foreground state estimating unit 13, a visible model updating unit 14, a visible model storage unit 15, a most-likely state calculating unit 16, a most-likely state series storage unit 17, a motion model estimating unit 18, a motion model updating unit 19, a motion model storage unit 20, a target generating unit 21, an action generating unit 22, and an action series storage unit 23.

In FIG. 21, the foreground state estimating unit 13 to motion model storage unit 20 make up a learning device which learns the foreground visible model $\mu^i$, background visible model $\mu^w$, and motion model $a^i$.

Action $u^i_t$ (action that the foreground #i is made to perform or action that the foreground #i performs at point-in-time t) of the foreground #i is supplied from the action generating unit 22 to the actuator control unit 11.

The actuator control unit 11 controls the actuator which drives the hand or the like not illustrated of the agent in accordance with the action $u^i_t$ from the action generating unit 22, and thus, the hand is moved, for example.

The sensor 12 is a camera or the like, shoots an image with a predetermined frame rate, and supplies an observation value of the image thereof (an observation value of the image that the agent may observe) (actual image) $\tilde{\lambda}_t$ to the foreground state estimating unit 13 and visible model updating unit 14.

Note that the sensor 12 includes, in addition to the camera, for example, a pressure sensor or the like mounted on the hand. According to the pressure sensor mounted on the hand, action of the object may be acquired (observed) by reaction at the time of the hand coming into contact with the object.

The action $u^i_t$ of the foreground #i corresponding to the object to be acquired by the sensor 12 is supplied to the action series storage unit 23.

In addition to supply of the observation value (actual image) $\lambda^\sim_t$ of an image from the sensor 12, the foreground visible model $\mu^i$ and background visible model $\mu^w$ stored in the visible model storage unit 15 are supplied to the foreground state estimating unit 13.

The foreground state estimating unit 13 estimates the state $z^i_t$ of the foreground #i using the actual image $\lambda^\sim_t$ from the sensor 12, and the foreground visible model $\mu^i$ and background visible model $\mu^w$ stored in the visible model storage unit 15, and supplies the particle $z^{i(1)}_t$ and weighting $w^{i(1)}_t$ of the state $z^i_t$ to the visible model updating unit 14 and most-likely state calculating unit 16 as results of the estimation thereof.

Note that, with the foreground state estimating unit 13, as appropriate, the state $z^i_t$ of the foreground #i may be estimated using the motion model $a^i$ stored in the motion model storage unit 20 and the action $u^i_t$ stored in the action series storage unit 23.

The visible model updating unit 14 updates the foreground visible model $\mu^i$ and background visible model $\mu^w$ stored in the visible model storage unit 15 using the actual image $\lambda^\sim_t$ from the sensor 12, and the particle $z^{i(1)}_t$ and weighting $w^{i(1)}_t$ of the state $z^i_t$ serving as estimation results of the state $z^i_t$ of the foreground #i supplied from the foreground state estimating unit 13.

Specifically, the visible model updating unit 14 updates a foreground texture model $\tau^i$ of the foreground visible model $\mu^i$ in accordance with Expressions (24) to (27), and updates a foreground shape model $\sigma^i$ of the foreground visible model $\mu^i$ in accordance with Expressions (34) to (38).

Also, the visible model updating unit 14 updates the background visible model $\mu^w$ (background texture model $\tau^w$) in accordance with Expressions (28) to (33).

The visible model storage unit 15 stores the foreground visible model $\mu^i$ and background visible model $\mu^w$.

The most-likely state calculating unit 16 obtains the most-likely state $z^i_t$ using the particle $z^{i(1)}_t$ and weighting $w^{i(1)}_t$ of the state $z^i_t$ serving as estimation results of the state $z^i_t$ of the foreground #i supplied from the foreground state estimating unit 13 in accordance with Expression (39), and supplies this to the most-likely state series storage unit 17.

The most-likely state series storage unit 17 sequentially stores the most-likely state $z^i_t$ from the most-likely state calculating unit 16. With the most-likely state series storage unit 17, the most-likely state $z^i_t$ from the most-likely state calculating unit 16 is sequentially stored, and consequently, most-likely series $Z^i_t = \{z^i_1, z^i_2, \ldots, z^i_t\}$ are stored.

The motion model estimating unit 18 estimates the motion model $a^i$ using the most-likely series $Z^i_t = \{z^i_{t-TDYN+1}, z^i_{t-TDYN+2}, \ldots, z^i_t\}$ for the past $T_{DYN}-1$ time worth stored in the most-likely state series storage unit 17, the most-likely state $z^i_{t-TDYN}$ at the point-in-time $t-T_{DYN}$, and action series $U^i_{t-1} = \{u^i_{t-TDYN}, u^i_{t-TDYN+1}, \ldots, u^i_{t-1}\}$ stored in the action series storage unit 23, and supplies the particle $a^{i(1)}_t$ and weighting $w^{i(1)}_t$ of the motion model $a^i$ serving as estimation results to the motion model updating unit 19.

The motion model updating unit 19 updates the motion model $a^i$ stored in the motion model storage unit 20 using the particle $a^{i(1)}_t$ and weighting $w^{i(1)}_t$ of the motion model $a^i$ serving as estimation results of the motion model $a^i$ supplied from the motion model estimating unit 18.

Specifically, the motion model updating unit 19 updates the motion model $a^i$ in accordance with Expression (45).

The motion model storage unit 20 stores the motion model $a^i$.

The target generating unit 21 generates a position $s^{tgt}$ and attitude $q^{tgt}$ serving as the target state of the foreground, and supplies these to the action generating unit 22. Note that the target generating unit 21 may generate a target state, for example, in accordance with a user's operations, an optional algorithm to set a target state, or the like.

The action generating unit 22 generates action $u^i_t$ to change the states of the foreground #i to the target state supplied from the target generating unit 21 using the foreground visible model $\mu^i$ stored in the visible model storage unit 15, the most-likely state $z^i_t$ stored in the most-likely state series storage unit 17, and the motion model $a^i$ stored in the motion model storage unit 20, and supplies this to the actuator control unit 11 and action series storage unit 23.

The action series storage unit 23 stores the action $u^i_t$ supplied from the sensor 12, and the action $u^i_t$ supplied from the action generating unit 22.

Figure 22:
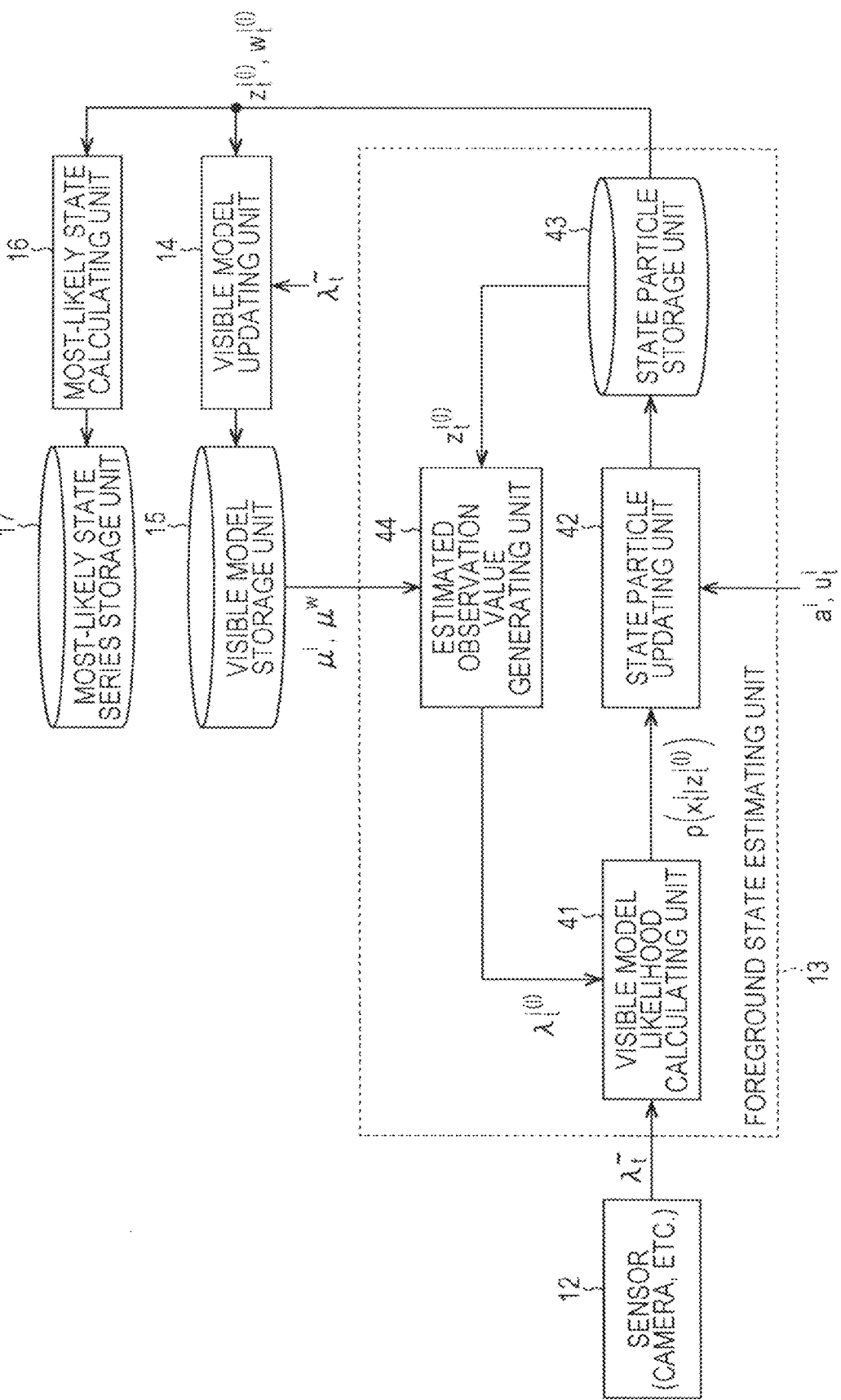
FIG. 22 is a block diagram illustrating a configuration example of a foreground state estimating unit.

FIG. 22 is a block diagram illustrating a configuration example of the foreground state estimating unit 13 in FIG. 21.

The foreground state estimating unit 13 includes a visible model likelihood calculating unit 41, a state particle updating unit 42, a state particle storage unit 43, and an estimated observation value generating unit 44.

With the visible model likelihood calculating unit 41, the observation value (actual image) $\lambda^\sim_t$ of an image is supplied from the sensor 12, and also, the observation image $\lambda^{i(1)}_t$ observed at the generating model is supplied from the estimated observation value generating unit 44.

The visible model likelihood calculating unit 41 obtains observation likelihood $p(x^i_t|z^{i(1)}_t)$ of the observation value $x^i_t$ of the foreground #i when the foreground #i of interest is in the state $z^{i(1)}_t$ serving as a particle using the actual image $\lambda^\sim_t$ from the sensor 12 and the observation image $\lambda^{i(1)}_t$ from the estimated observation value generating unit 44 in accordance with Expression (22), and supplies this to the state particle updating unit 42.

The state particle updating unit 42 performs prediction (calculation) of a transition destination of a particle to obtain a particle $z^{i(1)}_t$ serving as the state $z^i_t$ at the next point-in-time t from the state $z^{i(1)}_{t-1}$ serving as a particle at the point-in-time t−1 stored in the state particle storage unit 43 in accordance with Expression (20) or Expression (21), as estimation of the state $z^i_t$ of the foreground #i serving as a particle.

The state particle updating unit 42 supplies the particle $z^{i(1)}_t$ serving as the state $z^i_t$ at the next point-in-time t to the state particle storage unit 43, and stores this therein instead of the state $z^{i(1)}_{-1}$ serving as a particle at the point-in-time t−1.

Further, the state particle updating unit 42 obtains the weighting $w^{i(1)}_t$ of the particle $z^{i(1)}_t$ using the observation likelihood $p(x^i_t|z^{i(1)}_t)$ from the visible model likelihood calculating unit 41 in accordance with Expression (14), and supplies this to the state particle storage unit 43 to store this therein in the same way as with the particle $z^{i(1)}_t$.

Also, the state particle updating unit 42 performs re-sampling to select the particle $z^{i(1)}_t$ with probability corresponding to the weighting $w^{i(1)}_t$ of the particle $z^{i(1)}_t$, and rewrites the particle $z^{i(1)}_t$ stored in the state particle storage unit 43 with the re-sampling results.

The particle $z^{i(1)}_t$ serving as re-sampling results is used at the time of predicting the particle $z^{i(1)}_{t+1}$ serving as the state $z^i_{t+1}$ at the point-in-time t+1 in accordance with Expression (20) or Expression (21) after the observation likelihood $p(x^{i(1)}_{t+1}|z^{i(1)}_{t+1})$ at the next point-in-time t+1 is obtained.

Note that, with the state particle updating unit 42, when predicting the particle $z^{i(1)}_t$ serving as the state $z^i_t$ at the point-in-time t in accordance with Expression (21) of Expressions (20) and (21), the motion model $a^i$ stored in the motion model storage unit 20 and the action $u^i_t$ stored in the action series storage unit 23 are employed. That is to say, $\gamma/m$ and $\Phi/I_c$ in Expression (21) are obtained using the motion model $a^i$ and action $u^i_t$.

The state particle storage unit 43 stores the particle $z^{i(1)}_t$ serving as the foreground state $z^i_t$ and the weighting $w^{i(1)}_t$ thereof that the state particle updating unit 42 updates.

The estimated observation value generating unit 44 generates an observation image (image to be observed at the generating model) $\lambda^{i(1)}_t$ where the foreground state has become the sate $z^{i(1)}_t$ serving as each particle stored in the state particle storage unit 43 using the foreground visible model $\mu^i$ and background visible model $\mu^w$ stored in the visible model storage unit 15 in accordance with Expression (23), and supplies this to the visible model likelihood calculating unit 41.

Figure 23:
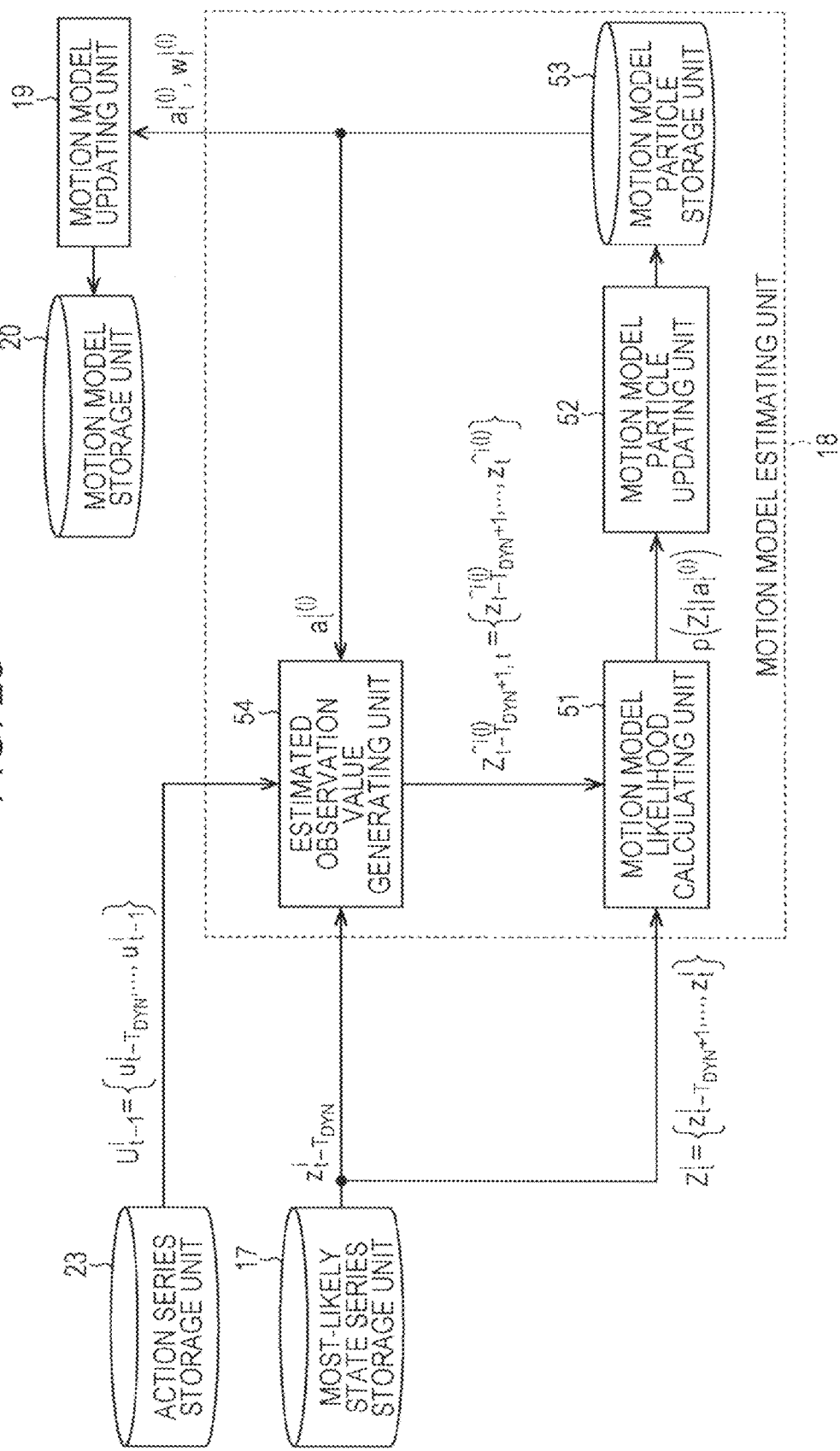
FIG. 23 is a block diagram illustrating a configuration example of a motion model estimating unit.

FIG. 23 is a block diagram illustrating a configuration example of the motion model estimating unit 18 in FIG. 21.

The motion model estimating unit 18 includes a motion model likelihood calculating unit 51, a motion model particle updating unit 52, a motion model particle storage unit 53, and an estimated observation value generating unit 54.

With the motion model likelihood calculating unit 51, the most-likely series $Z^i_t = \{z^i_{t-TDYN+1}, z^i_{t-TDYN+2}, \ldots, z^i_t\}$ of the state of the foreground #i are supplied from the most-likely state series storage unit 17. Further, with the motion model likelihood calculating unit 51, state series $Z^{\hat{i}}_{t-TDYN:t} = \{z^{\hat{i}}_{t-TDYN+1}, z^{\hat{i}}_{t-TDYN+2}, \ldots, z^{\hat{i}}_t\}$ of the foreground #i obtained in accordance with the motion equations in Expressions (41) and (42) are supplied from the estimated observation value generating unit 54.

The motion model likelihood calculating unit 51 obtains observation likelihood of the state series $Z^{\hat{i}}_{t-TDYN+1:t}$ (likelihood that the state series $Z^{\hat{i}}_{t-TDYN+1:t}$ will be observed under the particle $a^{i(1)}_t$ serving as the motion model) $p(z^i_t|a^i)=p(Z^i_t|a^{i(1)}_t)$ in the event that the motion model $a^i_t$ is the particle $a^{i(1)}_t$ serving as a motion model in accordance with Expression (43) using the most-likely series $Z^i_t = \{z^i_{t-TDYN+1}, z^i_{t-TDYN+2}, \ldots, z^i_t\}$ from the most-likely state series storage unit 17 and the state series $Z^{\hat{i}(1)}_{t-TDYN+1:t} = \{z^{\hat{i}(1)}_{t-TDYN+1}, z^{\hat{i}(1)}_{t-TDYN+2}, \ldots, z^{\hat{i}(1)}_t\}$ obtained from the estimated observation value generating unit 54 following the motion equations in Expressions (41) and (42), and supplies this to the motion model particle updating unit 52.

The motion model particle updating unit 52 performs prediction (calculation) of a transition destination of a particle to obtain the particle $a^{i(1)}_t$ serving as the motion model $a^i_t$ at the next point-in-time t from the motion model $a^{i(1)}_{t-1}$ serving as a particle at the point-in-time t−1 stored in the motion model particle storage unit 53 in accordance with Expression (44), as estimation of the motion model $a^i_t$ serving as a particle.

The motion model particle updating unit 52 supplies the particle $a^{i(1)}_t$ serving as the motion model $a^i_t$ at the point-in-time t to the motion model particle storage unit 53, and stores this therein instead of the motion model $a^{i(1)}_{t-1}$ serving as a particle at the point-in-time t−1.

Further, the motion model particle updating unit 52 obtains the weighting $w^{i(1)}_t$ of the particle $a^{i(1)}_t$ in accordance with Expression (14) using the observation likelihood $p(Z^i_t|a^{i(1)}_t)$ from the motion model likelihood calculating unit 51 instead of the observation likelihood $p(x^i_t|z^{i(1)}_t)$ in Expression (14), and supplies this to the motion model particle storage unit 53 to store this therein in the same way as with the particle $a^{i(1)}_t$.

Also, the motion model particle updating unit 52 performs re-sampling to select the particle $a^{i(1)}_t$ with probability corresponding to the weighting $w^{i(1)}_t$ of the particle $a^{i(1)}_t$, and rewrites the particle $a^{i(1)}_t$ stored in the motion model particle storage unit 53 with the re-sampling results.

The particle $a^{i(1)}_t$ serving as the re-sampling results is used when predicting the particle $a^{i(1)}_{t+1}$ serving as the motion model $a^i_{t+1}$ at the next point-in-time t+1 in accordance with Expression (44) after the observation likelihood $p(Z^i_{t+1}|a^{i(1)}_{t+1})$ at the next point-in-time t+1 is obtained.

The motion model particle storage unit 53 stores the particle $a^{i(1)}_t$ serving as the foreground motion model $a^i_t$ and the weighting $w^{i(1)}_t$ thereof that the motion model particle updating unit 52 updates.

The estimated observation value generating unit 54 takes the most-likely state $z^i_{t-TDYN}$ at the point-in-time $t-T_{DYN}$ as an initial value, and calculates the motion equations in Expressions (41) and (42) using the particle $a^{i(1)}_t$ serving as the motion model stored in the motion model particle storage unit 53, and action series $U^i_{t-1} = \{u^i_{t-TDYN}, u^i_{t-TDYN+1}, \ldots, u^i_{t-1}\}$ stored in the action series storage unit 23, thereby obtaining the state series $Z^{\hat{i}(1)}_{t-TDYN+1:t} = \{z^{\hat{i}(1)}_{t-TDYN+1}, z^{\hat{i}(1)}_{t-TDYN+2}, \ldots, z^{\hat{i}(1)}_t\}$ of the foreground #i to be moved in accordance with the motion equations in Expressions (41) and (42), and supplying these to the motion model likelihood calculating unit 51.

Figure 24:
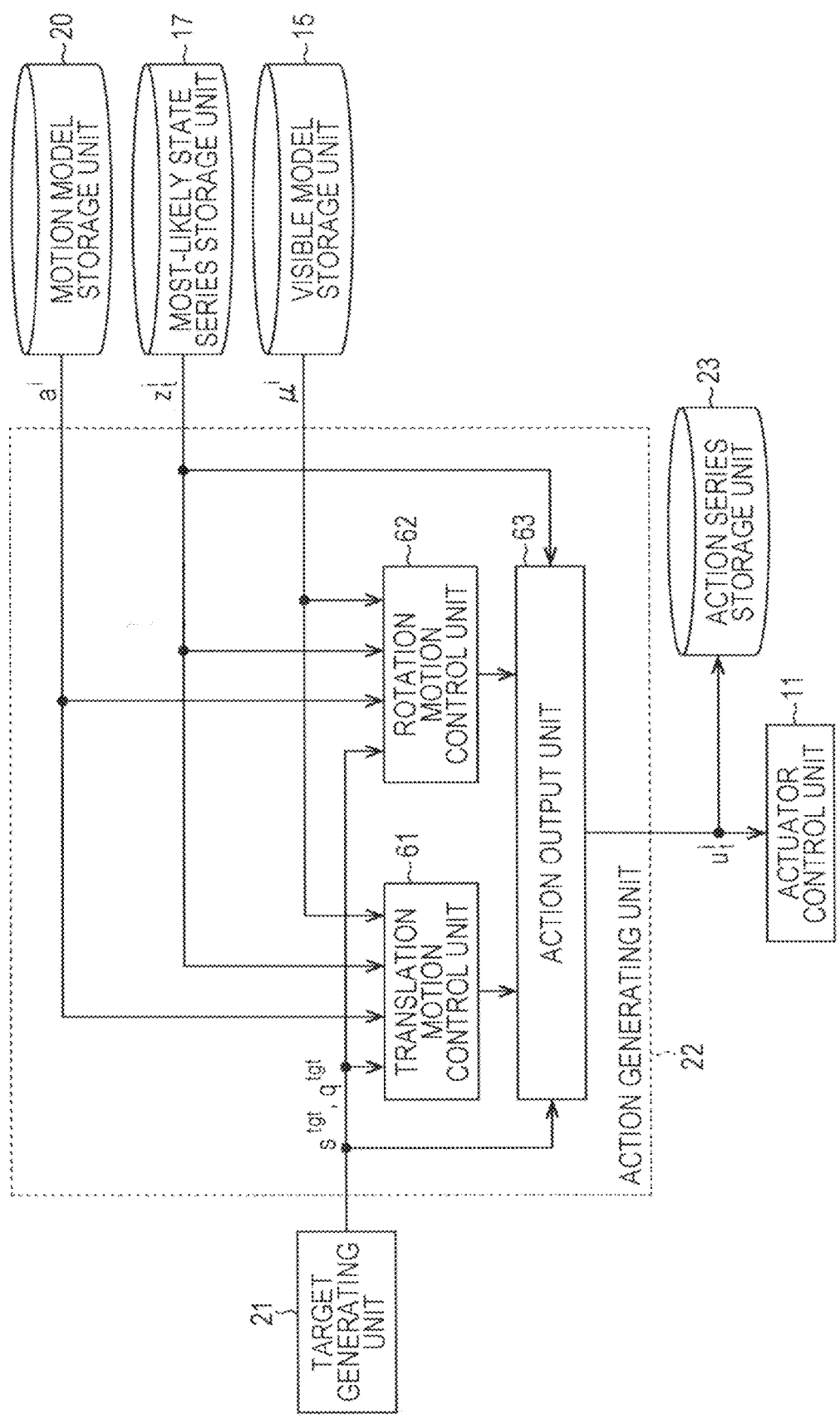
FIG. 24 is a block diagram illustrating a configuration example of an action generating unit.

FIG. 24 is a block diagram illustrating a configuration example of the action generating unit 22 in FIG. 21.

In FIG. 24, the action generating unit 22 includes a translation motion control unit 61, a rotation motion control unit 62, and an action output unit 63, and generates action such as the hand serving as the other foreground or the like for changing the state of the object to be operated or the like serving as one foreground to a predetermined target state using the foreground visible model $\mu^i$ stored in the visible model storage unit 15 and the motion model $a^i$ stored in the motion model storage unit 20, and so forth.

Specifically, with the translation motion control unit 61, there are supplied the foreground visible model $\mu^i$ stored in the visible model storage unit 15, the most-likely state $z^i_t$ stored in the most-likely state series storage unit 17, the motion model $a^i$ stored in the motion model storage unit 20, and the target position $s^{tgt}$ and target attitude $q^{tgt}$ serving as the target state generated at the target generating unit 21.

The translation motion control unit 61 recognizes the edges of the foreground (object) #i to be operated from the foreground visible model $\mu^i$ and most-likely state $z^i_t$, and obtains, as described with FIG. 18, a point of load for performing translation motion to bring a position $s^{obj}_t = s^i_t$ serving the current state (most-likely state $z^i_t$) of the foreground #i close to the target position $s^{tgt}$, and a force vector to be applied to the point of load thereof.

The translation motion control unit 61 supplies the point of load and force vector to the action output unit 63.

With the rotation motion control unit 62, there are supplied the foreground visible model $\mu^i$ stored in the visible model storage unit 15, the most-likely state $z^i_t$ stored in the most-likely state series storage unit 17, the motion model $a^i$ stored in the motion model storage unit 20, and the target position $s^{tgt}$ and target attitude $q^{tgt}$ serving as the target state generated at the target generating unit 21.

The rotation motion control unit 62 recognizes the edges of the foreground (object) #i to be operated from the foreground visible model $\mu^i$ and most-likely state $z^i_t$, and obtains, as described with FIG. 19, a point of load for performing rotation motion to bring attitude $q^{obj}_t = q^i_t$ serving the current state (most-likely state $z^i_t$) of the foreground #i close to the target attitude $q^{tgt}$, and a force vector to be applied to the point of load thereof.

The rotation motion control unit 62 supplies the point of load and force vector to the action output unit 63.

The action output unit 63 generates, in accordance with the point of load and force vector from the translation motion control unit 61 or rotation motion control unit 62, a velocity vector $s^{·manip}_t$ for applying the force of the force vector thereof to the point of load thereof in accordance with Expression (48), and outputs this to the actuator control unit 11 and action series storage unit 23 as action of the hand.

Note that the action output unit 63 obtains the initial position $s^{manip}_0$ described with FIG. 20 when starting translation motion and when starting rotation motion, and outputs action to move the hand to the initial position $s^{manip}_0$ thereof.

Also, with the action output unit 63, there are supplied the most-likely state $z^i_t$ stored in the most-likely state series storage unit 17, and the target position $s^{tgt}$ and target attitude $q^{tgt}$ serving as the target state generated at the target generating unit 21.

The action output unit 63 obtains error of the position $s^i_t$ serving as the most-likely state $z^i_t$ of the object to be operated with respect to the target position $s_{tgt}$, and error of the attitude serving as the most-likely state $z^i_t$ with respect to the target attitude $q^{tgt}$, and controls output of action to move the hand according to the error of the position $s^i_t$ and the error of the attitude $s^i_t$.

FIG. 25 is a flowchart for describing overview of learning processing of a foreground model, background model, and motion model to be performed by the agent in FIG. 21.

With the agent, an image is shot at the sensor 12, and the image (actual image) $\tilde{\lambda}_t$ thereof is supplied from the sensor 12 to the foreground state estimating unit 13 and visible model updating unit 14.

Upon the actual image $\tilde{\lambda}_t$ being supplied from the sensor 12 to the foreground state estimating unit 13, in step S31 the agent selects the foreground model #i which has not been selected as the model of interest, as the model of interest with respect to the actual image $\tilde{\lambda}_t$ r and the processing proceeds to step S32.

In step S32, the foreground state estimating unit 13 estimates the state $z^i_t$ of the foreground #i using the observation value $\tilde{\lambda}_t$ of the image from the sensor 12, the foreground visible model $\mu^i$ which the model of interest stored in the visible model storage unit 15 and the background visible model $\mu^w$, and supplies the particle $z^{i(1)}_t$ of the state $z^i_t$ of the foreground #i that the model of interest represents, and the weighting $w^{i(1)}_t$ thereof to the visible model updating unit 14 and most-likely state calculating unit 16 as results of the estimation thereof, and the processing proceeds to step S33.

Here, the most-likely state calculating unit 16 obtains the most-likely state $z^i_t$ in accordance with Expression (39) using the particle $z^{i(1)}_t$ and weighting $w^{i(1)}_t$ of the state $z^i_t$ serving as the estimation results of the state $z^i_t$ of the foreground #i supplied from the foreground state estimating unit 13, and supplies this to the most-likely state series storage unit 17 to store this therein.

In step S33, the visible model updating unit 14 updates the foreground visible model $\mu^i$ stored in the visible model storage unit 15 using the observation value $\tilde{\lambda}_t$ of the image from the sensor 12, and the particle $z^{i(1)}_t$ and weighting $w^{i(1)}_t$ of the state $z^i_t$ serving as the estimation results of the state $z^i_t$ of the foreground #i supplied from the foreground state estimating unit 13, and the processing proceeds to step S34.

In step S34, the visible model updating unit 14 updates the background visible model $\mu^w$ stored in the visible model storage unit 15 using the observation value $\tilde{\lambda}_t$ of the image from the sensor 12, and the particle $z^{i(1)}_t$ and weighting $w^{i(1)}_t$ of the state $z^i_t$ serving as the estimation results of the state $z^i_t$ of the foreground #i supplied from the foreground state estimating unit 13, and the processing proceeds to step S35.

In step S35, the motion model estimating unit 18 estimates the motion model $a^i$ of the foreground #i that the model of interest represents using the most-likely series $Z^i_t = (z^i_{t-T_{DYN}+1}, z^i_{t-T_{DYN}+2}, \ldots, z^i_t)$ for the past $T_{DYN}-1$ time worth stored in the most-likely state series storage unit 17, the most-likely state $z^i_{t-T_{DYN}}$, and the action series $U^i_{t-1} = \{u^i_{t-T_{DYN}}, u^i_{t-T_{DYN}+1}, \ldots, u^i_{t-1}\}$ stored in the action series storage unit 23, and supplies the particle $a^{i(1)}_t$ of the motion model $a^i$ and weighting $w^{i(1)}_t$ thereof to the motion model updating unit 19 as estimation results, and the processing proceeds to step S36.

In step S36, the motion model updating unit 19 updates the motion model $a^i$ stored in the motion model storage unit 20 using the particle $a^{i(1)}_t$ and weighting $w^{i(1)}_t$ of the motion model $a^i$ serving as the estimation results of the motion model $a^i$ supplied from the motion model estimating unit 18.

Thereafter, the processing returns from step S36 to step S31, where of the N foreground models #1 to #N, one foreground model which has not been selected as the model of interest with respect to the actual image $\tilde{\lambda}_t$ is selected as the model of interest, and hereinafter, the same processing is repeated.

In the event that the N foreground models #1 to #N have been selected as the model of interest with respect to the actual image $\tilde{\lambda}_t$, the processing in steps S31 to S36 is repeated in wait for the actual image $\tilde{\lambda}_{t+1}$ at the next point-in-time t+1 being supplied from the sensor 12 to the foreground state estimating unit 13.

Note that, in FIG. 25, the processing in steps S32 to S34 is learning of a foreground model and background model, and the processing in steps S35 and S36 is learning of a motion model.

That is to say, with the agent, learning of a foreground model and background model, and learning of a motion model are alternately performed.

Figure 26:
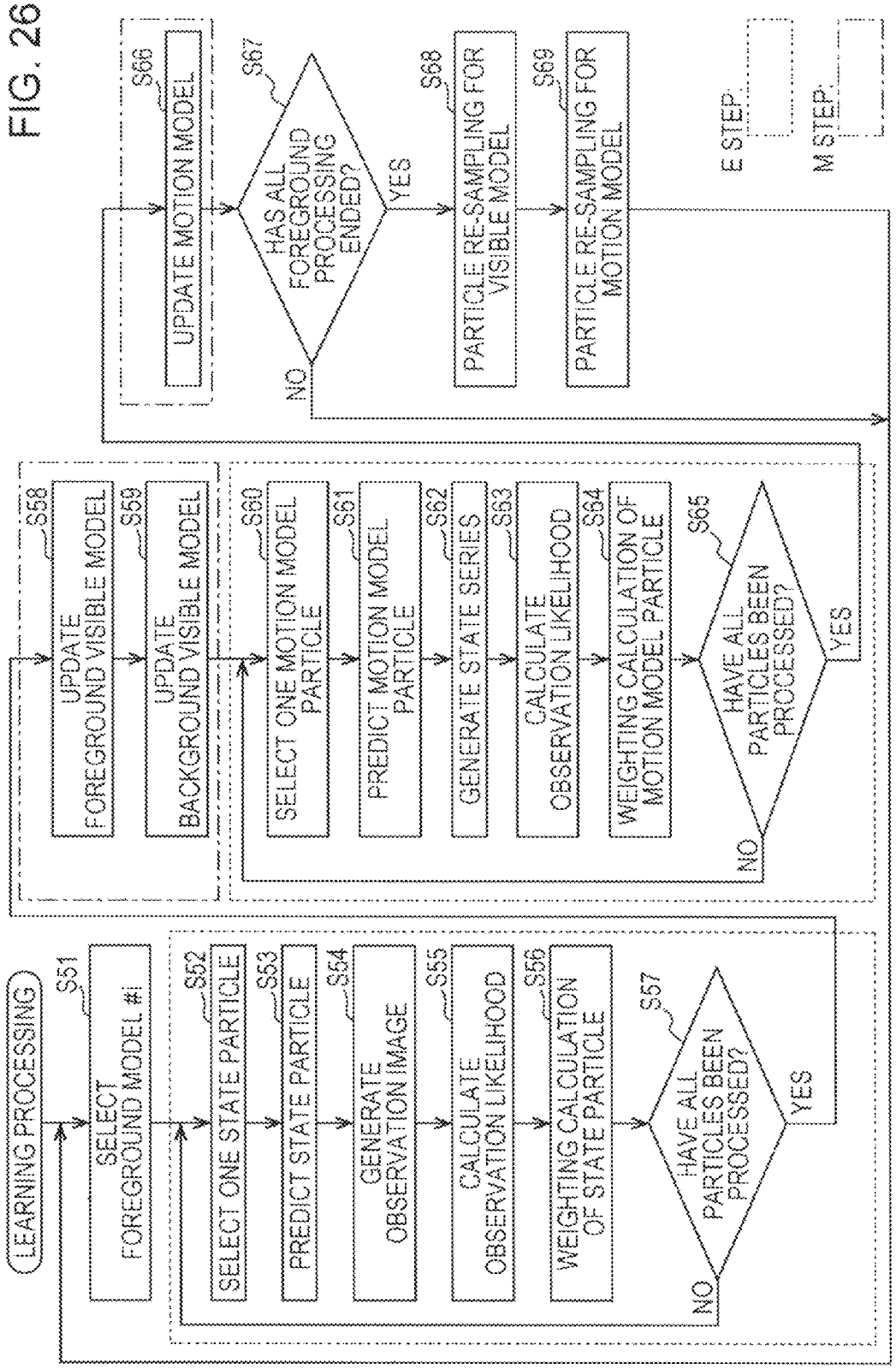
FIG. 26 is a flowchart for describing details of the learning processing for a foreground model, a background model, and a motion model that an agent performs.

FIG. 26 is a flowchart for describing details of the learning processing of a foreground model, background model, and motion model to be performed by the agent in FIG. 21.

With the agent, an image is shot at the sensor 12, and the image (actual image) $\tilde{\lambda}_t$ thereof is supplied from the sensor 12 to the foreground state estimating unit 13 and visible model updating unit 14.

Upon the actual image $\tilde{\lambda}_t$ being supplied from the sensor 12 to the foreground state estimating unit 13, in step S51 the agent selects the foreground model #i which has not been selected as the model of interest, as the model of interest with respect to the actual image $\tilde{\lambda}_t$ f and the processing proceeds to step S52.

In step S52, with the foreground state estimating unit 13 (FIG. 22), the state particle updating unit 42 selects one state particle $z^{i(1)}_{t-1}$ which has not been selected as the state particle of interest out of the states (hereinafter, also referred to as state particles) $z^{i(1)}_{t-1}$ to $z^{i(L)}_{t-1}$ of the foreground #i serving as L particles at the point-in-time t−1 stored in the state particle storage unit 43, as the state particle of interest, and the processing proceeds to step S53.

In step S53, the state particle updating unit 42 predicts the state particle $z^{i(1)}_t$ of interest at the point-in-time t from the state particle $z^{i(1)}_{t-1}$ of interest stored in the state particle storage unit 43 in accordance with Expression (20) or Expression (21).

Further, the state particle updating unit 42 supplies the state particle $z^{i(1)}_t$ of interest at the point-in-time t to the state particle storage unit 43 to store this therein instead of the state particle $z^{i(1)}_{t-1}$ of interest at the point-in-time t−1, and the processing proceeds from step S53 to step S54.

In step S54, with the foreground state estimating unit 13 (FIG. 22), the estimated observation value generating unit 44 generates an observation image (an image to be observed at the generating model) $\lambda^{i(1)}_t$ where the foreground state becomes the state particle $z^{i(1)}_t$ of interest stored in the state particle storage unit 43, using the foreground visible model $\mu^i$ and background visible model $\mu^w$ stored in the visible model storage unit 15 in accordance with Expression (23).

The estimated observation value generating unit 44 supplies the observation image $\lambda^{i(1)}_t$ to the visible model likelihood calculating unit 41, and the processing proceeds from step S54 to step S55.

In step S55, the visible model likelihood calculating unit 41 (FIG. 22) obtains observation likelihood $p(x^i_t|z^{i(1)}_t)$ of the observation value $x^i_t$ of the foreground #i when the foreground #i of interest becomes the state $z^{i(1)}_t$ serving as the state particle of interest in accordance with Expression (22) using the actual image $\lambda^\sim_t$ from the sensor 12 and the observation image $\lambda^{i(1)}_t$ from the estimated observation value generating unit 44.

The visible model likelihood calculating unit 41 supplies the observation likelihood $p(x^i_t|z^{i(1)}_t)$ to the state particle updating unit 42, and the processing proceeds from step S55 to step S56.

In step S56, the state particle updating unit 42 obtains weighting $w^{i(1)}_t$ of the state particle $z^{i(1)}_t$ of interest in accordance with Expression (14) using the observation likelihood $p(x^i_t|z^{i(1)}_t)$ from the visible model likelihood calculating unit 41, and supplies, in the same way as with the state particle $z^{i(1)}_t$, this to the state particle storage unit 43 to store this therein, and the processing proceeds to step S57.

In step S57, the state particle updating unit 42 determines whether or not all of the L state particles $z^{i(1)}_{t-1}$ to $z^{i(L)}_{t-1}$ at the point-in-time t−1 stored in the state particle storage unit 43 have been selected as the state particle of interest.

In the event that determination is made in step S57 that the L state particles $z^{i(1)}_{t-1}$ to $z^{i(L)}_{t-1}$ have not been selected as the state particle of interest, the processing returns to step S52, where the state particle updating unit 42 newly selects one state particle which has not been selected as the state particle of interest of the L state particles $z^{i(1)}_{t-1}$ to $z^{i(L)}_{t-1}$, as the state particle of interest, and hereinafter, the same processing is repeated.

Also, in the event that determination is made in step S57 that all of the L state particles $z^{i(1)}_{t-1}$ to $z^{i(L)}_{t-1}$ have been selected as the state particle of interest, the processing proceeds to step S58, where the visible model updating unit 14 updates the foreground visible model $\mu^i$ stored in the visible model storage unit 15 using the actual image $\lambda^\sim_t$ supplied from the sensor 12, the state particle $z^{i(1)}_t$ at the point-in-time t stored in the state particle storage unit 43 in step S53, and the weighting $w^{i(1)}_t$ stored in the state particle storage unit 43 in step S56, and the processing proceeds to step S59.

Specifically, the visible model updating unit 14 updates the foreground texture model $\tau^i$ of the foreground visible model $\mu^i$ in accordance with Expressions (24) to (27), and updates the foreground shape model $\sigma^i$ of the foreground visible model $\mu^i$ in accordance with Expressions (34) to (38).

Note that, as described above, the most-likely state calculating unit 16 obtains the most-likely state $z^i_t$ in accordance with Expression (39) using the state particle $z^{i(1)}_t$ stored in the state particle storage unit 43 and weighting $w^{i(1)}_t$ thereof, and supplies this to the most-likely state series storage unit 17 to store this therein in parallel with the visible model updating unit 14 updating the foreground visible model $\mu^i$.

In step S59, the visible model updating unit 14 updates the background visible model $\mu^w$ stored in the visible model storage unit 15 using the actual image $\lambda^\sim_t$ from the sensor 12, the state particle $z^{i(1)}_t$ at the point-in-time t stored in the state particle storage unit 43 in step S53, and the weighting $w^{i(1)}_t$ stored in the state particle storage unit 43 in step S56, and the processing proceeds to step S60.

Specifically, the visible model updating unit 14 updates the background visible model $\mu^w$ (background texture model $\tau^w$) in accordance with Expressions (28) to (33).

In step S60, with the motion model estimating unit 18 (FIG. 23), the motion model particle updating unit 52 selects one motion model particle $a^{i(1)}_{t-1}$ which has not been selected as the motion model particle of interest yet out of the motion models (hereinafter, also referred to as motion model particles) $a^{i(1)}_{t-1}$ to $a^{i(L)}_{t-1}$ of the foreground #i serving as the L particles at the point-in-time t−1 stored in the motion model particle storage unit 53, as the motion model particle of interest, and the processing proceeds to step S61.

In step S61, the motion model particle updating unit 52 predicts the motion model particle $a^{i(1)}_t$ of interest at the next point-in-time t from the motion model particle $a^{i(1)}_{t-1}$ of interest at the point-in-time t−1 stored in the motion model particle storage unit 53 in accordance with Expression (44).

Further, in step S61, the motion model particle updating unit 52 supplies the motion model particle $a^{i(1)}_t$ of interest at the point-in-time t to the motion model particle storage unit 53 to store this therein instead of the motion model $a^{i(1)}_{t-i}$ serving as the particle at the point-in-time t−1, and the processing proceeds to step S62.

In step S62, the estimated observation value generating unit 54 (FIG. 23) takes the most-likely state $z^i_{t-TDYN}$ at the point-in-time t−$T_{DYN}$ stored in the most-likely state series storage unit 17 as an initial value, and calculates the motion equations in Expressions (41) and (42) using the motion model particle $a^{i(1)}_t$ of interest stored in the motion model particle storage unit 53 and the action series $U^i_{t-1} = \{u^i_{t-TDYN}, u^i_{t-TDYN+1}, \ldots, u^i_{t-1}\}$ stored in the action series storage unit 23, thereby obtaining the state series $Z^{\wedge i(1)}_{t-TDYN+1:t} = \{z^{\wedge i(1)}_{t-TDYN+1}, z^{\wedge i(1)}_{t-TDYN+2}, \ldots, z^{\wedge i(1)}_t\}$ of the foreground #i which moves in accordance with the motion equations in Expressions (41) and (42) with respect to the motion model particle $a^{i(1)}_t$ of interest.

The estimated observation value generating unit 54 supplies the state series $Z^{\wedge i(1)}_{t-TDYN+1:t} = \{z^{\wedge i(1)}_{t-TDYN+1}, z^{\wedge i(1)}_{t-TDYN+2}, \ldots, z^{\wedge i(1)}_t\}$ obtained with respect to the motion model particle $a^{i(1)}_t$ of interest to the motion model likelihood calculating unit 51, and the processing proceeds from step S62 to step S63.

In step S63, the motion model likelihood calculating unit 51 obtains observation likelihood $p(z^i_t|a^i) = p(Z^i_t|a^{i(1)}_t)$ of the state series $z^{\wedge i(1)}_{t-TDYN+1:t}$ in the event that the motion model $a^i_t$ is the motion model particle $a^{i(1)}_t$ of interest, using the most-likely series $Z^i_t = \{z^i_{t-TDYN+1}, z^i_{t-TDYN+2}, \ldots, z^i_t\}$ stored in the most-likely state series storage unit 17 and the state series $Z^{\wedge i(1)}_{t-TDYN+1:t} = \{z^{\wedge i(1)}_{t-TDYN+2}, z^{\wedge i(1)}_{t-TDYN+2}, \ldots, z^{\wedge i(1)}_t\}$ with respect to the motion model particle $a^{i(1)}_t$ of interest from the estimated observation value generating unit 54 in accordance with Expression (43).

The motion model likelihood calculating unit 51 then supplies the observation likelihood $p(z^i_t|a^i) = p(Z^i_t|a^{i(1)}_t)$ to the motion model particle updating unit 52, and the processing proceeds from step S63 to step S64.

In step S64, the motion model particle updating unit 52 obtains weighting $w^{i(1)}_t$ of the motion model particle $a^{i(1)}_t$ of interest using the observation likelihood $p(Z^i_t|a^{i(1)}_t)$ from the motion model likelihood calculating unit 51 instead of the observation likelihood $p(x^i_t|z^{i(1)}_t)$ in Expression (14).

The motion model particle updating unit 52 supplies the weighting $w^{i(1)}_t$ of the motion model particle $a^{i(1)}_t$ of interest to the motion model particle storage unit 53 to store this therein in the same way as with the motion model particle $a^{i(1)}_t$, and the processing proceeds from step S64 to step S65.

In step S65, the motion model particle updating unit 52 determines whether or not all of the L motion model particles $a^{i(1)}_{t-1}$ to $a^{i(L)}_{t-1}$ at the point-in-time t−1 stored in the motion model particle storage unit 53 have been selected as the motion model particle of interest.

In the event that determination is made in step S65 that the L motion model particles $a^{i(1)}_{t-1}$ to $a^{i(L)}_{t-1}$ have not been selected yet as the motion model particle of interest, the processing returns to step S60, where the motion model particle updating unit 52 newly selects one motion model particle which has not been selected yet as the motion model particle of interest, of the L motion model particles $a^{i(1)}_{t-1}$ to $a^{i(L)}_{t-1}$, as the motion model particle of interest, and hereinafter, the same processing is repeated.

Also, in the event that determination is made in step S65 that all of the L motion model particles $a^{i(1)}_{t-1}$ to $a^{i(L)}_{t-1}$ have been selected as the motion model particle of interest, the processing proceeds to step S66, where the motion model updating unit 19 (FIG. 21) updates the motion model $a^i$ stored in the motion model storage unit 20 in accordance with Expression (45) using the motion model particle $a^{i(1)}_t$ and weighting $w^{i(1)}_t$ stored in the motion model particle storage unit 53, and the processing proceeds to step S67.

In step S67, the agent determines whether or not all of the N foreground models #1 to #N have been selected as the model of interest with respect to the actual image $\tilde{\lambda}_t$.

In the event that determination is made in step S67 that the N foreground models #1 to #N have not been selected as the model of interest yet, the processing returns to step S51. In step S51, the agent newly selects the foreground model #i which has not been selected as the model of interest with respect to the actual image $\tilde{\lambda}_t$, as the model of interest, and hereinafter, the same processing is repeated.

Also, in the event that determination is made in step S67 that all of the N foreground models #1 to #N have been selected as the model of interest, the processing proceeds to step S68, where the state particle updating unit 42 (FIG. 22) performs re-sampling to select the state particle $z^{i(1)}_t$ stored in the state particle storage unit 43 with probability corresponding to the weighting $w^{i(1)}_t$ similarly stored in the state particle storage unit 43, rewrites the state particle $z^{i(1)}_t$ stored in the state particle storage unit 43 with the re-sampling result, and the processing proceeds to step S69.

The state particle $z^{i(1)}_t$ serving as the re-sampling result is used at the time of predicting the state particle $z^{i(1)}_{t+1}$ serving as the state $z^i_{t+1}$ at the point-in-time t+1 in accordance with Expression (20) or Expression (21) after the observation likelihood $p(x^i_{t+1}|z^{i(1)}_{t+1})$ at the next point-in-time t+1 is obtained.

In step S69, the motion model particle updating unit 52 (FIG. 23) performs re-sampling to select the motion model particle $a^{i(1)}_t$ stored in the motion model particle storage unit 53 with probability corresponding to the weighting $w^{i(1)}_t$ similarly stored in the motion model particle storage unit 53, rewrites the motion model particle $a^{i(1)}_t$ stored in the motion model particle storage unit 53 with the re-sampling result.

The motion model particle $a^{i(1)}_t$ serving as the re-sampling result is used at the time of predicting the motion model particle $a^{i(1)}_{t+1}$ serving as the motion model $a^i_{t+1}$ at the point-in-time t+1 in accordance with Expression (44) after the observation likelihood $p(Z^i_{t+1}|a^{i(1)}_{t+1})$ at the next point-in-time t+1 is obtained.

After the processing in step S69, an actual image $\tilde{\lambda}_{t+1}$ at the next point-in-time is shot at the sensor 12, the processing returns to step S51 in wait for the actual image $\tilde{\lambda}_{t+1}$ thereof being supplied from the sensor 12 to the foreground state estimating unit 13, and hereinafter, the same processing is repeated.

Note that, in FIG. 26, steps S52 to S57 and steps S60 to S65 are equivalent to the E step in the EM algorithm, and steps S58 and S59 and step S66 are equivalent to the M step in the EM algorithm.

Figure 27:
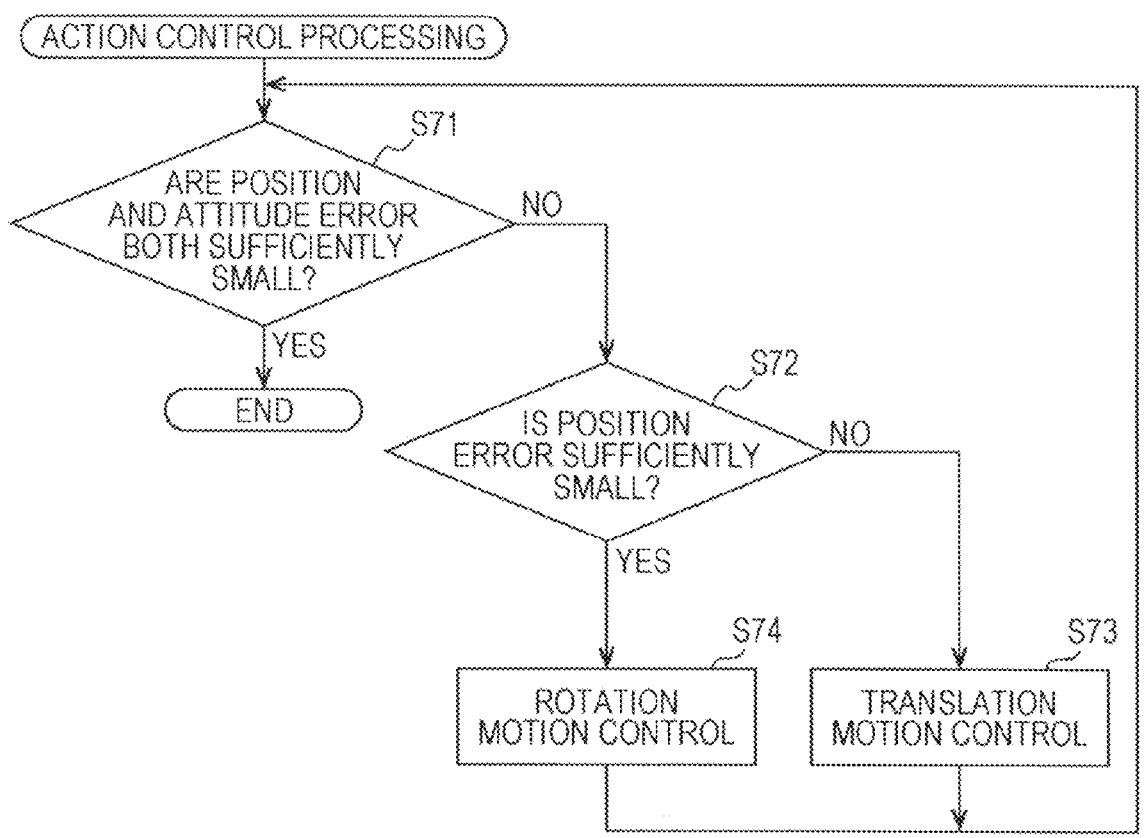
FIG. 27 is a flowchart for describing overview of action control processing that an agent performs for object operations.

FIG. 27 is a flowchart for describing overview of action control processing that the agent performs for object operations.

In step S71, the action output unit 63 (FIG. 24) determines, based on the most-likely state $z^i_t$ at the current point-in-time t stored in the most-likely state series storage unit 17, and the target position $s^{tgt}$ and target attitude $q^{tgt}$ serving as a target state generated at the target generating unit 21, whether or not both of error of the position $s^i_t$ serving as the most-likely state $z^i_t$ of the object to be operated with respect to the target position $s^{tgt}$ (hereinafter, also referred to as position error), and error of the attitude $s^i_t$ serving as the most-likely state $z^i_t$ with respect to the target attitude $q^{tgt}$ (hereinafter, also referred to as attitude error) are sufficiently small.

In the event that determination is made in step S71 that one or both of the position error and attitude error are not sufficiently small, i.e., in the event that the position error or attitude error is not equal to nor smaller than a predetermined threshold, the processing proceeds to step S72, where the action output unit 63 determines, in the same way as with step S71, whether or not the position error is sufficiently small.

In the event that determination is made in step S72 that the position error is not sufficiently small, i.e., in the event that the position error is not equal to nor smaller than a predetermined threshold, the processing proceeds to step S73, where the action generating unit 22 (FIG. 24) performs translation motion control.

Specifically, in step S73, the translation motion control unit 61 recognizes the edges of the foreground (object) #i to be operated from the foreground visible model $\mu^i$ stored in the visible model storage unit 15 and the most-likely state $z^i_t$ stored in the most-likely state series storage unit 17, and obtains, as described with FIG. 18, a point of load for performing translation motion to bring the position $s^i_t=s^{obj}$ serving as the current state (most-likely state $z^i_t$) of the foreground #i close to the target position $s^{tgt}$ serving as the target state generated at the target generating unit 21, and a force vector of the force to be applied to the point of load thereof, and supplies these to the action output unit 63.

The action output unit 63 generates, in accordance with the point of load and force vector from the translation motion control unit 61, a velocity vector $s^{manip}_t$ for applying the force of the force vector thereof to the point of load thereof, in accordance with Expression (48), and outputs this to the actuator control unit 11 and action series storage unit 23 as action of the hand.

Thereafter, the processing returns from step S73 to step S71, and hereinafter, the same processing is repeated.

On the other hand, in the event that determination is made in step S72 that the position error is sufficiently small, i.e., in the event that the position error is equal to nor smaller than a predetermined threshold, the processing proceeds to step S73, where the action generating unit 22 performs rotation motion control.

Specifically, in step S74, the rotation motion control unit 62 recognizes the edges of the foreground (object) #i to be operated from the foreground visible model $\mu^i$ stored in the visible model storage unit 15 and the most-likely state $z^i_t$ stored in the most-likely state series storage unit 17, and obtains, as described with FIG. 19, a point of load for performing rotation motion to bring the attitude $q^i_t = q^{obj}_t$ serving as the current state (most-likely state $z^i_t$) of the foreground #i close to the target attitude $q^{tgt}$, and a force vector of the force to be applied to the point of load thereof.

The rotation motion control unit 62 supplies the point of load and force vector to the action output unit 63.

The action output unit 63 generates, in accordance with the point of load and force vector from the rotation motion control unit 62, a velocity vector $s^{·manip}_t$ for applying the force of the force vector thereof to the point of load thereof, in accordance with Expression (48), and outputs this to the actuator control unit 11 and action series storage unit 23 as action of the hand.

Thereafter, the processing returns from step S74 to step S71, and hereinafter, the same processing is repeated.

In the event that determination is made in step S71 that both of the position error and attitude error are sufficiently small, the action control processing is ended.

Note that, with the action control processing in FIG. 27 (the same is true in later-described FIG. 28), an arrangement may be made wherein in the event that translation motion is preferentially performed, and the position error decreases, rotation motion is performed, but conversely, in the event that rotation motion is preferentially performed, and the attitude error decreases, translation motion is performed.

Figure 28:
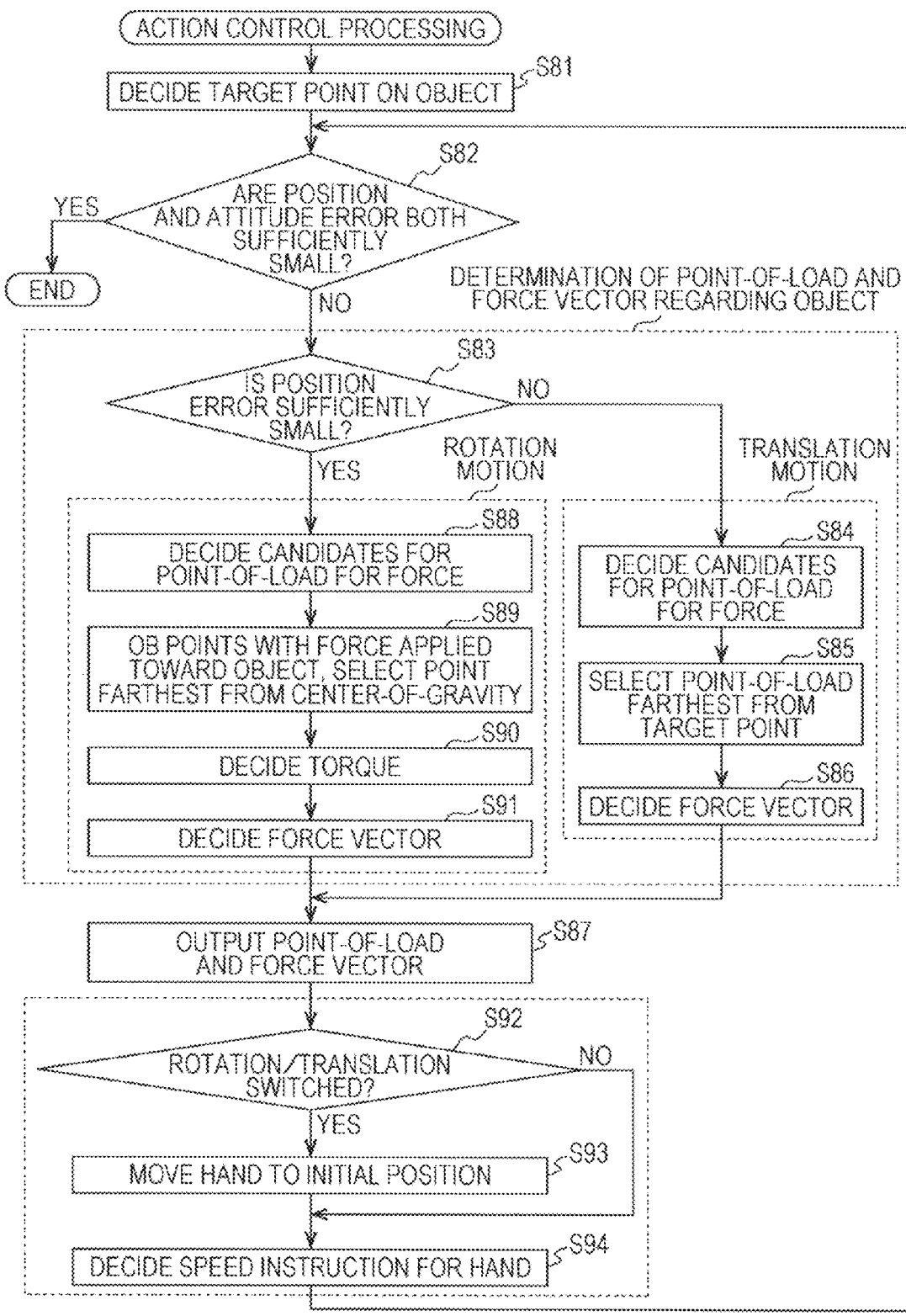
FIG. 28 is a flowchart for describing details of the action control processing that an agent performs for object operations.

FIG. 28 is a flowchart for describing details of the action control processing for the agent performing object operations.

In step S81, the target generating unit 21 generates (determines) the target position $s^{tgt}$ and target attitude $q^{tgt}$ serving as a target state, and supplies these to the translation motion control unit 61, rotation motion control unit 62, and action output unit 63 of the action generating unit 22 (FIG. 24), and the processing proceeds to step S82.

In step S82, the action output unit 63 determines, based on the most-likely state $z^i_t$ stored in the most-likely state series storage unit 17, and the target position $s^{tgt}$ and target attitude $q^{tgt}$ serving as the target state $Z^i_t$ from the target generating unit 21, whether or not both of error of the position $s^i_t = s^{obj}_t$ serving as the most-likely state of the object to be operated (position error) with respect to the target position $s^{tgt}$, and error of the attitude $s^i_t$ serving as the most-likely state $z^i_t$ (attitude error) with respect to the target attitude $q^{tgt}$ are sufficiently small.

In the event that determination is made in step S82 that one or both of the position error and attitude error are not sufficiently small, i.e., in the event that the position error or attitude error is not equal to nor smaller than a predetermined threshold, the processing proceeds to step S83, where the action output unit 63 determines, in the same way as with step S82, whether or not the position error is sufficiently small.

In the event that determination is made in step S83 that the position error is not sufficiently small, i.e., in the event that the position error is not equal to nor smaller than a predetermined threshold, the processing sequentially proceeds to steps S84 to S86, where the translation motion control unit 61 performs translation motion control.

Specifically, in step S84, the translation motion control unit 61 recognizes the edges of the foreground (object) #i to be operated from the foreground visible model $\mu^i$ stored in the visible model storage unit 15, and the most-likely state $z^i_t$ stored in the most-likely state series storage unit 17.

Further, the translation motion control unit 61 determines, as described with FIG. 18, intersections between the straight line L1 which connects the target position $s^{tgt}$ of the object, and the current position (center-of-gravity) $s^{obj}_t$, and the edges of the current object to be candidates of the point of load, and the processing proceeds from step S84 to step S85.

In step S85, the translation motion control unit 61 selects (determines), of candidates for the point of load obtained in step S84, a candidate farthest from the target position $s^{tgt}$ to be the point of load of the force, and the processing proceeds to step S86.

In step S86, the translation motion control unit 61 obtains a force vector of the force to be applied to the point of load in accordance with Expression (46), and the processing proceeds to step S87.

In step S87, the translation motion control unit 61 outputs the point of load and force vector obtained in steps S84 to S86 to the action output unit 63, and the processing proceeds to step S92.

On the other hand, in the event that determination is made in step S83 that the position error is sufficiently small, i.e., in the event that the position error is equal to or smaller than a predetermined threshold, the processing sequentially proceeds to steps S88 to S91, where the rotation motion control unit 62 performs rotation motion control.

Specifically, in step S88, the rotation motion control unit 62 recognizes the edges of the foreground (object) #i to be operated from the foreground visible model $\mu^i$ stored in the visible model storage unit 15, and the most-likely state $z^i_t$ stored in the most-likely state series storage unit 17.

Further, the rotation motion control unit 62 determines, as described with FIG. 19, an intersection between each of the three straight lines L1, L2, and L3 serving as one or more straight lines passed through the position (center-of-gravity) $s^{obj}_t$ of the current state of the object to be a candidate of the point of load, and the processing proceeds from step S88 to step S89.

In step S89, the rotation motion control unit 62 selects (determines) of candidates for the point of load obtained in step S88, a candidate farthest from the center-of-gravity $s^{obj}_t$ of the object which is a candidate where the direction of torque generated at the time of applying the force so as to press the edges of the object agrees with a direction intended to rotate the object, to be the point of load of the force, and the processing proceeds to step S90.

In step S90, the rotation motion control unit 62 obtains torque to be generated by the force vector of the force to be applied to the point of load in accordance with Expression (47), and the processing proceeds to step S91.

In step S91, the rotation motion control unit 62 obtains the force vector of the force to be applied to the point of load to generate the torque obtained in step S90, and the processing proceeds to step S87.

In step S87, the rotation motion control unit 62 outputs the point of load and force vector obtained in steps S88 to S91 to the action output unit 63, and the processing proceeds to step S92.

In step S92, the action output unit 63 determines whether or not motion control for object operations is immediately after change from one to the other of translation motion control by the translation motion control unit 61, and rotation motion control by the rotation motion control unit 62.

In the event that determination is made in step S92 that motion control is immediately after change from one to the other of translation motion control and rotation motion control, the processing proceeds to step S93, where the action output unit 63 outputs action to move the hand to the initial position described with FIG. 20.

In wait for the hand moving to the initial position, the processing proceeds from step S93 to step S94.

On the other hand, in the event that determination is made in step S92 that motion control is not immediately after change from one to the other of translation motion control and rotation motion control, the processing skips step S93 to proceed to step S94, where the action output unit 63 generates, in accordance with the point of load and force vector from the translation motion control unit 61 or rotation motion control unit 62, a velocity vector $s^{\cdot manip}{}_t$ for applying the force of the force vector thereof to the point of load thereof in accordance with Expression (48).

Further, the action output unit 63 outputs the velocity vector $s^{\cdot manip}{}_t$ generated in accordance with Expression (48) to the actuator control unit 11 and action series storage unit 23, and the processing returns to step S82.

In the event that determination is made in step S82 that both of the position error and attitude error are sufficiently small, i.e., in the event that both of the position error and attitude error are equal to or smaller than a predetermined threshold, the action control processing is ended determining that the state of the object to be operated becomes the target state generated at the target generating unit 21.

Simulation

FIGS. 29A to 29G are diagrams schematically illustrating simulation results of the learning processing and action control processing performed at a computer by employing an image created by synthesizing two foregrounds #1 and #2 as the actual image $\tilde{\lambda}_t$.

With the simulation, the learning processing of a foreground model, background model, and motion model was performed by employing an image on which a scene where the foreground #1 serving as a L-shaped object is operated by the foreground #2 serving as a circular hand is reflected, as the actual image $\tilde{\lambda}_t$.

FIG. 29A illustrates the actual image $\tilde{\lambda}_t$ at certain point-in-time t.

FIG. 29B illustrates an observation image $\lambda_t$ generated by superimposing a foreground visible model $\mu^1$ (foreground texture model $\tau^1$ and foreground shape model $\sigma^1$) obtained at the point-in-time t on a background visible model $\mu^w = \tau^w$ with the most-likely state $z^1{}_t$, and also superimposing a foreground visible model $\mu^2$ (foreground texture model $\tau^2$ and foreground shape model $\sigma^2$) on the background visible model $\mu^w$ with a most-likely state $z^2{}_t$.

FIG. 29C illustrates a scene when operating the L-shaped object by the circular hand, and specifically illustrates a force vector to be applied to the L-shaped object to be operated, and a point of load to which the force vector thereof is applied.

FIG. 29D illustrates the foreground texture model $\tau^1$ and foreground shape model $\sigma^1$ of the foreground visible model $\mu^1$ of the foreground #1, and the foreground texture model $\tau^2$ and foreground shape model $\sigma^2$ of the foreground visible model $\mu^2$ of the foreground #2.

FIG. 29E illustrates the background model $\mu^w = \tau^w$.

FIG. 29F illustrates center-of-gravity $r^1{}_c$ of each of two certain motion model particles (illustrated with a circle mark and a star mark) at certain point-in-time t serving as a motion model $a^1$ of the foreground #1 to be operated.

FIG. 29G illustrates mass $m^1{}_c$ and inertial moment $I^1{}_c$ of each of two certain motion model particles (illustrated with a circle mark and a star mark) at certain point-in-time t serving as the motion model $a^1$ of the foreground #1 to be operated.

According to the simulation performed by the present inventor, there was able to be confirmed a scene where as the learning processing advances, the foreground and background of the actual image $\tilde{\lambda}_t$ are acquired separately with the foreground models and background model respectively, and further, the two foregrounds #1 and #2 of the actual image $\tilde{\lambda}_t$ are exclusively acquired for each of the individual foreground models respectively, and the foreground visible models $\mu^1$ and $\mu^2$ and background visible model $\mu^w$ converge on the foregrounds #1 and #2 and background that are reflected on the actual image $\tilde{\lambda}_t$, respectively.

Also, with the simulation, it was able to be confirmed that as the foreground visible models $\mu^1$ and $\mu^2$ and background visible model $\mu^w$ converge, an observation image $\lambda_t$ to be generated with the foreground visible models $\mu^1$ and $\mu^2$ and background visible model $\mu^w$ thereof approximate the actual image $\tilde{\lambda}_t$.

As described above, according to the present technology, series of the actual images $\tilde{\lambda}_t$ to be observed at an agent capable of performing action are employed as learned data for learning, and accordingly, there may be readily performed foreground and background learning to simultaneously learn foreground visibility and a state (spatial) thereof and background visibility within an environment where the agent is allocated without an explicit tutor label to distinguish the foreground and background.

Specifically, according to the present technology, in the event that multiple foregrounds are moving on the background while changing their states such as a position, attitude, or the like, foreground visibility and state such as a position and attitude, and background visibility are simultaneously able to be acquired using times series of an actual image where the foregrounds are superimposed on the background as learned data even without teaching information of a foreground visibility and state and so forth beforehand.

Also, according to the present technology, in addition to an actual image, action series of a foreground are employed as learned data, and accordingly, a motion model of the foreground is able to be acquired, and further, the state of the foreground is able to be estimated with high precision by considering that action of a foreground follows a kinetics model for rigid-body motion, and consequently, foreground visibility and background visibility are able to be captured with high precision.

Additionally, according to the present technology, processing is performed with only a state serving as the particle $z^{i(1)}{}_t$ having high foreground observation likelihood $p(x_t | z^{i(1)}{}_t)$ as an object by applying the particle filter, and accordingly, calculation cost may exponentially be reduced as compared to, for example, a case where processing is performed by considering that, with regard to all of the pixels in the background, a foreground exists in the positions of the pixels thereof, and consequently, scalability may be improved.

For example, in the event that, with regard to each pixel of the background, processing is performed by taking that a foreground exists in the position of the pixel thereof, in order to execute 1-fps (Frames Per Second) calculation processing at a normal household PC, though there has been a limitation wherein an image with resolution of around horizontally 30 by vertically 40 pixels may be employed as an actual image, according to the present technology, an image with resolution of around horizontally 128 by vertically 128 pixels to horizontally 640 by vertically 480 pixels may be employed as an actual image.

Also, according to the present technology, in addition to the position $s^i_t$ of the foreground #i, velocity $s^{\cdot i}_t$ of change in the attitude $q^i_t$ or position $s^i_t$, velocity $q^{\cdot i}_t$ of change in the attitude $q^i_t$ may be handled as the state $z^i_t$ of the foreground #i. Specifically, with the present technology, with regard to a two-dimensional actual image, there may be handled six degrees of freedom of the x coordinate and y coordinate serving as the position $s^i_t$, a rotation angle serving as the attitude $q^i_t$, an x component and y component serving as the velocity $s^{\cdot i}_t$ of change in the position $s^i_t$, and an angular velocity serving as the velocity $q^{\cdot i}_t$ of change in the attitude $q^i_t$.

Further, with the present technology, when the observation value $x_{t+1}$ at the point-in-time t+1, series $X_t = \{x_1, x_2, \ldots, x_t\}$ of the observation value are observed until the point-in-time t, and a posterior distribution $p(z_{t+1}|X_t)$ that is in the state $z_{t+1}$ at the point-in-time t+1 is a mixed distribution in Expression (15) using transition probability $p(z_{t+1}|z^{(1)}_t)$ that is in the state $z^{(1)}_t$ at the point-in-time t will change to the state $z_{t+1}$ at the point-in-time t+1, and the weighting $w^{(1)}_t$ of the particle $z^{(1)}_t$, and accordingly, consecutive amount may be handled as a foreground state of such a posterior distribution $p(z_{t+1}|X_t)$.

Also, with the present technology, the foreground visible model $\mu^i$ includes the foreground texture model $\tau^i$ representing the texture of the foreground #i, and the foreground shape model $\sigma^i$ representing probability that a pixel value will be a pixel of the foreground, and accordingly, according to the foreground visible model $\mu^i$, even with a foreground having a complicated shape, the foreground thereof may be expressed with high precision.

Further, according to the present technology, the state of a foreground is estimated, and the foreground visible model $\mu^i$ and background visible model $\mu^w$ are updated using the estimation result of the foreground thereof, and also, a motion model which is a kinetics parameter for expressing spatial transition of a foreground is estimated using the estimation result of the foreground, and the motion model is updated using the estimation result of the motion model thereof, and accordingly, the center-of-gravity $r^i_c$, mass $m^i$, and inertial moment $I^i_c$, serving as the motion model $\sigma^i$ of the foreground #i, may be acquired with high precision.

Also, according to the present technology, there may be performed object operations to change an object within an environment to an optional state (target state) using (the foreground shape model $\sigma^i$ of) the foreground visible model $\mu^i$ and motion model.

Further, with the present technology, as the state $z^i_t$ of the foreground #i, in addition to the position $s^i_t$ and attitude $q^i_t$ of the foreground #i, velocity $s^{\cdot i}_t$ of change in the position $s^i_t$ and velocity $q^{\cdot i}_t$ of change in the attitude $q^i_t$ which are the primary differentials of the attitude $s^i_t$ and attitude $q^i_t$ are handled, and accordingly, a foreground which performs (motion approximate to) motion with constant velocity or motion with constant angular velocity may be modeled with high precision in accordance with the law of inertia, for example, like a rigid body which slides on an ice top.

Also, according to the present technology, an object which moves following an operation to change the attitude of the object or the rule of kinetics may be operated such as an object operation at the real world.

For example, with the present technology, object operations may be performed by considering that in the event of operating a slender object, translation motion may be performed in a stable manner by applying force a position closer to center-of-gravity, that in order to change the attitude of an object, the attitude may be changed with smaller force by applying force a position farther from center-of-gravity, and so forth.

Accordingly, the present technology may be expected to be applied to environment recognition of an agent which is implemented under a three-dimensional environment, and operates under the actual environment, or action control technique in the future.

Further, with the present technology, only by providing actual image series and action series as learned data, foregrounds and background are individually learned, and also a foreground motion model is learned, and finally, object operations may be performed, and accordingly, time and effort used for creating an environment model and a database like before may be omitted. Accordingly, improvement in adaptation capability under an optional environment may be expected.

Also, with the present technology, action control for object operations is executed based on the foreground visible model $\mu^i$ and motion model $a^i$ obtained by successive learning using an actual image where the object to be operated and the hand are reflected as foregrounds.

Accordingly, with the initial stage of learning, learning for the foreground visible model $\mu^i$ and motion model $a^i$ does not sufficiently converge, and accordingly, it is difficult to recognize a foreground such as the hand or object or the like within an environment, with high precision, and further, it is also difficult to perform suitable action control for object operations.

However, in the event that time has elapsed, and learning has advanced, recognition performance for a foreground has improved, and accompanied therewith, suitable action control for object operations has been enabled. As a result thereof, with the agent, the hand may be moved so as to effectively come into contact with the object to be operated, and it becomes easy to observe an actual image for accurately learning the foreground visible model $\mu^i$ and motion model $a^i$ of a foreground such as the hand or object or the like, and accordingly, as time elapses, learning capability is expected to improve.

Here, according to the present technology, with recognition of a foreground, for example, observation likelihood $p(x_t|z^i_t)$ that the observation value $x_t$ of the foreground #i which is in the most-likely state $z^i_t$ on an observation image $\lambda_t(s)$ to be generated from the generating model will be observed is calculated regarding each of the foreground models #i in accordance with Expression (19), and the foreground model #i of which the observation likelihood $p(x_t|z^i_t)$ is equal to or greater than a predetermined threshold is recognized to exist on the background in the most-likely sate $z^i_t$.

Description of Computer with Present Technology Being Applied

Next, the above-mentioned series of processing may be performed by hardware, or may be performed by software. In the event of performing the series of processing by software, a program making up the software thereof is installed into a general-purpose computer or the like.

Figure 30:
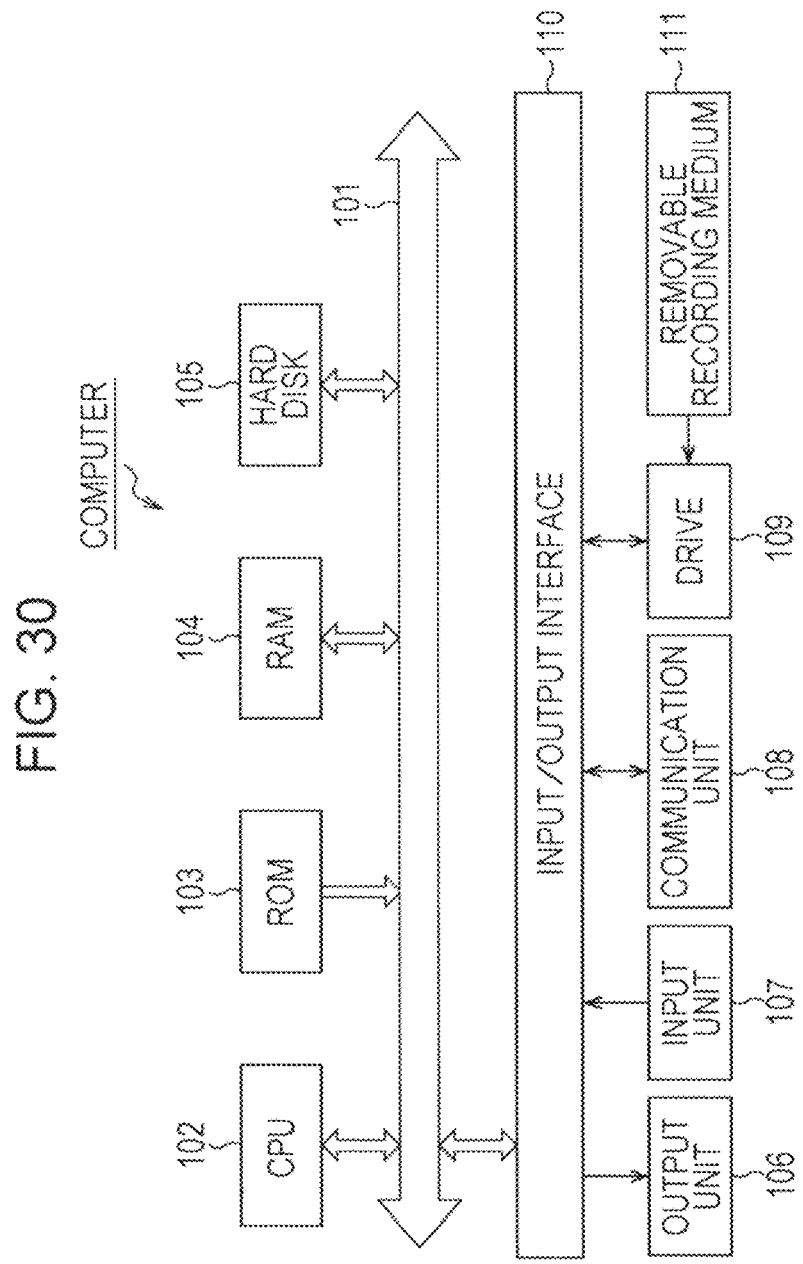
FIG. 30 is a block diagram illustrating a configuration example of an embodiment of a computer to which the present technology has been applied.

Accordingly, FIG. 30 illustrates a configuration example of an embodiment of the computer into which the program that executes the above-mentioned series of processing is installed.

The program may be recorded in a hard disk 105 or ROM 103 serving as recording media housed in the computer beforehand.

Alternatively, the program may be stored (recorded) in a removable recording medium 111. Such a removable recording medium 111 may be provided as a so-called package software. Here, examples of the removable recording medium 111 include a flexible disk, Compact Disc Read Only Memory (CD-ROM), Magneto Optical (MO) disk, Digital Versatile Disc (DVD), magnet disk, and semiconductor memory.

Note that, in addition to installing from the removable recording medium 111 to the computer as described above, the program may be downloaded to the computer via a communication network or broadcast network, and installed into a built-in hard disk 105. That is to say, the program may be transferred from a download site to the computer by radio via a satellite for digital satellite broadcasting, or may be transferred to the computer by cable via a network such as a Local Area Network (LAN) or the Internet.

The computer houses a Central Processing Unit (CPU) 102, and the CPU 102 is connected to an input/output interface 110 via a bus 101.

In the event that a command has been input via the input/output interface 110 by a user operating an input unit 107 or the like, in response to this, the CPU 102 executes the program stored in the Read Only Memory (ROM) 103. Alternatively, the CPU 102 loads the program stored in the hard disk 105 to Random Access Memory (RAM) 104 and executes this.

Thus, the CPU 102 performs processing following the above-mentioned flowchart, or processing to be performed by the configuration of the above-mentioned block diagram. For example, the CPU 102 outputs the processing results thereof from an output unit 106 via the input/output interface 110 or transmits from a communication unit 108, further records in the hard disk 105, and so forth as appropriate.

Note that the input unit 107 is configured of a keyboard, a mouse, a microphone, and so forth. Also, the output unit 106 is configured of a Liquid Crystal Display (LCD), a speaker, and so forth.

Here, with the present Specification, processing that the computer performs in accordance with the program does not necessarily have to be processed in time sequence along the sequence described as the flowchart. That is to say, the processing that the computer performs in accordance with the program also encompasses processing to be executed in parallel or individually (e.g., parallel processing or processing according to an object).

Also, the program may be processed by one computer (processor), or may be processed in a distributed manner by multiple computers. Further, the program may be transferred to a remote computer for execution.

Further, with the present Specification, the term "system" means a group of multiple components (devices, modules (parts), etc.), and it does not matter whether or not all of the components are included in the same casing. Accordingly, both of multiple devices housed in separates casings and connected via a network, and a single device in which multiple modules are housed in one casing are systems.

Note that an embodiment of the present technology is not restricted to the above-mentioned embodiment, and various modifications may be made without departing from the essence of the present technology.

For example, the present technology may have a configuration of cloud computing to process one function in a manner shared and collaborated with multiple devices.

Also, the steps described in the above-mentioned flowchart may be executed not only with a single device but also with multiple devices in a shared manner.

Further, in the event that multiple processes are included in one step, the multiple processes included in the one step may be executed not only with a single device but also with multiple devices in a shared manner.

Note that the present technology may have a configuration as will be described below.

[1] An information processing device including: a foreground state estimating unit configured to estimate a foreground state of an image using an actual image which is an image to be actually observed; and a visible model updating unit configured to update a background visible model which is visibility of the background of an image and a foreground visible model which is visibility of the foreground using an estimation result of the foreground state.

[2] The information processing device according to [1], further including: a motion model estimating unit configured to estimate a motion model of the foreground using action of the foreground state, and state series of most-likely state of the foreground to be obtained from an estimation result of the foreground state; and a motion model updating unit configured to update the motion model using an estimation result of the motion model.

[3] The information processing device according to [2], wherein the foreground visible model includes a background texture model which represents texture of the background; and wherein the foreground visible model includes a foreground texture model which represents texture of the foreground, and a foreground shape model which represents a shape of the foreground; and wherein the foreground state includes a position of the foreground, speed of change in position, attitude, and speed of change in attitude; and wherein the foreground motion model includes mass of the foreground, center-of-gravity of mass, and moment of inertia working around center-of-gravity; and wherein the foreground action includes force to be applied to the foreground, and a position to which the force is applied.

[4] The information processing device according to [3], wherein the background visible model, the foreground visible model, and the motion model are updated in accordance with the EM algorithm.

[5] The information processing device according to [3] or [4], wherein the background visible model, the foreground visible model, and the motion model are updated in accordance with the EM algorithm using a particle filter.

[6] The information processing device according to [5], wherein the foreground state estimating unit performs processing to calculate weighting of a state particle which is a particle which represents the foreground state, and a transition destination of the state particle as the E step of the EM algorithm using the particle filter.

[7] The information processing device according to [6], wherein the foreground state estimating unit calculates a value corresponding to observation most-likelihood of an observation value to be observed at a generating model which generates an observation value of an image in the event that the foreground state is a state that the state particle represents, as weighting of the state particle, and also calculates a transition destination of the state particle assuming that the state particle makes the transition with stochastic fluctuation in accordance with the speed of change in position and speed of change in attitude of the foreground state that the state particle represents; and wherein with the generating model, the image observation value observed at the generating model is generated by subjecting, regarding points on an image that the foreground visible model represents, texture that the foreground texture model represents and texture that the background texture model represents to a blending with the foreground shape model as an α value, and employing, regarding points other than the points on the image that the foreground visible model represents, texture that the background texture model represents.

[8] The information processing device according to [7], wherein the foreground state estimating unit calculates a transition destination of the state particle assuming that the state particle makes the transition further in accordance with the action and the motion model.

[9] The information processing device according to any of [6] to [8], wherein the visible model updating unit performs as the M step of the EM algorithm using the particle filter: processing to update, in accordance with a state that the state particle represents, the foreground texture model by trimming an image from the actual image and subjecting the trimmed image which is an image trimmed from the actual image to weighting addition in accordance with weighting of the state particle; processing to update, in accordance with a state that the state particle represents, the background texture model by removing a foreground corresponding to the state from the actual image, and subjects the actual image from which the foreground has been removed to weighting addition in accordance with weighting of the state particle; and processing to update the foreground shape model by obtaining likelihood that each pixel of texture that the foreground texture model represents will be a foreground, and likelihood that each pixel will be a background, and obtaining probability that each pixel of texture that the foreground texture model represents will be a foreground using the likelihood that each pixel will be the foreground, and the likelihood that each pixel will be a background.

[10] The information processing device according to [9], wherein the visible model updating unit updates the foreground texture model by averaging a weighting addition value obtained by subjecting the trimmed image to weighting addition in accordance with weighting of the state particle, for an amount equivalent to a predetermined period of time, and also updates the background texture model by averaging a weighting addition value obtained by subjecting the actual image from which the foreground has been removed to weighting addition in accordance with weighting of the state particle, for an amount equivalent to a predetermined period of time.

[11] The information processing device according to [9] or [10], wherein the visible model updating unit updates, regarding a plurality of foreground visible models, the background texture model by repeating that the plurality of foreground visible models are sequentially taken as a model of interest, and in accordance with a state that the state particle represents, a foreground corresponding to the state is removed from a removed image from which a foreground that a foreground visible model which has been a model of interest immediately before represents has been removed, and the removed image from which the foreground has been removed is subjected to weighting addition in accordance with weighting of the state particle.

[12] The information processing device according to [5], wherein the motion model estimating unit performs processing to calculate weighting of a motion model particle which is a particle which represents the motion model, and a transition destination of the motion model particle as the E step of the EM algorithm using the particle filter.

[13] The information processing device according to [12], wherein the motion model estimating unit calculates a value corresponding to observation likelihood of state series of the foreground state to be observed at a motion model that the motion model particle represents as weighting of the motion model particle, and also calculates a transition destination of the motion model particle assuming that the motion model particle makes the transition with stochastic fluctuation.

[14] The information processing device according to [13], further including: a most-likely state calculating unit configured to obtain a most-likely state of the foreground; wherein the motion model estimating unit obtains a value corresponding to error between a state series of the foreground state to be generated with the motion model particle, and a state series of the most-likely state of the foreground as observation likelihood of a state series of the foreground state.

[15] The information processing device according to any of [12] to [14], wherein the motion model updating unit performs processing to update the motion model by subjecting a motion model that the motion model particle represents to weighting addition in accordance with weighting of the motion model particle as the M step of the EM algorithm using the particle filter.

[16] The information processing device according to any of [12] to [15], further including: an action generating unit configured to generate another foreground action which allows one foreground to be in a predetermined target state using the foreground visible model and the motion model.

[17] The information processing device according to [16], wherein the action generating unit generates action to translate the one foreground, and action to rotate the one foreground.

[18] The information processing device according to [17], wherein the action generating unit continuously generates one of action to translate the one foreground, and action to rotate the one foreground until error between the one foreground state and the target state becomes small, and then generates the other action.

[19] An information processing method including:
estimating a foreground state of an image using an actual image which is an image to be actually observed; and
updating a background visible model which is visibility of the background of an image and a foreground visible model which is visibility of the foreground using an estimation result of the foreground state.

[20] A program causing a computer serving as:
a foreground state estimating unit configured to estimate a foreground state of an image using an actual image which is an image to be actually observed; and a visible model updating unit configured to update a background visible model which is visibility of the background of an image and a foreground visible model which is visibility of the foreground using an estimation result of the foreground state.

The present disclosure contains subject matter related to that disclosed in Japanese Priority Patent Application JP 2012-058679 filed in the Japan Patent Office on Mar. 15, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing device comprising:
one or more processors configured to:
estimate a foreground state of an image using an actual image which is an image to be actually observed;
update a background visible model which is visibility of the background of an image and a foreground visible model which is visibility of the foreground using an estimation result of the foreground state;
estimate a motion model of the foreground using action of the foreground state, and state series of most-likely state of the foreground to be obtained from the estimation result of the foreground state; and generate another foreground action which allows the foreground to be in a predetermined target state using the foreground visible model and the estimated motion model.

2. The information processing device according to claim 1, further comprising:
one or more processors configured to:
update the motion model using an estimation result of the motion model.

3. The information processing device according to claim 1, wherein the foreground visible model includes a background texture model which represents texture of the background;
and wherein the foreground visible model includes
a foreground texture model which represents texture of the foreground, and
a foreground shape model which represents a shape of the foreground;
and wherein the foreground state includes
a position of the foreground,
a speed of change in the position,
an attitude, and
a speed of change in the attitude;
and wherein the foreground motion model includes
a mass of the foreground,
a center-of-gravity of the mass, and
a moment of inertia working around the center-of-gravity;
and wherein the foreground action includes
a force to be applied to the foreground, and
a position to which the force is applied.

4. The information processing device according to claim 1, wherein the background visible model, the foreground visible model, and the motion model are updated in accordance with an Expectation Maximization (EM) algorithm.

5. The information processing device according to claim 1, wherein the background visible model, the foreground visible model, and the motion model are updated in accordance with an Expectation Maximization (EM) algorithm using a particle filter.

6. The information processing device according to claim 5, wherein the estimated foreground state of the image is processed to calculate weighting of a state particle which is a particle which represents the foreground state, and a transition destination of the state particle as the E step of the EM algorithm using the particle filter.

7. The information processing device according to claim 3, wherein the one or more processors are configured to calculate a value corresponding to observation most-likelihood of an observation value to be observed at a generating model which generates an observation value of an image in an event that the foreground state is a state that a state particle represents, as weighting of the state particle, and calculate a transition destination of the state particle assuming that the state particle makes a transition with stochastic fluctuation in accordance with the speed of change in the position and speed of change in the attitude of the foreground state that the state particle represents;
and wherein with the generating model, the observation value of the image observed at the generating model is generated by subjecting, regarding points on an image that the foreground visible model represents, texture that the foreground texture model represents and texture that the background texture model represents to a blending with the foreground shape model as an α value, and employing, regarding points other than the points on the image that the foreground visible model represents, texture that the background texture model represents.

8. The information processing device according to claim 7, wherein the one or more processors are configured to calculate a transition destination of the state particle assuming that the state particle makes the transition further in accordance with the action and the motion model.

9. The information processing device according to claim 3, wherein the one or more processors are configured to perform the M step of an Expectation Maximization (EM) algorithm using the particle filter:
processing to update, in accordance with a state that the state particle represents, the foreground texture model by trimming an image from the actual image and subjecting the trimmed image which is an image trimmed from the actual image to weighting addition in accordance with weighting of the state particle;
processing to update, in accordance with a state that the state particle represents, the background texture model by removing a foreground corresponding to the state from the actual image, and subjects the actual image from which the foreground has been removed to weighting addition in accordance with weighting of the state particle; and
processing to update the foreground shape model by obtaining likelihood that each pixel of texture that the foreground texture model represents will be a foreground, and likelihood that each pixel will be a background, and obtaining probability that each pixel of texture that the foreground texture model represents will be a foreground using the likelihood that each pixel will be the foreground, and the likelihood that each pixel will be a background.

10. The information processing device according to claim 9, wherein the one or more processors are configured to update the foreground texture model by averaging a weighting addition value obtained by subjecting the trimmed image to weighting addition in accordance with weighting of the state particle, for an amount equivalent to a predetermined period of time, and also updates the background texture model by averaging a weighting addition value obtained by subjecting the actual image from which the foreground has been removed to weighting addition in accordance with weighting of the state particle, for an amount equivalent to a predetermined period of time.

11. The information processing device according to claim 9, wherein the one or more processors are configured to update regarding a plurality of foreground visible models, the background texture model by repeating that the plurality of foreground visible models are sequentially taken as a model of interest, and in accordance with a state that the state particle represents, a foreground corresponding to the state is removed from a removed image from which a foreground that a foreground visible model which has been a model of interest immediately before represents has been removed, and the removed image from which the foreground has been removed is subjected to weighting addition in accordance with weighting of the state particle.

12. The information processing device according to claim 5, wherein the one or more processors are configured to perform processing to calculate weighting of a motion model particle which is a particle which represents the motion model, and a transition destination of the motion model particle as the E step of the EM algorithm using the particle filter.

13. The information processing device according to claim 12, wherein the one or more processors are configured to calculate a value corresponding to observation likelihood of state series of the foreground state to be observed at a motion model that the motion model particle represents as weighting of the motion model particle, and calculate a transition destination of the motion model particle assuming that the motion model particle makes a transition with stochastic fluctuation.

14. The information processing device according to claim 13, wherein the one or more processors are configured to:
obtain a most-likely state of the foreground, and
obtain a value corresponding to error between a state series of the foreground state to be generated with the motion model particle, and a state series of the most-likely state of the foreground as observation likelihood of a state series of the foreground state.

15. The information processing device according to claim 12, wherein the one or more processors are configured to perform processing to update the motion model by subjecting a motion model that the motion model particle represents to weighting addition in accordance with weighting of the motion model particle as the M step of the EM algorithm using the particle filter.

16. An information processing device comprising:
one or more processors configured to:
estimate a foreground state of an image using an actual image which is an image to be actually observed;
update a background visible model which is visibility of the background of an image and a foreground visible model which is visibility of the foreground using an estimation result of the foreground state;
estimate a motion model of the foreground using action of the foreground state, and state series of most-likely state of the foreground to be obtained from the estimation result of the foreground state;
update the motion model using the estimation result of the motion model,
wherein the foreground visible model includes a background texture model which represents texture of the background;
and wherein the foreground visible model includes
a foreground texture model which represents texture of the foreground, and
a foreground shape model which represents a shape of the foreground;
and wherein the foreground state includes
a position of the foreground,
a speed of change in the position,
an attitude, and
a speed of change in the attitude;
and wherein the foreground motion model includes
a mass of the foreground,
a center-of-gravity of the mass, and
a moment of inertia working around the center-of-gravity;
and wherein the foreground action includes
a force to be applied to the foreground, and
a position to which the force is applied;
wherein the background visible model, the foreground visible model, and the motion model are updated in accordance with an Expectation Maximization (EM) algorithm using a particle filter; and
generate another foreground action which allows one foreground to be in a predetermined target state using the foreground visible model and the motion model.

17. The information processing device according to claim 16, wherein the one or more processors are configured to generate a first action to translate the one foreground, and a second action to rotate the one foreground.

18. The information processing device according to claim 17, wherein the one or more processors are configured to generate one of the first action to translate the one foreground, and the second action to rotate the one foreground continuously until error between the one foreground state and the target state becomes small, and then generate another action.

19. An information processing method comprising:
estimating a foreground state of an image using an actual image which is an image to be actually observed;
updating a background visible model which is visibility of the background of an image and a foreground visible model which is visibility of the foreground using an estimation result of the foreground state, wherein at least one of the background visible model and the foreground visible model is updated in accordance with an Expectation Maximization (EM) algorithm using a particle filter; and
generating a foreground action which allows the foreground to be in a predetermined target state using the foreground visible model and a motion model.

20. A non-transitory computer readable medium having stored thereon, a set of computer-executable instructions for causing a computer to perform steps comprising:
estimating a foreground state of an image using an actual image which is an image to be actually observed;
updating a background visible model which is visibility of the background of an image and a foreground visible model which is visibility of the foreground using an estimation result of the foreground state;
estimating a motion model of the foreground using action of the foreground state, and state series of most-likely state of the foreground to be obtained from the estimation result of the foreground state; and
generating another foreground action which allows the foreground to be in a predetermined target state using the foreground visible model and the estimated motion model.

* * * * *